US012801423B2

(12) United States Patent
Kumar et al.

(10) Patent No.: US 12,801,423 B2
(45) **Date of Patent: *Nov. 17, 2026**

(54) LIVE RECOVERY OF VIRTUAL MACHINES IN A PUBLIC CLOUD COMPUTING ENVIRONMENT BASED ON TEMPORARY LIVE MOUNT

(71) Applicant: Commvault Systems, Inc., Tinton Falls, NJ (US)

(72) Inventors: Sanjay Kumar, Morganville, NJ (US); Sumedh Pramod Degaonkar, Sammamish, WA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 303 days.

This patent is subject to a terminal disclaimer.

(21) Appl. No.: 18/800,322

(22) Filed: Aug. 12, 2024

(65) Prior Publication Data

US 2024/0403104 A1 Dec. 5, 2024

Related U.S. Application Data

(63) Continuation of application No. 18/351,058, filed on Jul. 12, 2023, now Pat. No. 12,086,624, which is a (Continued)

(51) Int. Cl.

*G06F 9/455* (2018.01)
*G06F 3/06* (2006.01)

(Continued)

(52) U.S. Cl.

CPC ........ *G06F 9/45558* (2013.01); *G06F 3/0617* (2013.01); *G06F 3/0619* (2013.01);

(Continued)

(58) Field of Classification Search

CPC .. G06F 9/45558; G06F 3/0617; G06F 3/0619; G06F 3/0647; G06F 3/065;

(Continued)

(56) References Cited

U.S. PATENT DOCUMENTS 4,084,231 A 4/1978 Capozzi et al.
4,267,568 A 5/1981 Dechant et al.

(Continued)

FOREIGN PATENT DOCUMENTS

EP 0259912 3/1988
EP 0405926 1/1991

(Continued)

OTHER PUBLICATIONS

Arneson, "Mass Storage Archiving in Network Environments," Digest of Papers, Ninth IEEE Symposium on Mass Storage Systems, Oct. 31, 1988Nov. 3, 1988, pp. 45-50, Monterey, CA.

(Continued)

*Primary Examiner* — Dong U Kim

(74) *Attorney, Agent, or Firm* — Commvault Systems, Inc.

(57) ABSTRACT

Live mounting a virtual machine (VM) causes the VM to run off a backup copy or snapshot previously taken of a "live" production VM. The live-mounted VM is generally intended for temporary use such as to validate the integrity and contents of the backup copy for disaster recovery validation, or to access some contents of the backup copy from the live-mounted VM without restoring all backed up files. These uses contemplate that changes occurring during live mount are not preserved after the live-mounted VM expires or is taken down. Thus, live mounting a VM is not a restore operation and usually does not involve access to every block of data in the backup copy. However, live mounting provides (Continued)

live VM service in the cloud sooner than waiting for all of the backup copy/snapshot to be restored.

20 Claims, 20 Drawing Sheets

Related U.S. Application Data continuation of application No. 17/130,540, filed on Dec. 22, 2020, now Pat. No. 11,748,143.

(60) Provisional application No. 63/025,758, filed on May 15, 2020.

(51) Int. Cl.

| | |
|---|---|
| ***G06F 11/14*** | (2006.01) |
| ***G06F 11/1446*** | (2026.01) |
| ***G06F 11/1471*** | (2026.01) |
| ***G06F 11/20*** | (2006.01) |
| *G06F 11/1482* | (2026.01) |

(52) U.S. Cl.

CPC ............ *G06F 3/0647* (2013.01); *G06F 3/065* (2013.01); *G06F 3/0665* (2013.01); *G06F 3/067* (2013.01); *G06F 11/1402* (2013.01); *G06F 11/1448* (2013.01); *G06F 11/1464* (2013.01); *G06F 11/1469* (2013.01); *G06F 11/1471* (2013.01); *G06F 11/2033* (2013.01); *G06F 2009/45575* (2013.01); *G06F 2009/45583* (2013.01); *G06F 2009/45595* (2013.01); *G06F 11/1484* (2013.01); *G06F 2201/815* (2013.01); *G06F 2201/84* (2013.01)

(58) Field of Classification Search

CPC .... G06F 3/0665; G06F 3/067; G06F 11/1402; G06F 11/1448; G06F 11/1464; G06F 11/1469; G06F 11/1471; G06F 11/2033; G06F 11/1484; G06F 2009/45575; G06F 2009/45583; G06F 2009/45595; G06F 2201/84; G06F 3/0649; G06F 2201/815; G06F 11/1451; G06F 11/1453; G06F 11/2028; G06F 2009/45579

See application file for complete search history.

(56) References Cited

U.S. PATENT DOCUMENTS

| | | | |
|---|---|---|---|
| 4,283,787 | A | 8/1981 | Chambers |
| 4,417,321 | A | 11/1983 | Chang et al. |
| 4,641,274 | A | 2/1987 | Swank |
| 4,654,819 | A | 3/1987 | Stiffler et al. |
| 4,686,620 | A | 8/1987 | Ng |
| 4,912,637 | A | 3/1990 | Sheedy et al. |
| 4,995,035 | A | 2/1991 | Cole |
| 5,005,122 | A | 4/1991 | Griffin |
| 5,093,912 | A | 3/1992 | Dong et al. |
| 5,123,107 | A | 6/1992 | Mensch, Jr. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,286 | A | 4/1994 | Rajani |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,420,996 | A | 5/1995 | Aoyagi |
| 5,448,724 | A | 9/1995 | Hayashi et al. |
| 5,454,099 | A | 9/1995 | Myers et al. |
| 5,491,810 | A | 2/1996 | Allen |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,559,957 | A | 9/1996 | Balk |
| 5,559,991 | A | 9/1996 | Kanfi |
| 5,619,644 | A | 4/1997 | Crockett et al. |
| 5,638,509 | A | 6/1997 | Dunphy et al. |
| 5,642,496 | A | 6/1997 | Kanfi |
| 5,664,204 | A | 9/1997 | Wang |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen et al. |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,901,327 | A | 5/1999 | Ofek |
| 5,924,102 | A | 7/1999 | Perks |
| 5,950,205 | A | 9/1999 | Aviani, Jr. |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem et al. |
| 6,094,416 | A | 7/2000 | Ying |
| 6,101,585 | A | 8/2000 | Brown et al. |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,327,590 | B1 | 12/2001 | Chidlovskii et al. |
| 6,328,766 | B1 | 12/2001 | Long |
| 6,330,570 | B1 | 12/2001 | Crighton et al. |
| 6,330,642 | B1 | 12/2001 | Carteau |
| 6,343,324 | B1 | 1/2002 | Hubis et al. |
| RE37,601 | E | 3/2002 | Eastridge |
| 6,356,801 | B1 | 3/2002 | Goodman et al. |
| 6,389,432 | B1 | 5/2002 | Pothapragada et al. |
| 6,397,242 | B1 | 5/2002 | Devine et al. |
| 6,418,478 | B1 | 7/2002 | Ignatius et al. |
| 6,421,711 | B1 | 7/2002 | Blumenau et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,542,972 | B2 | 4/2003 | Ignatius et al. |
| 6,564,228 | B1 | 5/2003 | O'Connor |
| 6,581,076 | B1 | 6/2003 | Ching et al. |
| 6,658,436 | B2 | 12/2003 | Oshinsky et al. |
| 6,658,526 | B2 | 12/2003 | Nguyen et al. |
| 6,721,767 | B2 | 4/2004 | DeMeno et al. |
| 6,760,723 | B2 | 7/2004 | Oshinsky et al. |
| 6,772,290 | B1 | 8/2004 | Bromley et al. |
| 6,820,214 | B1 | 11/2004 | Cabrera et al. |
| 6,941,429 | B1 | 9/2005 | Kamvysselis et al. |
| 6,959,327 | B1 | 10/2005 | Vogl |
| 6,973,555 | B2 | 12/2005 | Fujiwara |
| 7,000,238 | B2 | 2/2006 | Nadler |
| 7,003,641 | B2 | 2/2006 | Prahlad |
| 7,035,880 | B1 | 4/2006 | Crescenti |

(56) References Cited

U.S. PATENT DOCUMENTS

| | | | |
|---|---|---|---|
| 7,076,270 | B2 | 7/2006 | Jaggers et al. |
| 7,079,341 | B2 | 7/2006 | Kistler et al. |
| 7,096,418 | B1 | 8/2006 | Singhal |
| 7,107,298 | B2 | 9/2006 | Prahlad |
| 7,130,272 | B1 | 10/2006 | Gai et al. |
| 7,130,970 | B2 | 10/2006 | Devassy |
| 7,143,203 | B1 | 11/2006 | Altmejd |
| 7,162,496 | B2 | 1/2007 | Amarendran et al. |
| 7,174,433 | B2 | 2/2007 | Kottomtharayil et al. |
| 7,219,162 | B2 | 5/2007 | Donker et al. |
| 7,225,220 | B2 | 5/2007 | Gonzalez et al. |
| 7,246,207 | B2 | 7/2007 | Kottomtharayil |
| 7,260,633 | B2 | 8/2007 | Lette |
| 7,315,923 | B2 | 1/2008 | Retnamma |
| 7,324,543 | B2 | 1/2008 | Wassew et al. |
| 7,334,144 | B1 | 2/2008 | Schlumberger |
| 7,340,616 | B2 | 3/2008 | Rothman et al. |
| 7,343,356 | B2 | 3/2008 | Prahlad |
| 7,343,453 | B2 | 3/2008 | Prahlad |
| 7,346,751 | B2 | 3/2008 | Prahlad |
| 7,366,846 | B2 | 4/2008 | Boyd et al. |
| 7,376,895 | B2 | 5/2008 | Tsao |
| 7,386,744 | B2 | 6/2008 | Barr |
| 7,389,311 | B1 | 6/2008 | Crescenti et al. |
| 7,395,282 | B1 | 7/2008 | Crescenti |
| 7,440,982 | B2 | 10/2008 | Lu |
| 7,448,079 | B2 | 11/2008 | Tremain |
| 7,454,569 | B2 | 11/2008 | Kavuri |
| 7,472,079 | B2 | 12/2008 | Fellenstein |
| 7,475,282 | B2 | 1/2009 | Tormasov et al. |
| 7,483,895 | B2 | 1/2009 | Hysom |
| 7,484,208 | B1 | 1/2009 | Nelson |
| 7,490,207 | B2 | 2/2009 | Amarendran et al. |
| 7,500,053 | B1 | 3/2009 | Kavuri |
| 7,502,820 | B2 | 3/2009 | Manders |
| 7,516,346 | B2 | 4/2009 | Pinheiro et al. |
| 7,516,348 | B1 | 4/2009 | Ofer |
| 7,526,798 | B2 | 4/2009 | Chao |
| 7,529,782 | B2 | 5/2009 | Prahlad |
| 7,536,291 | B1 | 5/2009 | Vijayan Retnamma et al. |
| 7,543,125 | B2 | 6/2009 | Gokhale |
| 7,546,324 | B2 | 6/2009 | Prahlad et al. |
| 7,546,475 | B2 | 6/2009 | Mayo et al. |
| 7,552,279 | B1 | 6/2009 | Gandler |
| 7,587,570 | B2 | 9/2009 | Sarkar et al. |
| 7,603,386 | B2 | 10/2009 | Amarendran et al. |
| 7,606,844 | B2 | 10/2009 | Kottomtharayil |
| 7,613,752 | B2 | 11/2009 | Prahlad |
| 7,617,191 | B2 | 11/2009 | Wilbrink et al. |
| 7,617,253 | B2 | 11/2009 | Prahlad et al. |
| 7,617,262 | B2 | 11/2009 | Prahlad |
| 7,620,710 | B2 | 11/2009 | Kottomtharayil |
| 7,627,827 | B2 | 12/2009 | Taylor et al. |
| 7,631,351 | B2 | 12/2009 | Erofeev |
| 7,636,743 | B2 | 12/2009 | Erofeev |
| 7,640,406 | B1 | 12/2009 | Hagerstrom |
| 7,651,593 | B2 | 1/2010 | Prahlad |
| 7,653,668 | B1 | 1/2010 | Shelat |
| 7,657,550 | B2 | 2/2010 | Prahlad |
| 7,660,807 | B2 | 2/2010 | Prahlad |
| 7,661,028 | B2 | 2/2010 | Erofeev |
| 7,668,884 | B2 | 2/2010 | Prahlad |
| 7,685,177 | B1 | 3/2010 | Hagerstrom |
| 7,685,269 | B1 | 3/2010 | Thrasher et al. |
| 7,694,070 | B2 | 4/2010 | Mogi |
| 7,716,171 | B2 | 5/2010 | Kryger |
| 7,721,138 | B1 | 5/2010 | Lyadvinsky et al. |
| 7,725,671 | B2 | 5/2010 | Prahlad |
| 7,725,893 | B2 | 5/2010 | Jaeckel et al. |
| 7,730,035 | B2 | 6/2010 | Berger et al. |
| 7,734,669 | B2 | 6/2010 | Kottomtharayil |
| 7,739,548 | B2 | 6/2010 | Goodrum et al. |
| 7,747,579 | B2 | 6/2010 | Prahlad |
| 7,756,835 | B2 | 7/2010 | Pugh |
| 7,756,964 | B2 | 7/2010 | Madison, Jr. et al. |
| 7,761,736 | B2 | 7/2010 | Nguyen et al. |
| 7,765,167 | B2 | 7/2010 | Prahlad |
| 7,769,616 | B2 | 8/2010 | Ollivier |
| 7,778,984 | B2 | 8/2010 | Zhang |
| 7,792,789 | B2 | 9/2010 | Prahlad |
| 7,793,307 | B2 | 9/2010 | Gokhale et al. |
| 7,797,453 | B2 | 9/2010 | Meijer et al. |
| 7,801,864 | B2 | 9/2010 | Prahlad |
| 7,809,914 | B2 | 10/2010 | Kottomtharayil |
| 7,814,149 | B1 | 10/2010 | Stringham |
| 7,814,351 | B2 | 10/2010 | Lubbers et al. |
| 7,818,082 | B2 | 10/2010 | Roumeliotis et al. |
| 7,822,967 | B2 | 10/2010 | Fung |
| 7,823,145 | B1 | 10/2010 | Le et al. |
| 7,840,537 | B2 | 11/2010 | Gokhale |
| 7,861,234 | B1 | 12/2010 | Lobo et al. |
| 7,882,077 | B2 | 2/2011 | Gokhale |
| 7,890,467 | B2 | 2/2011 | Watanabe |
| 7,899,788 | B2 | 3/2011 | Chandhok |
| 7,899,791 | B1 | 3/2011 | Gole |
| 7,917,438 | B2 | 3/2011 | Kenedy et al. |
| 7,917,617 | B1 | 3/2011 | Ponnapur |
| 7,925,850 | B1 | 4/2011 | Waldspurger et al. |
| 7,937,421 | B2 | 5/2011 | Mikesell |
| 7,937,612 | B1 | 5/2011 | Lyadvinsky et al. |
| 7,975,061 | B1 | 7/2011 | Gokhale |
| 7,996,270 | B2 | 8/2011 | Sundaresan |
| 8,001,277 | B2 | 8/2011 | Mega |
| 8,037,016 | B2 | 10/2011 | Odulinski et al. |
| 8,037,028 | B2 | 10/2011 | Prahlad |
| 8,037,032 | B2 | 10/2011 | Pershin et al. |
| 8,046,550 | B2 | 10/2011 | Feathergill |
| 8,055,745 | B2 | 11/2011 | Atluri |
| 8,060,476 | B1 | 11/2011 | Afonso et al. |
| 8,065,166 | B2 | 11/2011 | Maresh |
| 8,069,271 | B2 | 11/2011 | Brunet et al. |
| 8,099,391 | B1 | 1/2012 | Monckton |
| 8,108,427 | B2 | 1/2012 | Prahlad |
| 8,112,605 | B2 | 2/2012 | Kavuri |
| 8,117,492 | B1 | 2/2012 | Searls et al. |
| 8,134,727 | B1 | 3/2012 | Shmunis |
| 8,135,930 | B1 | 3/2012 | Mattox et al. |
| 8,140,786 | B2 | 3/2012 | Bunte |
| 8,156,086 | B2 | 4/2012 | Lu et al. |
| 8,156,301 | B1 | 4/2012 | Khandelwal et al. |
| 8,170,995 | B2 | 5/2012 | Prahlad |
| 8,185,893 | B2 | 5/2012 | Hyser et al. |
| 8,191,063 | B2 | 5/2012 | Shingai et al. |
| 8,200,637 | B1 | 6/2012 | Stringham |
| 8,209,680 | B1 | 6/2012 | Le et al. |
| 8,219,524 | B2 | 7/2012 | Gokhale |
| 8,219,653 | B1 | 7/2012 | Keagy et al. |
| 8,219,769 | B1 | 7/2012 | Wilk |
| 8,225,133 | B1 | 7/2012 | Lyadvinsky et al. |
| 8,229,896 | B1 | 7/2012 | Narayanan |
| 8,229,954 | B2 | 7/2012 | Kottomtharayil |
| 8,230,195 | B2 | 7/2012 | Amarendran |
| 8,230,256 | B1 | 7/2012 | Raut |
| 8,266,406 | B2 | 9/2012 | Kavuri |
| 8,285,681 | B2 | 10/2012 | Prahlad |
| 8,296,534 | B1 | 10/2012 | Gupta et al. |
| 8,307,177 | B2 | 11/2012 | Prahlad |
| 8,307,187 | B2 | 11/2012 | Chawla et al. |
| 8,315,992 | B1 | 11/2012 | Gipp et al. |
| 8,316,091 | B2 | 11/2012 | Hirvela et al. |
| 8,321,688 | B2 | 11/2012 | Auradkar |
| 8,352,608 | B1 | 1/2013 | Keagy et al. |
| 8,364,652 | B2 | 1/2013 | Vijayan |
| 8,364,802 | B1 | 1/2013 | Keagy et al. |
| 8,370,307 | B2 | 2/2013 | Wolfe |
| 8,370,542 | B2 | 2/2013 | Lu et al. |
| 8,396,838 | B2 | 3/2013 | Brockway |
| 8,407,190 | B2 | 3/2013 | Prahlad |
| 8,417,697 | B2 | 4/2013 | Ghemawat et al. |
| 8,429,630 | B2 | 4/2013 | Nickolov |
| 8,433,679 | B2 | 4/2013 | Crescenti |
| 8,434,131 | B2 | 4/2013 | Varadharajan |
| 8,438,347 | B1 | 5/2013 | Tawri et al. |
| 8,453,145 | B1 | 5/2013 | Naik |

(56) References Cited

U.S. PATENT DOCUMENTS

| | | | |
|---|---|---|---|
| 8,458,419 | B2 | 6/2013 | Basler et al. |
| 8,473,594 | B2 | 6/2013 | Astete et al. |
| 8,489,676 | B1 | 7/2013 | Chaplin et al. |
| 8,504,515 | B2 | 8/2013 | Prahlad et al. |
| 8,510,573 | B2 | 8/2013 | Muller et al. |
| 8,527,549 | B2 | 9/2013 | Cidon |
| 8,560,788 | B1 | 10/2013 | Sreedharan et al. |
| 8,566,362 | B2 | 10/2013 | Mason et al. |
| 8,577,845 | B2 | 11/2013 | Nguyen et al. |
| 8,578,120 | B2 | 11/2013 | Attarde |
| 8,578,126 | B1 | 11/2013 | Gaonkar et al. |
| 8,612,439 | B2 | 12/2013 | Prahlad |
| 8,620,870 | B2 | 12/2013 | Dwarampudi |
| 8,621,460 | B2 | 12/2013 | Evans et al. |
| 8,626,741 | B2 | 1/2014 | Vijakumar et al. |
| 8,635,184 | B2 | 1/2014 | Hsu et al. |
| 8,635,429 | B1 | 1/2014 | Naftel et al. |
| 8,660,038 | B1 | 2/2014 | Pascazio |
| 8,667,171 | B2 | 3/2014 | Guo et al. |
| 8,674,823 | B1 | 3/2014 | Contrario et al. |
| 8,677,085 | B2 | 3/2014 | Vaghani et al. |
| 8,683,103 | B2 | 3/2014 | Ripberger |
| 8,706,867 | B2 | 4/2014 | Vijayan |
| 8,707,070 | B2 | 4/2014 | Muller |
| 8,751,857 | B2 | 6/2014 | Frenkel et al. |
| 8,769,048 | B2 | 7/2014 | Kottomtharayil |
| 8,776,043 | B1 | 7/2014 | Thimsen et al. |
| 8,780,400 | B2 | 7/2014 | Shmunis |
| 8,799,242 | B2 | 8/2014 | Leonard et al. |
| 8,799,431 | B2 | 8/2014 | Pabari |
| 8,831,202 | B1 | 9/2014 | Abidogun et al. |
| 8,849,761 | B2 | 9/2014 | Prahlad |
| 8,849,955 | B2 | 9/2014 | Prahlad |
| 8,850,146 | B1 | 9/2014 | Majumdar |
| 8,904,081 | B1 | 12/2014 | Kulkarni |
| 8,924,511 | B2 | 12/2014 | Brand |
| 8,924,967 | B2 | 12/2014 | Nelson |
| 8,930,543 | B2 | 1/2015 | Ashok et al. |
| 8,938,481 | B2 | 1/2015 | Kumarasamy et al. |
| 8,938,643 | B1 | 1/2015 | Karmarkar et al. |
| 8,950,009 | B2 | 2/2015 | Vijayan et al. |
| 8,954,446 | B2 | 2/2015 | Vijayan Retnamma et al. |
| 8,954,796 | B1 | 2/2015 | Cohen et al. |
| 8,959,509 | B1 | 2/2015 | Sobel et al. |
| 8,966,318 | B1 | 2/2015 | Shah |
| 9,020,895 | B1 | 4/2015 | Rajashekar |
| 9,020,900 | B2 | 4/2015 | Vijayan Retnamma |
| 9,021,282 | B2 | 4/2015 | Muller |
| 9,021,307 | B1 | 4/2015 | Parameswaran et al. |
| 9,021,459 | B1 | 4/2015 | Qu |
| 9,026,498 | B2 | 5/2015 | Kumarasamy |
| 9,069,587 | B2 | 6/2015 | Agarwal et al. |
| 9,092,248 | B1 | 7/2015 | Makin et al. |
| 9,098,457 | B2 | 8/2015 | Towstopiat et al. |
| 9,098,495 | B2 | 8/2015 | Gokhale |
| 9,116,633 | B2 | 8/2015 | Sancheti |
| 9,124,633 | B1 | 9/2015 | Eizadi et al. |
| 9,141,529 | B2 | 9/2015 | Klein et al. |
| 9,146,755 | B2 | 9/2015 | Lassonde et al. |
| 9,189,170 | B2 | 11/2015 | Kripalani et al. |
| 9,195,636 | B2 | 11/2015 | Smith |
| 9,213,706 | B2 | 12/2015 | Long et al. |
| 9,223,597 | B2 | 12/2015 | Deshpande et al. |
| 9,235,474 | B1 | 1/2016 | Petri et al. |
| 9,235,582 | B1 | 1/2016 | Madiraju Varadaraju |
| 9,239,687 | B2 | 1/2016 | Vijayan |
| 9,239,762 | B1 | 1/2016 | Gunda et al. |
| 9,246,996 | B1 | 1/2016 | Brooker |
| 9,262,496 | B2 | 2/2016 | Kumarasamy et al. |
| 9,268,602 | B2 | 2/2016 | Prahlad et al. |
| 9,280,378 | B2 | 3/2016 | Shah |
| 9,286,086 | B2 | 3/2016 | Deshpande et al. |
| 9,286,110 | B2 | 3/2016 | Mitkar |
| 9,292,350 | B1 | 3/2016 | Pendharkar et al. |
| 9,298,715 | B2 | 3/2016 | Kumarasamy et al. |
| 9,307,177 | B2 | 4/2016 | Park et al. |
| 9,311,121 | B2 | 4/2016 | Deshpande et al. |
| 9,311,248 | B2 | 4/2016 | Wagner |
| 9,336,226 | B2 | 5/2016 | Vibhor et al. |
| 9,354,927 | B2 | 5/2016 | Hiltgen et al. |
| 9,378,035 | B2 | 6/2016 | Kripalani |
| 9,397,944 | B1 | 7/2016 | Hobbs et al. |
| 9,405,763 | B2 | 8/2016 | Prahlad et al. |
| 9,411,534 | B2 | 8/2016 | Lakshman |
| 9,417,968 | B2 | 8/2016 | Dornemann et al. |
| 9,424,136 | B1 | 8/2016 | Teater et al. |
| 9,424,151 | B2 | 8/2016 | Lakshman |
| 9,436,555 | B2 | 9/2016 | Dornemann |
| 9,444,811 | B2 | 9/2016 | Nara |
| 9,451,023 | B2 | 9/2016 | Sancheti |
| 9,454,537 | B2 | 9/2016 | Prahlad |
| 9,461,881 | B2 | 10/2016 | Kumarasamy |
| 9,471,441 | B1 | 10/2016 | Lyadvinsky |
| 9,477,683 | B2 | 10/2016 | Ghosh |
| 9,489,244 | B2 | 11/2016 | Mitkar et al. |
| 9,495,370 | B1 | 11/2016 | Chatterjee et al. |
| 9,495,404 | B2 | 11/2016 | Kumarasamy et al. |
| 9,563,514 | B2 | 2/2017 | Dornemann |
| 9,575,789 | B1 | 2/2017 | Rangari et al. |
| 9,575,991 | B2 | 2/2017 | Ghosh |
| 9,588,847 | B1 | 3/2017 | Natanzon et al. |
| 9,594,636 | B2 | 3/2017 | Mortensen et al. |
| 9,606,745 | B2 | 3/2017 | Satoyama et al. |
| 9,612,966 | B2 | 4/2017 | Joshi et al. |
| 9,632,882 | B2 | 4/2017 | Kumarasamy et al. |
| 9,633,033 | B2 | 4/2017 | Vijayan |
| 9,639,274 | B2 | 5/2017 | Maranna |
| 9,639,426 | B2 | 5/2017 | Pawar et al. |
| 9,639,428 | B1 | 5/2017 | Boda |
| 9,641,388 | B2 | 5/2017 | Kripalani |
| 9,648,100 | B2 | 5/2017 | Klose et al. |
| 9,652,283 | B2 | 5/2017 | Mitkar et al. |
| 9,665,386 | B2 | 5/2017 | Bayapuneni et al. |
| 9,684,535 | B2 | 6/2017 | Deshpande et al. |
| 9,684,567 | B2 | 6/2017 | Derk et al. |
| 9,703,584 | B2 | 7/2017 | Kottomtharayil |
| 9,710,465 | B2 | 7/2017 | Dornemann et al. |
| 9,740,702 | B2 | 8/2017 | Pawar et al. |
| 9,740,723 | B2 | 8/2017 | Prahlad et al. |
| 9,760,398 | B1 | 9/2017 | Pai |
| 9,760,448 | B1 | 9/2017 | Per et al. |
| 9,766,825 | B2 | 9/2017 | Bhagi |
| 9,766,989 | B2 | 9/2017 | Mitkar et al. |
| 9,798,489 | B2 | 10/2017 | Lakshman |
| 9,823,977 | B2 | 11/2017 | Dornemann et al. |
| 9,852,026 | B2 | 12/2017 | Mitkar et al. |
| 9,875,063 | B2 | 1/2018 | Lakshman |
| 9,928,001 | B2 | 3/2018 | Dornemann et al. |
| 9,939,981 | B2 | 4/2018 | Varadharajan et al. |
| 9,959,333 | B2 | 5/2018 | Kumarasamy |
| 9,965,316 | B2 | 5/2018 | Deshpande et al. |
| 9,977,687 | B2 | 5/2018 | Kottomtharayil et al. |
| 9,983,936 | B2 | 5/2018 | Dornemann et al. |
| 9,996,287 | B2 | 6/2018 | Dornemann et al. |
| 9,996,534 | B2 | 6/2018 | Dornemann et al. |
| 10,048,889 | B2 | 8/2018 | Dornemann et al. |
| 10,061,658 | B2 | 8/2018 | Long et al. |
| 10,067,722 | B2 | 9/2018 | Lakshman |
| 10,108,652 | B2 | 10/2018 | Kumarasamy et al. |
| 10,152,251 | B2 | 12/2018 | Sancheti et al. |
| 10,162,528 | B2 | 12/2018 | Sancheti |
| 10,162,873 | B2 | 12/2018 | Bonzini |
| 10,210,048 | B2 | 2/2019 | Sancheti |
| 10,228,962 | B2 | 3/2019 | Dornemann et al. |
| 10,248,174 | B2 | 4/2019 | Lakshman et al. |
| 10,248,657 | B2 | 4/2019 | Prahlad et al. |
| 10,255,143 | B2 | 4/2019 | Vijayan et al. |
| 10,264,074 | B2 | 4/2019 | Vijayan et al. |
| 10,296,368 | B2 | 5/2019 | Dormemann et al. |
| 10,346,259 | B2 | 7/2019 | Gokhale et al. |
| 10,379,598 | B2 | 8/2019 | Muller |
| 10,387,073 | B2 | 8/2019 | Bhagi et al. |
| 10,387,266 | B2 | 8/2019 | Kumarasamy et al. |
| 10,416,919 | B1 | 9/2019 | Cai et al. |

(56) References Cited

U.S. PATENT DOCUMENTS

| | | | |
|---|---|---|---|
| 10,417,102 | B2 | 9/2019 | Sanakkayala et al. |
| 10,437,505 | B2 | 10/2019 | Dornemann et al. |
| 10,452,303 | B2 | 10/2019 | Dornemann et al. |
| 10,474,483 | B2 | 11/2019 | Kottomtharayil et al. |
| 10,474,542 | B2 | 11/2019 | Mitkar et al. |
| 10,474,548 | B2 | 11/2019 | Sanakkayala et al. |
| 10,481,984 | B1 | 11/2019 | Semyonov et al. |
| 10,496,547 | B1 | 12/2019 | Naenko |
| 10,565,067 | B2 | 2/2020 | Dornemann |
| 10,572,468 | B2 | 2/2020 | Dornemann et al. |
| 10,592,145 | B2 | 3/2020 | Bedadala et al. |
| 10,592,350 | B2 | 3/2020 | Dornemann |
| 10,650,057 | B2 | 5/2020 | Pawar et al. |
| 10,664,352 | B2 | 5/2020 | Rana |
| 10,678,758 | B2 | 6/2020 | Dornemann |
| 10,684,883 | B2 | 6/2020 | Deshpande et al. |
| 10,684,924 | B2 | 6/2020 | Kilaru et al. |
| 10,733,143 | B2 | 8/2020 | Pawar et al. |
| 10,740,193 | B2 | 8/2020 | Dhatrak |
| 10,747,630 | B2 | 8/2020 | Sanakkayala et al. |
| 10,768,971 | B2 | 9/2020 | Dornemann et al. |
| 10,776,209 | B2 | 9/2020 | Pawar et al. |
| 10,776,329 | B2 | 9/2020 | Ramohalli Gopala Rao et al. |
| 10,853,195 | B2 | 12/2020 | Ashraf |
| 10,872,069 | B2 | 12/2020 | Dornemann et al. |
| 10,877,928 | B2 | 12/2020 | Nagrale |
| 10,896,100 | B2 | 1/2021 | Mitkar et al. |
| 10,949,308 | B2 | 3/2021 | Iyer |
| 10,949,398 | B2 | 3/2021 | Mehta et al. |
| 10,996,974 | B2 | 5/2021 | Dornemann et al. |
| 11,099,956 | B1 | 8/2021 | Polimera |
| 11,223,535 | B2 | 1/2022 | Parvathamvenkatas et al. |
| 11,467,753 | B2 | 10/2022 | Kilaru |
| 11,748,143 | B2 | 9/2023 | Kumar |
| 2002/0035511 | A1 | 3/2002 | Haji |
| 2002/0069369 | A1 | 6/2002 | Tremain |
| 2002/0083079 | A1 | 6/2002 | Meier et al. |
| 2002/0095609 | A1 | 7/2002 | Tokunaga |
| 2002/0129047 | A1 | 9/2002 | Cane |
| 2002/0129106 | A1 | 9/2002 | Gutfreund |
| 2002/0194033 | A1 | 12/2002 | Huff |
| 2002/0194511 | A1 | 12/2002 | Swoboda |
| 2003/0031127 | A1 | 2/2003 | Saleh et al. |
| 2003/0126494 | A1 | 7/2003 | Strasser |
| 2003/0140068 | A1 | 7/2003 | Yeung |
| 2003/0200222 | A1 | 10/2003 | Feinberg |
| 2003/0204597 | A1 | 10/2003 | Arakawa et al. |
| 2004/0030668 | A1 | 2/2004 | Pawlowski et al. |
| 2004/0030822 | A1 | 2/2004 | Rajan et al. |
| 2004/0210724 | A1 | 10/2004 | Koning et al. |
| 2004/0230899 | A1 | 11/2004 | Pagnano et al. |
| 2005/0060356 | A1 | 3/2005 | Saika |
| 2005/0076251 | A1 | 4/2005 | Barr |
| 2005/0080970 | A1 | 4/2005 | Jeyasingh et al. |
| 2005/0198303 | A1 | 9/2005 | Knauerhase et al. |
| 2005/0216788 | A1 | 9/2005 | Mani-Meitav et al. |
| 2005/0262097 | A1 | 11/2005 | Sim-Tang |
| 2005/0268121 | A1 | 12/2005 | Rothman et al. |
| 2005/0289414 | A1 | 12/2005 | Adya |
| 2006/0058994 | A1 | 3/2006 | Ravi |
| 2006/0101174 | A1 | 5/2006 | Kanamaru |
| 2006/0101189 | A1 | 5/2006 | Chandrasekaran et al. |
| 2006/0155712 | A1 | 7/2006 | Prahlad et al. |
| 2006/0184935 | A1 | 8/2006 | Abels et al. |
| 2006/0190775 | A1 | 8/2006 | Aggarwal et al. |
| 2006/0195715 | A1 | 8/2006 | Herington |
| 2006/0206507 | A1 | 9/2006 | Dahbour |
| 2006/0212481 | A1 | 9/2006 | Stacey et al. |
| 2006/0224846 | A1 | 10/2006 | Amarendran et al. |
| 2006/0225065 | A1 | 10/2006 | Chandhok et al. |
| 2006/0230136 | A1 | 10/2006 | Ma |
| 2006/0236073 | A1 | 10/2006 | Soules |
| 2006/0242356 | A1 | 10/2006 | Mogi et al. |
| 2006/0245411 | A1 | 11/2006 | Chen et al. |
| 2006/0251067 | A1 | 11/2006 | Desanti |
| 2006/0259908 | A1 | 11/2006 | Bayer |
| 2007/0027999 | A1 | 2/2007 | Allen et al. |
| 2007/0043870 | A1 | 2/2007 | Ninose |
| 2007/0073970 | A1 | 3/2007 | Yamazaki |
| 2007/0079156 | A1 | 4/2007 | Fujimoto |
| 2007/0100792 | A1 | 5/2007 | Lent et al. |
| 2007/0101173 | A1 | 5/2007 | Fung |
| 2007/0168606 | A1 | 7/2007 | Takai |
| 2007/0198802 | A1 | 8/2007 | Kavuri |
| 2007/0203938 | A1 | 8/2007 | Prahlad |
| 2007/0208918 | A1 | 9/2007 | Harbin et al. |
| 2007/0220319 | A1 | 9/2007 | Desai et al. |
| 2007/0234302 | A1 | 10/2007 | Suzuki |
| 2007/0239804 | A1 | 10/2007 | Armstrong et al. |
| 2007/0266056 | A1 | 11/2007 | Stacey et al. |
| 2007/0288536 | A1 | 12/2007 | Sen et al. |
| 2008/0005168 | A1 | 1/2008 | Huff et al. |
| 2008/0010521 | A1 | 1/2008 | Goodrum et al. |
| 2008/0059704 | A1 | 3/2008 | Kavuri |
| 2008/0071841 | A1 | 3/2008 | Okada et al. |
| 2008/0091655 | A1 | 4/2008 | Gokhale |
| 2008/0126833 | A1 | 5/2008 | Callaway et al. |
| 2008/0134177 | A1 | 6/2008 | Fitzgerald et al. |
| 2008/0147460 | A1 | 6/2008 | Ollivier |
| 2008/0162592 | A1 | 7/2008 | Huang |
| 2008/0183891 | A1 | 7/2008 | Ni et al. |
| 2008/0189468 | A1 | 8/2008 | Schmidt et al. |
| 2008/0195639 | A1 | 8/2008 | Freeman et al. |
| 2008/0228771 | A1 | 9/2008 | Prahlad |
| 2008/0228833 | A1 | 9/2008 | Kano |
| 2008/0229037 | A1 | 9/2008 | Bunte |
| 2008/0235479 | A1 | 9/2008 | Scales et al. |
| 2008/0243855 | A1 | 10/2008 | Prahlad |
| 2008/0243947 | A1 | 10/2008 | Kaneda |
| 2008/0244028 | A1 | 10/2008 | Le |
| 2008/0244032 | A1 | 10/2008 | Gilson |
| 2008/0244068 | A1 | 10/2008 | Iyoda et al. |
| 2008/0244177 | A1 | 10/2008 | Crescenti |
| 2008/0244577 | A1* | 10/2008 | Le ........................ G06F 9/45558 718/1 |
| 2008/0250407 | A1 | 10/2008 | Dadhia et al. |
| 2008/0256384 | A1 | 10/2008 | Branson et al. |
| 2008/0270461 | A1 | 10/2008 | Gordon |
| 2008/0270564 | A1 | 10/2008 | Rangegowda et al. |
| 2008/0275924 | A1 | 11/2008 | Fries |
| 2008/0282253 | A1 | 11/2008 | Huizenga |
| 2008/0301479 | A1 | 12/2008 | Wood |
| 2008/0313371 | A1 | 12/2008 | Kedem et al. |
| 2009/0006733 | A1 | 1/2009 | Gold et al. |
| 2009/0037680 | A1 | 2/2009 | Colbert et al. |
| 2009/0077443 | A1 | 3/2009 | Nguyen et al. |
| 2009/0113109 | A1 | 4/2009 | Nelson et al. |
| 2009/0144416 | A1 | 6/2009 | Chatley |
| 2009/0157882 | A1 | 6/2009 | Kashyap |
| 2009/0198677 | A1 | 8/2009 | Sheehy |
| 2009/0198825 | A1 | 8/2009 | Miller |
| 2009/0210427 | A1 | 8/2009 | Eidler et al. |
| 2009/0210458 | A1 | 8/2009 | Glover et al. |
| 2009/0210464 | A1 | 8/2009 | Chiang-Lin |
| 2009/0216816 | A1 | 8/2009 | Basler |
| 2009/0222496 | A1 | 9/2009 | Liu et al. |
| 2009/0228669 | A1 | 9/2009 | Siesarev et al. |
| 2009/0240904 | A1 | 9/2009 | Austruy et al. |
| 2009/0248762 | A1 | 10/2009 | Prahlad et al. |
| 2009/0249005 | A1 | 10/2009 | Bender et al. |
| 2009/0268903 | A1 | 10/2009 | Bojinov et al. |
| 2009/0282020 | A1 | 11/2009 | McSheffrey |
| 2009/0282404 | A1 | 11/2009 | Khandekar |
| 2009/0287665 | A1 | 11/2009 | Prahlad |
| 2009/0300023 | A1 | 12/2009 | Vaghani |
| 2009/0300057 | A1 | 12/2009 | Friedman |
| 2009/0307166 | A1 | 12/2009 | Routray et al. |
| 2009/0313260 | A1 | 12/2009 | Mimatsu |
| 2009/0313447 | A1 | 12/2009 | Nguyen et al. |
| 2009/0313503 | A1 | 12/2009 | Atluri et al. |
| 2009/0319534 | A1 | 12/2009 | Gokhale |
| 2009/0319585 | A1 | 12/2009 | Gokhale |
| 2009/0320029 | A1 | 12/2009 | Kottomtharayil |
| 2009/0320137 | A1 | 12/2009 | White et al. |

(56) References Cited

U.S. PATENT DOCUMENTS

| | | | |
|---|---|---|---|
| 2009/0327477 | A1 | 12/2009 | Madison, Jr. |
| 2010/0011178 | A1 | 1/2010 | Feathergill |
| 2010/0017647 | A1 | 1/2010 | Callaway et al. |
| 2010/0023722 | A1 | 1/2010 | Tabbara |
| 2010/0030984 | A1 | 2/2010 | Erickson |
| 2010/0049929 | A1 | 2/2010 | Nagarkar et al. |
| 2010/0049930 | A1 | 2/2010 | Pershin |
| 2010/0064033 | A1 | 3/2010 | Travostino |
| 2010/0070448 | A1 | 3/2010 | Omoigui |
| 2010/0070466 | A1 | 3/2010 | Prahlad |
| 2010/0070474 | A1 | 3/2010 | Lad |
| 2010/0070725 | A1 | 3/2010 | Prahlad |
| 2010/0070726 | A1 | 3/2010 | Ngo et al. |
| 2010/0082672 | A1 | 4/2010 | Kottomtharayil |
| 2010/0082700 | A1 | 4/2010 | Parab |
| 2010/0082713 | A1 | 4/2010 | Frid-Nielsen et al. |
| 2010/0094948 | A1 | 4/2010 | Ganesh et al. |
| 2010/0106691 | A1 | 4/2010 | Preslan et al. |
| 2010/0107158 | A1 | 4/2010 | Chen et al. |
| 2010/0107172 | A1 | 4/2010 | Calinescu et al. |
| 2010/0161919 | A1 | 6/2010 | Dodgson et al. |
| 2010/0162002 | A1 | 6/2010 | Dodgson et al. |
| 2010/0186014 | A1 | 7/2010 | Vaghani et al. |
| 2010/0190478 | A1 | 7/2010 | Brewer |
| 2010/0211829 | A1 | 8/2010 | Ziskind et al. |
| 2010/0228913 | A1 | 9/2010 | Czezatke et al. |
| 2010/0235333 | A1 | 9/2010 | Bates |
| 2010/0242096 | A1 | 9/2010 | Varadharajan et al. |
| 2010/0257403 | A1 | 10/2010 | Virk |
| 2010/0257523 | A1 | 10/2010 | Frank |
| 2010/0262586 | A1 | 10/2010 | Rosikiewicz et al. |
| 2010/0262794 | A1 | 10/2010 | De Beer et al. |
| 2010/0269164 | A1 | 10/2010 | Sosnosky et al. |
| 2010/0274772 | A1 | 10/2010 | Samuels |
| 2010/0280999 | A1 | 11/2010 | Atluri et al. |
| 2010/0299309 | A1 | 11/2010 | Maki et al. |
| 2010/0299666 | A1 | 11/2010 | Agbaria et al. |
| 2010/0306173 | A1 | 12/2010 | Frank |
| 2010/0306486 | A1 | 12/2010 | Balasubramanian et al. |
| 2010/0318782 | A1 | 12/2010 | Auradkar et al. |
| 2010/0325471 | A1 | 12/2010 | Mishra et al. |
| 2010/0325727 | A1 | 12/2010 | Neystad et al. |
| 2010/0332401 | A1 | 12/2010 | Prahlad |
| 2010/0332454 | A1 | 12/2010 | Prahlad |
| 2010/0332456 | A1 | 12/2010 | Prahlad |
| 2010/0332479 | A1 | 12/2010 | Prahlad |
| 2010/0332629 | A1 | 12/2010 | Cotugno et al. |
| 2010/0332818 | A1 | 12/2010 | Prahlad |
| 2010/0333100 | A1 | 12/2010 | Miyazaki et al. |
| 2010/0333116 | A1 | 12/2010 | Prahlad |
| 2011/0004586 | A1 | 1/2011 | Cherryholmes et al. |
| 2011/0010515 | A1 | 1/2011 | Ranade |
| 2011/0010518 | A1 | 1/2011 | Kavuri et al. |
| 2011/0016467 | A1 | 1/2011 | Kane |
| 2011/0022642 | A1 | 1/2011 | DeMilo et al. |
| 2011/0022811 | A1 | 1/2011 | Kirihata et al. |
| 2011/0023114 | A1 | 1/2011 | Diab et al. |
| 2011/0035620 | A1 | 2/2011 | Elyashev et al. |
| 2011/0040824 | A1 | 2/2011 | Harm |
| 2011/0047541 | A1 | 2/2011 | Yamaguchi et al. |
| 2011/0055161 | A1 | 3/2011 | Wolfe |
| 2011/0061045 | A1 | 3/2011 | Phillips |
| 2011/0072430 | A1 | 3/2011 | Mani |
| 2011/0087632 | A1 | 4/2011 | Subramanian et al. |
| 2011/0107025 | A1 | 5/2011 | Urkude |
| 2011/0107331 | A1 | 5/2011 | Evans |
| 2011/0161299 | A1 | 6/2011 | Prahlad |
| 2011/0179414 | A1 | 7/2011 | Goggin et al. |
| 2011/0185355 | A1 | 7/2011 | Chawla |
| 2011/0191544 | A1 | 8/2011 | Naga et al. |
| 2011/0191559 | A1 | 8/2011 | Li et al. |
| 2011/0202728 | A1 | 8/2011 | Nichols et al. |
| 2011/0202734 | A1 | 8/2011 | Dhakras et al. |
| 2011/0208928 | A1 | 8/2011 | Chandra et al. |
| 2011/0213754 | A1 | 9/2011 | Bindal |
| 2011/0219144 | A1 | 9/2011 | Amit et al. |
| 2011/0225277 | A1 | 9/2011 | Freimuth et al. |
| 2011/0239013 | A1 | 9/2011 | Muller |
| 2011/0246430 | A1 | 10/2011 | Prahlad et al. |
| 2011/0252208 | A1 | 10/2011 | Ali et al. |
| 2011/0264786 | A1 | 10/2011 | Kedem et al. |
| 2011/0276713 | A1 | 11/2011 | Brand |
| 2011/0277027 | A1 | 11/2011 | Hayton et al. |
| 2012/0016840 | A1 | 1/2012 | Lin et al. |
| 2012/0017027 | A1 | 1/2012 | Baskakov et al. |
| 2012/0017043 | A1 | 1/2012 | Aizman et al. |
| 2012/0017114 | A1 | 1/2012 | Timashev et al. |
| 2012/0023233 | A1 | 1/2012 | Okamoto et al. |
| 2012/0054626 | A1 | 3/2012 | Odenheimer |
| 2012/0054736 | A1 | 3/2012 | Arcese et al. |
| 2012/0072685 | A1 | 3/2012 | Otani |
| 2012/0079221 | A1 | 3/2012 | Sivasubramanian |
| 2012/0084262 | A1 | 4/2012 | Dwarampudi et al. |
| 2012/0084769 | A1 | 4/2012 | Adi et al. |
| 2012/0096149 | A1 | 4/2012 | Sunkara et al. |
| 2012/0110186 | A1 | 5/2012 | Kapur et al. |
| 2012/0110328 | A1 | 5/2012 | Pate |
| 2012/0131295 | A1 | 5/2012 | Nakajima |
| 2012/0131578 | A1 | 5/2012 | Ciano et al. |
| 2012/0131645 | A1 | 5/2012 | Harm |
| 2012/0136832 | A1 | 5/2012 | Sadhwani |
| 2012/0150815 | A1 | 6/2012 | Parfumi |
| 2012/0150818 | A1 | 6/2012 | Vijayan Retnamma et al. |
| 2012/0150826 | A1 | 6/2012 | Vijayan Retnamma |
| 2012/0151084 | A1 | 6/2012 | Stathopoulos et al. |
| 2012/0159232 | A1 | 6/2012 | Shimada et al. |
| 2012/0167083 | A1 | 6/2012 | Suit |
| 2012/0209812 | A1 | 8/2012 | Bezbaruah |
| 2012/0221843 | A1 | 8/2012 | Bak et al. |
| 2012/0233285 | A1 | 9/2012 | Suzuki |
| 2012/0240183 | A1 | 9/2012 | Sinha |
| 2012/0254119 | A1 | 10/2012 | Kumarasamy et al. |
| 2012/0254364 | A1 | 10/2012 | Vijayan |
| 2012/0254824 | A1 | 10/2012 | Bansod |
| 2012/0278287 | A1 | 11/2012 | Wilk |
| 2012/0278571 | A1 | 11/2012 | Fleming et al. |
| 2012/0278799 | A1 | 11/2012 | Starks et al. |
| 2012/0290802 | A1 | 11/2012 | Wade et al. |
| 2012/0324183 | A1 | 12/2012 | Chiruvolu et al. |
| 2012/0331248 | A1 | 12/2012 | Kono et al. |
| 2013/0007245 | A1 | 1/2013 | Malik et al. |
| 2013/0024641 | A1 | 1/2013 | Talagala et al. |
| 2013/0024722 | A1 | 1/2013 | Kotagiri |
| 2013/0035795 | A1 | 2/2013 | Pfeiffer et al. |
| 2013/0036418 | A1 | 2/2013 | Yadappanavar et al. |
| 2013/0042234 | A1 | 2/2013 | Deluca et al. |
| 2013/0054533 | A1 | 2/2013 | Hao et al. |
| 2013/0061014 | A1 | 3/2013 | Prahlad |
| 2013/0074181 | A1 | 3/2013 | Singh |
| 2013/0080841 | A1 | 3/2013 | Reddy et al. |
| 2013/0086580 | A1 | 4/2013 | Simonsen et al. |
| 2013/0117744 | A1 | 5/2013 | Klein et al. |
| 2013/0125198 | A1 | 5/2013 | Ferguson et al. |
| 2013/0173771 | A1 | 7/2013 | Ditto et al. |
| 2013/0204849 | A1 | 8/2013 | Chacko |
| 2013/0227558 | A1 | 8/2013 | Du et al. |
| 2013/0232215 | A1 | 9/2013 | Gupta et al. |
| 2013/0232480 | A1 | 9/2013 | Winterfeldt et al. |
| 2013/0238562 | A1 | 9/2013 | Kumarasamy |
| 2013/0238572 | A1 | 9/2013 | Prahlad |
| 2013/0238969 | A1 | 9/2013 | Smith |
| 2013/0262385 | A1 | 10/2013 | Kumarasamy et al. |
| 2013/0262390 | A1 | 10/2013 | Kumarasamy |
| 2013/0262638 | A1 | 10/2013 | Kumarasamy et al. |
| 2013/0262801 | A1 | 10/2013 | Sancheti |
| 2013/0268931 | A1 | 10/2013 | O'Hare et al. |
| 2013/0290267 | A1 | 10/2013 | Dwarampudi et al. |
| 2013/0297902 | A1 | 11/2013 | Collins et al. |
| 2013/0311429 | A1 | 11/2013 | Agetsuma |
| 2013/0326260 | A1 | 12/2013 | Wei et al. |
| 2013/0326279 | A1 | 12/2013 | Chavda et al. |
| 2014/0006858 | A1 | 1/2014 | Helfman et al. |
| 2014/0007097 | A1 | 1/2014 | Chin et al. |
| 2014/0007181 | A1 | 1/2014 | Sarin et al. |

(56) References Cited

U.S. PATENT DOCUMENTS

2014/0052892 A1 2/2014 Klein et al.
2014/0059306 A1 2/2014 Bender et al.
2014/0059380 A1 2/2014 Krishnan
2014/0075440 A1 3/2014 Prahlad et al.
2014/0089266 A1 3/2014 Une et al.
2014/0095816 A1 4/2014 Hsu et al.
2014/0115285 A1 4/2014 Arcese et al.
2014/0136803 A1 5/2014 Qin
2014/0156684 A1 6/2014 Zaslavsky et al.
2014/0181038 A1 6/2014 Pawar et al.
2014/0181044 A1 6/2014 Pawar et al.
2014/0181046 A1 6/2014 Pawar et al.
2014/0188803 A1 7/2014 James et al.
2014/0189432 A1 7/2014 Gokhale
2014/0196038 A1 7/2014 Kottomtharavil et al.
2014/0196039 A1 7/2014 Kottomtharayil et al.
2014/0201150 A1 7/2014 Kumarasamy
2014/0201151 A1 7/2014 Kumarasamy
2014/0201157 A1 7/2014 Pawar et al.
2014/0201162 A1 7/2014 Kumarasamy
2014/0201170 A1 7/2014 Vijayan
2014/0237537 A1 8/2014 Manmohan et al.
2014/0244610 A1 8/2014 Raman et al.
2014/0259015 A1 9/2014 Chigusa et al.
2014/0278530 A1 9/2014 Bruce et al.
2014/0282514 A1 9/2014 Carson et al.
2014/0283010 A1 9/2014 Rutkowski et al.
2014/0330874 A1 11/2014 Novak et al.
2014/0337295 A1 11/2014 Haselton et al.
2014/0344323 A1 11/2014 Pelavin et al.
2014/0372384 A1 12/2014 Long et al.
2014/0380014 A1 12/2014 Moyer
2015/0058382 A1 2/2015 St. Laurent et al.
2015/0067393 A1 3/2015 Madani et al.
2015/0074536 A1 3/2015 Varadharajan et al.
2015/0113055 A1 4/2015 Vijayan et al.
2015/0120928 A1 4/2015 Gummaraju et al.
2015/0121122 A1 4/2015 Towstopiat et al.
2015/0127967 A1 5/2015 Dutton et al.
2015/0134607 A1 5/2015 Magdon-Ismail et al.
2015/0142745 A1 5/2015 Tekade et al.
2015/0160884 A1 6/2015 Scales et al.
2015/0161015 A1 6/2015 Kumarasamy et al.
2015/0163172 A1 6/2015 Mudigonda et al.
2015/0198995 A1 7/2015 Muller et al.
2015/0212895 A1 7/2015 Pawar et al.
2015/0227438 A1 8/2015 Jaquette
2015/0227602 A1 8/2015 Ramu
2015/0242283 A1 8/2015 Simoncelli et al.
2015/0248333 A1 9/2015 Aravot
2015/0293817 A1 10/2015 Subramanian et al.
2015/0317216 A1 11/2015 Hsu et al.
2015/0347165 A1 12/2015 Lipchuk et al.
2015/0347430 A1 12/2015 Ghosh
2015/0363413 A1 12/2015 Ghosh
2015/0370652 A1 12/2015 He et al.
2015/0378758 A1 12/2015 Duggan et al.
2015/0378771 A1 12/2015 Tarasuk-Levin
2015/0378833 A1 12/2015 Misra et al.
2015/0378849 A1 12/2015 Liu et al.
2015/0379038 A1* 12/2015 Nikolov .............. G06F 11/1448 707/622
2015/0381711 A1 12/2015 Singh et al.
2016/0006829 A1 1/2016 Ishii et al.
2016/0019317 A1 1/2016 Pawar et al.
2016/0042090 A1 2/2016 Mitkar et al.
2016/0070623 A1 3/2016 Derk
2016/0092467 A1 3/2016 Lee et al.
2016/0100013 A1 4/2016 Vijayan et al.
2016/0132400 A1 5/2016 Pawar
2016/0154709 A1* 6/2016 Mitkar .................... G06F 11/00 707/649
2016/0170844 A1 6/2016 Long et al.
2016/0188413 A1 6/2016 Abali et al.
2016/0202916 A1 7/2016 Cui et al.
2016/0210202 A1 7/2016 Sinha
2016/0283335 A1 9/2016 Yao et al.
2016/0306706 A1 10/2016 Pawar et al.
2016/0308722 A1 10/2016 Kumarasamy et al.
2016/0335007 A1 11/2016 Ryu et al.
2016/0350391 A1 12/2016 Vijayan et al.
2017/0039218 A1 2/2017 Prahlad
2017/0090972 A1 3/2017 Ryu et al.
2017/0123939 A1 5/2017 Maheshwari et al.
2017/0126807 A1 5/2017 Vijayan et al.
2017/0168903 A1 6/2017 Dornemann et al.
2017/0185488 A1 6/2017 Kumarasamy et al.
2017/0192866 A1 7/2017 Vijayan
2017/0193003 A1 7/2017 Vijayan et al.
2017/0235647 A1 8/2017 Kilaru et al.
2017/0242871 A1 8/2017 Kilaru et al.
2017/0249220 A1 8/2017 Kumarasamy et al.
2017/0262204 A1* 9/2017 Dornemann ........ G06F 11/1438
2017/0262347 A1 9/2017 Dornemann
2017/0262350 A1 9/2017 Dornemann
2017/0264589 A1 9/2017 Hunt et al.
2017/0286230 A1 10/2017 Zamir
2017/0286234 A1 10/2017 Shulga et al.
2017/0371547 A1 12/2017 Fruchtman et al.
2017/0371749 A1 12/2017 Devitt-Carolan et al.
2018/0067955 A1 3/2018 Pawar
2018/0075166 A1 3/2018 Pawar
2018/0089031 A1 3/2018 Mitkar et al.
2018/0095845 A1 4/2018 Sanakkayala
2018/0095846 A1 4/2018 Sanakkayala
2018/0095855 A1 4/2018 Sanakkayala
2018/0113623 A1 4/2018 Sancheti
2018/0137139 A1* 5/2018 Bangalore ............. G06F 16/113
2018/0143879 A1 5/2018 Dornemann
2018/0143880 A1 5/2018 Dornemann
2018/0173454 A1 6/2018 Dornemann
2018/0181598 A1 6/2018 Pawar et al.
2018/0253192 A1 9/2018 Varadharajan et al.
2018/0253361 A1* 9/2018 Dhatrak .............. G06F 11/1469
2018/0260157 A1 9/2018 Dornemann
2018/0275913 A1 9/2018 Mitkar
2018/0276022 A1 9/2018 Mitkar et al.
2018/0276083 A1 9/2018 Mitkar et al.
2018/0276084 A1 9/2018 Mitkar et al.
2018/0276085 A1 9/2018 Mitkar et al.
2018/0284986 A1 10/2018 Bhagi
2018/0285202 A1 10/2018 Bhagi et al.
2018/0285353 A1 10/2018 Ramohalli Gopala Rao et al.
2018/0285383 A1 10/2018 Nara et al.
2018/0300168 A1 10/2018 Deshpande
2018/0307510 A1 10/2018 Kottomtharayil
2018/0314694 A1 11/2018 Dornemann
2018/0329636 A1 11/2018 Dornemann et al.
2018/0375938 A1 12/2018 Vijayan et al.
2019/0012339 A1 1/2019 Kumarasamy et al.
2019/0026187 A1 1/2019 Gulam et al.
2019/0065069 A1 2/2019 Sancheti
2019/0090305 A1 3/2019 Hunter et al.
2019/0108341 A1 4/2019 Bedhapudi et al.
2019/0179805 A1 6/2019 Prahlad et al.
2019/0182325 A1 6/2019 Vijayan et al.
2019/0235900 A1* 8/2019 Singh .................... G06F 3/0607
2019/0278662 A1 9/2019 Nagrale
2019/0303246 A1 10/2019 Gokhale et al.
2019/0334909 A1* 10/2019 Schmitt ................. G06F 9/5072
2019/0340088 A1 11/2019 Sanakkayala et al.
2019/0347120 A1 11/2019 Kottomtharayil et al.
2019/0369901 A1 12/2019 Dornemann et al.
2019/0384679 A1 12/2019 Parambil et al.
2019/0391742 A1 12/2019 Bhagi
2020/0034248 A1 1/2020 Nara et al.
2020/0034252 A1 1/2020 Mitkar et al.
2020/0073574 A1 3/2020 Pradhan
2020/0117641 A1 4/2020 Mitkar et al.
2020/0142612 A1 5/2020 Dornemann
2020/0142782 A1 5/2020 Dornemann
2020/0142783 A1 5/2020 Dornemann
2020/0162551 A1 5/2020 Vijayan et al.
2020/0174894 A1 6/2020 Dornemann

(56) References Cited

U.S. PATENT DOCUMENTS

| | | | |
|---|---|---|---|
| 2020/0174895 | A1 | 6/2020 | Dornemann |
| 2020/0183728 | A1 | 6/2020 | Deshpande et al. |
| 2020/0265024 | A1 | 8/2020 | Pawar et al. |
| 2020/0278915 | A1 | 9/2020 | Degaonkar et al. |
| 2020/0319694 | A1 | 10/2020 | Mohanty et al. |
| 2020/0349027 | A1 | 11/2020 | Bansod et al. |
| 2020/0394107 | A1 | 12/2020 | Rao et al. |
| 2020/0401485 | A1 | 12/2020 | Mitkar et al. |
| 2020/0409741 | A1 | 12/2020 | Dornemann et al. |
| 2021/0026982 | A1 | 1/2021 | Amarendran et al. |
| 2021/0037112 | A1 | 2/2021 | Ankireddypalle et al. |
| 2021/0049079 | A1 | 2/2021 | Kumar et al. |
| 2021/0064485 | A1 | 3/2021 | Rana |
| 2021/0075768 | A1 | 3/2021 | Polimera et al. |
| 2021/0089215 | A1 | 3/2021 | Ashraf et al. |
| 2021/0173744 | A1 | 6/2021 | Agrawal et al. |
| 2021/0208981 | A1 | 7/2021 | Karasev et al. |
| 2021/0255771 | A1 | 8/2021 | Kilaru et al. |
| 2021/0271564 | A1 | 9/2021 | Mitkar et al. |
| 2021/0286639 | A1 | 9/2021 | Kumar |
| 2021/0357132 | A1 | 11/2021 | Kumar et al. |
| 2021/0397522 | A1 | 12/2021 | Owen et al. |
| 2022/0066669 | A1 | 3/2022 | Naik et al. |
| 2022/0210243 | A1 | 6/2022 | Ankireddypalle et al. |
| 2022/0222104 | A1 | 7/2022 | Dornemann et al. |
| 2022/0229559 | A1 | 7/2022 | Kilaru et al. |
| 2023/0124827 | A1 | 4/2023 | Dornemann |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0817040 | 1/1998 |
| EP | 0899662 | 3/1999 |
| EP | 0981090 | 2/2000 |
| WO | 9513580 | 5/1995 |
| WO | 9912098 | 3/1999 |
| WO | 2006052872 | 5/2006 |

OTHER PUBLICATIONS

Celesti et al., "Improving Virtual Machine Migration in Federated Cloud Environments", 2010, pp. 61-67.
Chan, et al., "An Approach to High Availability for Cloud Servers with Snapshot Mechanism," 2012, pp. 1-6.
Chervenak, et al., "Protecting File Systems—A Survey of Backup Techniques," 1998, pp. 17-31.
CommVault Systems, Inc., "Enhanced Protection and Manageability of Virtual Servers," Partner Solution Brief, 2008, 6 pages.
Data Protection for Large Vmware and Vblock Environments Using EMC Avamar Applied Technology, Nov. 2010, EMC Corporation, 26 pages.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Versions Compared," Petri IT Knowledgebase, <http://www.petri.co.il/virtual_vmware_versions_compared.htm>, internet accessed on Apr. 28, 2008, 6 pages.
Eldos Callback File System product information from https://www.eldos.com/clients/104-345.php retrieved on Dec. 30, 2016 in 2 pages.
Eldos Usermode filesystem for your Windows applications—Callback File System® (CBFS®)—Create and manage virtual filesystems and disks from your Windows applications retrieved from https://eldos.com/cbfs on Dec 30, 2016 in 4 pages.
Granger, et al., "Survivable Storage Systems", 2001, pp. 184-195.
Haselhorst, et al., "Efficient Storage Synchronization for Live Migration in Cloud Infrastructures", 2011, pp. 511-518.
Hirofuchi, Takahiro et al. "A Live Storage Migration Mechanism Over WAN for Relocatable Virtual Machine Services on Clouds." Proceedings of the 2009 9th IEEE/ACM International Symposium on Cluster Computing and the Grib. IEEE Computer Society, 2009, 7 pages.
Hu, Wenjin et al., "A Quantitative Study of Virtual Machine Live Migration," 2013, pp. 1-10.
International Search Report and Written Opinion for PCT/US2011/054374, dated May 2, 2012, in 7 pages.
Ismail et al., "Architecture of Scalable Backup Service for Private Cloud", IEEE Conference on Open Systems (ICOS), 2013, pp. 174-179.
Jander, "Launching Storage-Area Net," Data Communications, US, McGraw Hill, NY, vol. 27, No. 4 (Mar. 21, 1998), pp. 64-72.
Javaraiah, et al., "Backup for Cloud and Disaster Recovery for Consumers and SMBs," 2008, pp. 1-3.
Kim, et al., "Availability Modeling and Analysis of a Virtualized System," 2009, pp. 365-371.
Kuo, et al., "A Hybrid Cloud Storage Architecture for Service Operational High Availability", 2013, pp. 487-492.
Li et al. "Comparing Containers versus Virtual Machines for Achieving High Availability" 2015 IEEE, pp. 353-358.
Liang, et al., "A virtual disk environment for providing file system recovery", 2006, pp. 589-599.
Lu et al.. "Virtual Machine Memory Access Tracing with Hypervisor Exclusive Cache", Usenix Annual Technical Conference, 2007, pp. 29-43.
Mao, et al., "Read-Performance Optimization for Deduplication-Based Storage Systems in the Cloud", 2014, pp. 1-22.
Microsoft Corporation, "How NTFS Works," Windows Server TechCenter, <http://technet2.mircrosoft.com/windowsserver/en/library/8cc5891d-bf8e-4164-862d-dac5418c5948 . . . >, updated Mar. 28, 2003, internet accessed Mar. 26, 2008, 26 pages.
Reingold, B. et al., "Cloud Computing: The Intersection of Massive Scalability, Data Security and Privacy (Part I)," LegalWorks, 2009, 5 pages.
Sanbarrow.com, "Files Used by a VM," <http://sanbarrow.com/vmx/vmx-files-used-by-a-vm.html>, internet accessed on Jul. 22, 2008, 2 pages.
Somasundaram et al., Information Storage and Management. 2009, pp. 251-281.
Tran, et al., "Efficient Cooperative Backup with Decentralized Trust Management", 2012, pp. 1-25.
Travostino, et al., "Seamless live migration of virtual machines over the MAN/WAN", 2006, pp. 901-907.
Vaghani, "Virtual Machine File System", 2010, pp. 57-70.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, accessed Apr. 30, 2014, 11 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/ doc/disks.sub.--types.sub.--gsx.ht- ml>, internet accessed on Mar. 25, 2008, 2 pages.
VMware, Inc., "VMware Solution Exchange (VSX)" <http://www.vmware.com/appliances/learn/ovfhtml>, 2014, 3 pages.
VMware, Inc., "VMware Workstation 5.0, Snapshots in a Process Tree," <http://www.vmware.com/support/ws5/doc/ws.sub.--preserve.sub.--sshot.s- ub.--tree.html>, internet accessed on Mar. 25, 2008, 1 page.

(56) References Cited

OTHER PUBLICATIONS

VMware, Inc., "VMware Workstation 5.5, What Files Make Up a Virtual Machine?" <http://www.vmware.com/support/ws55/doc/ws.sub.--learning.su- b.--files.sub.--in.sub.--a.sub.--vm.html>, internet accessed on Mar. 25, 2008, 2 pages.
Vrable, et al., "Cumulus: Filesystem Backup to the Cloud", 2009, pp. 1-28.
Wikipedia, "File Allocation Table," <http://en.wikipedia.org/wiki/File.sub.--Allocation.sub.--Table>, internet accessed on Jul. 25, 2008, 19 pages.
Wikipedia, "Logical Volume Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http:/en.wikipedia.org/wikiNirtualization>, internet accessed Mar. 18, 2008, 7 pages.
Wikipedia, Cloud Computing, en.wikipedia.org/wiki/Cloud_computing, accessed on Apr. 26, 2019, 13 Pages.
Yang, et al., "Toward Reliable Data Delivery for Highly Dynamic Mobile Ad Hoc Networks," 2012, pp. 111-124.
Yoshida et al., "Orthros: A High-Reliability Operating System with Transmigration of Processes," 2013, pp. 318-327.
Zhao, et al., "Adaptive Distributed Load Balancing Algorithm based on Live Migration of Virtual Machines in Cloud", 2009, pp. 170-175.
Google Cloud Regions and Zones, accessed on https://cloud.google.com/compute/docs/regions-zones/, Apr. 26, 2019, available on https://web.archive.org/web/20190415102759/cloud.google.com/compute/docs/regions-zones/, Dec. 4, 2023, 30 pages.
Margaret Rouse, "Definition of Availability Zones", TechTarget, accessed on searchaws.techtarget.com/definition/availability-zones, Apr. 26, 2019, available on https://web.archive.org/web/20180911194556/https://searchaws.techtarget.com/definition/availability-zones, Dec. 4, 2023, 5 pages.
Mell et al., The NIST Definition of Cloud Computing, 800-145, Sep. 2011, 7 pages.
Watts et al. "SaaS vs PaaS vs IaaS: What's The Difference & How to Choose", BMC Blogs, BMC Software, Inc., accessed on https://www.bmccom/blogs/saas-vs-paas-vs-iaas-whats-the-difference-and-how-to-choose/, Jun. 15, 2019, 18 Pages.
Armstead et al., "Implementation of a Campus-wide Distributed Mass Storage Service: The Dream vs. Reality," IEEE, Sep. 11-14, 1995, pp. 190-199.
Bates, S. et al., "Sharepoint 2007 User's Guide," pp. 1-88, 2007, Springer-Verlag New York, Inc., 104 pages.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Chen et al., "When Virtual Is Better Than Real", IEEE 2001, pp. 133-138.
Chiappetta, Marco, "ESA Enthusiast System Architecture," <http://hothardware.com/Articles/NVIDIA_ESA_Enthusiast_System_Architecture/>, Nov. 5, 2007, 2 pages.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, accessed Apr. 30, 2014, 1 page.
Cully, et al., "Remus: High Availability via Asynchronous Virtual Machine Replication", 2008, pp. 161-174.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, 7 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.
Deng, et al., "Fast Saving and Restoring Virtual Machines with Page Compression", 2011, pp. 150-157.
Eitel, "Backup and Storage Management in Distributed Heterogeneous Environments," IEEE, Jun. 12-16, 1994, pp. 124-126.
Fraser et al., "Safe Hardware Access With the Xen Virtual Machine Monitor", 1st Workshop on Operating System and Architectural Support for the demand IT Infrastructure (OASIS), 2004, pp. 1-10.
Galan et al. "Service Specification in Cloud Environments Based on Extension to Oper Standards" Comsware 09 Jun. 16-19 Dublin, Ireland ACM, 12 Pages.
Gibson, et al., "Implementing Preinstallation Environment Media for Use in User Support," 2007, pp. 129-130.
Gupta, et al., "GPFS-SNC: An enterprise storage framework for virtual-machine clouds", 2011, pp. 1-10.
Hirofuchi, et al., "Enabling Instantaneous Relocation of Virtual Machines with a Lightweight VMM Extension", 2010, pp. 73-83.
Hu, et al., "Virtual Machine based Hot-spare Fault-tolerant System", 2009, pp. 429-432.
Huff, KL, "Data Set Usage Sequence Number," IBM Technical Disclosure Bulletin, vol. 24, No. 5, Oct. 1981 New York, US, pp. 2404-2406.
Ibrahim, Shadi et al., "Cloudlet: Towards MapReduce Implementation on Virtual Machines," 2009, pp. 65-66.
International Preliminary Report on Patentability and Written Opinion for PCT/US2011/054374, dated Apr. 11, 2013, 6 pages.
Jhawar et al., "Fault Tolerance Management in Cloud Computing: A System-Level Perspective", IEEE Systems Journal, vol. 7, No. 2, 2013, pp. 288-297.
Jo, et al., "Efficient Live Migration of Virtual Machines Using Shared Storage", 2013, pp. 1-10.
Kashyap "RLC—A Reliable approach to Fast and Efficient Live Migration of Virtual Machines in the Clouds" IEEE 2014 IEEE Computer Society, pp. 360-367.
Migrate a Virtual Machine with Storage vMotion in the vSphere Client. http://pubs.vmware.com/vsphere-51/advanced/print/jsp?topic=/com.vmware.vsphere.vcent . . . Retrieved Aug. 12, 2014; 2 pages.
Nance et al., "Virtual Machine Introspection: Observation or Interference?", 2008 IEEE, pp. 32-37.
Ng, Chun-Ho et al., "Live Deduplication Storage of Virtual Machine Images in an Open-Source Cloud," 2011, pp. 80-99.
Nicolae, Bogdan et al., "A Hybrid Local Storage Transfer Scheme for Live Migration of 1/0 Intensive Workloads," 2012, pp. 85-96.
Rosenblum et al., "The Design and Implementation of a Log-Structure File System," Operating Systems Review SIGOPS, vol. 25, No. 5, May 1991, New York, US, pp. 1-14.
Sanbarrow.com, "Disktype-table," <http://sanbarrow.com/vmdk/disktypes.html>, internet accessed on Jul. 22, 2008, 4 pages.
Sanbarrow.com, "Monolithic Versus Split Disks," <http://sanbarrow.com/vmdk/monolithicversusspllit.html>, internet accessed on Jul. 14, 2008, 2 pages.
Tudoran, Radu et al., "Adaptive File Management for Scientific Workflows on the Azure Cloud," 2013, pp. 273-281.
VMware Storage VMotion—Non-Disruptive Live Migration for Virtual Machine Storage Disk Files. Copyright 2009 VMware, Inc.; 2 pages.
VMware, Inc., "Open Virtual Machine Format," <http://www.vmware.com/appliances/learn/ovfhtml>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "Using VMware Infrastructure for Backup and Restore," Best Practices, <http://www.vmware.com>, accessed Apr. 30, 2014, 2006, 20 pages.

(56) References Cited

OTHER PUBLICATIONS

VMware, Inc., "Virtual Disk API Programming Guide," <http://www.vmware.com>, Revision Apr. 11, 2008, 2008, 44 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http:/www.vmware.com/support/ws5/doc/ws.sub.--preserve.sub.--sshot.su- b.--linear.html>, internet accessed on Mar. 25, 2008, 1 page.
VSphere Storage vMotion: Storage Management & Virtual Machine Migration. http://www.vmware.com/products / vsphere/features/storage-vmotion. Retrieved Aug. 12, 2014; 6 pages.
Wikipedia, "Cluster (file system)," <http://en.wikipedia.org/wiki/Cluster.sub.--%,28file.sub.--system%29>- ;, internet accessed Jul. 25, 2008, 1 page.
Wikipedia, "Cylinder-head-sector," <http://en.wikipedia.org/wiki/Cylinder-head-sector>, Jan. 4, 2009, 6 pages.
Wikipedia, "Logical Disk Manager," <http://en.wikipedia.org/wiki/Logical_Disk_Manager>, internet accessed Mar. 26, 2008, 3 pages.
Wood, et al., "Disaster Recovery as a Cloud Service: Economic Benefits & Deployment Challenges", 2010, pp. 1-7.
Yang, et al., "TRAP-Array: A Disk Array Architecture Providing Timely Recovery to Any Point-in-time," 2006, pp. 1-12.
Zhao, et al., "Supporting Application-Tailored Grid File System Sessions with WSRF-Based Services", Advanced Computing and Information Systems Laboratory (ACIS), 2005, pp. 24-33.

* cited by examiner

VM Live Mount In A Public Cloud - Overview

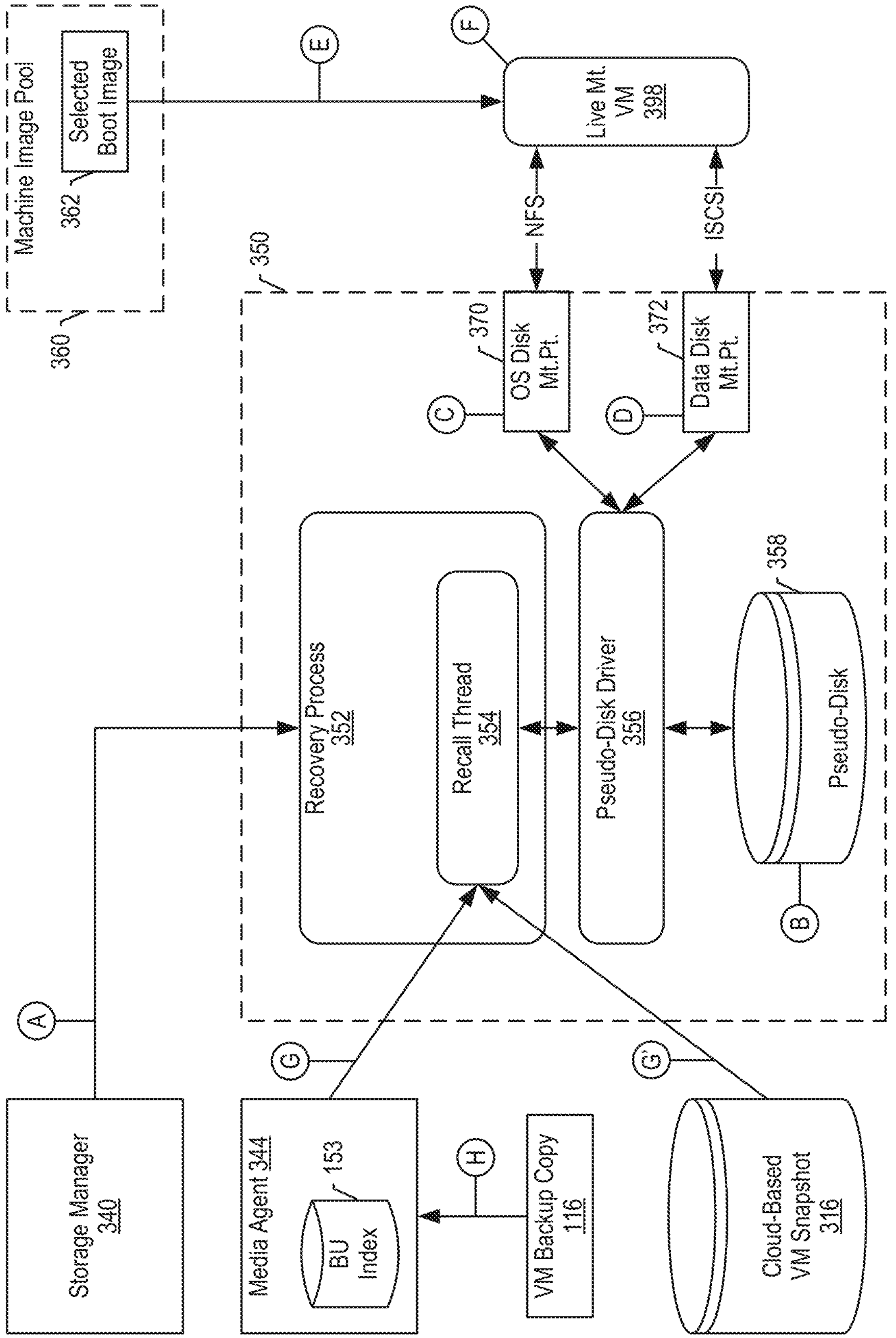
FIG. 3B VM Live Mount In A Public Cloud – Key Operations

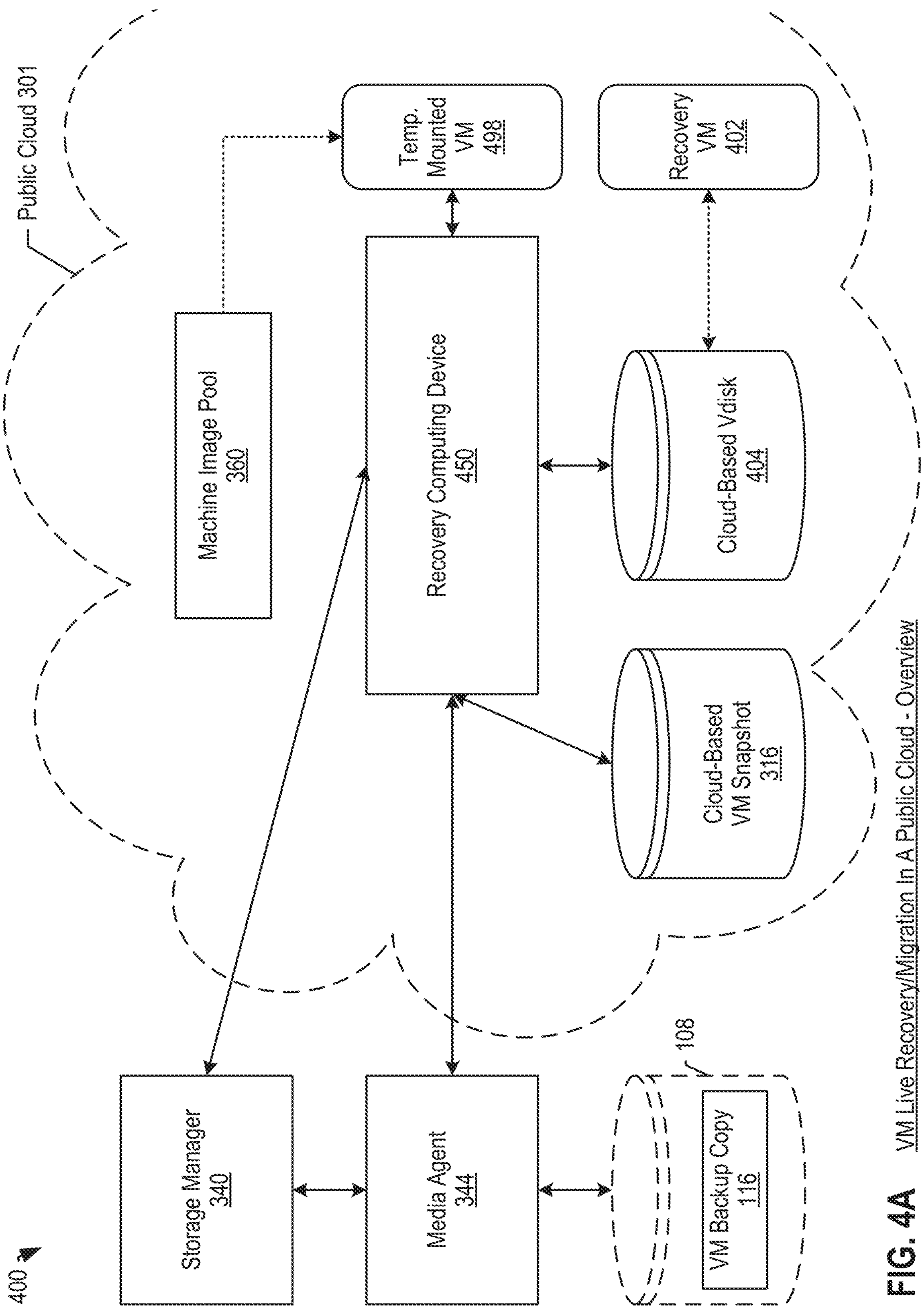
FIG. 4A VM Live Recovery/Migration in A Public Cloud - Overview

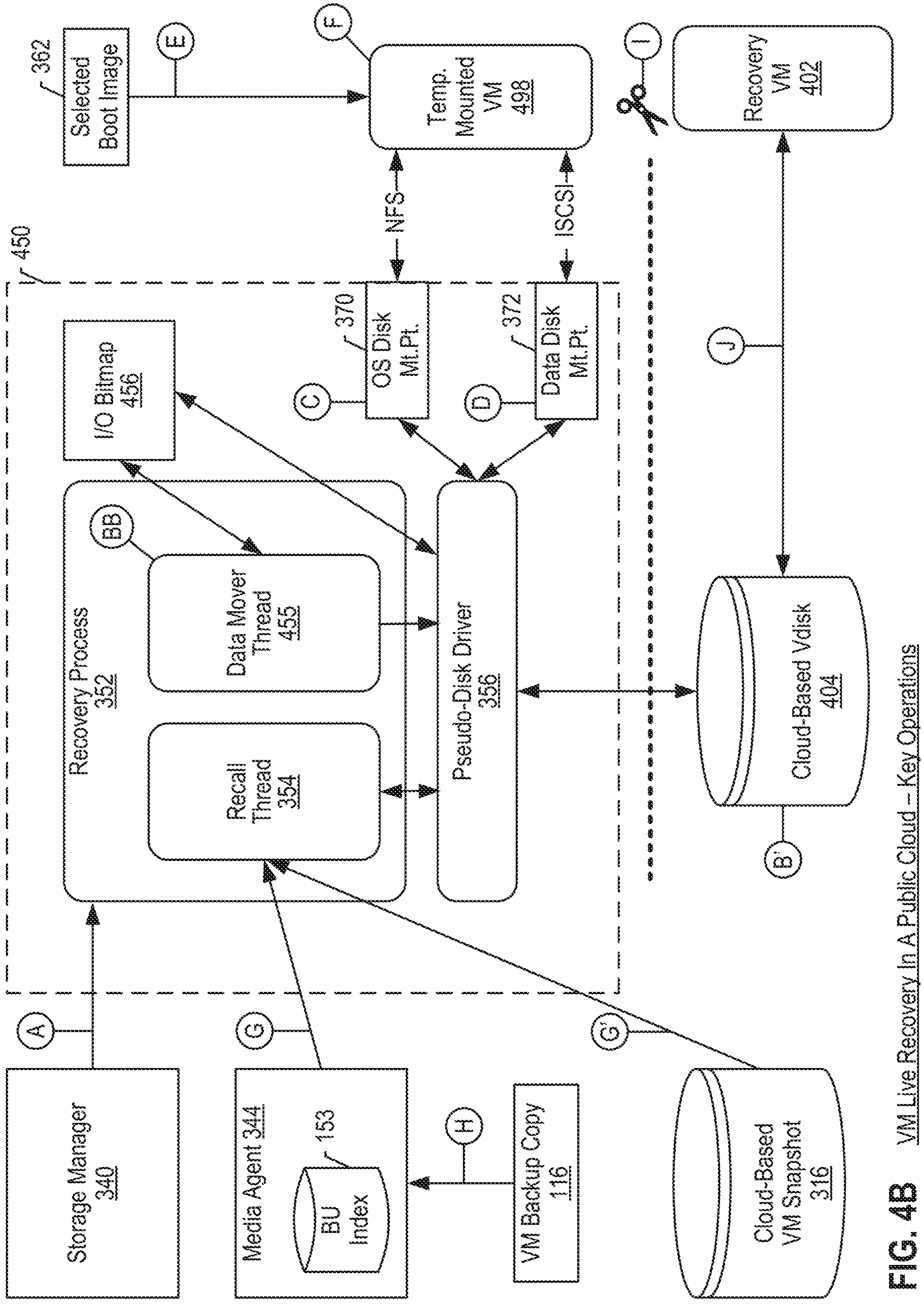
FIG. 4B VM Live Recovery In A Public Cloud – Key Operations

VM Live Mount And/or VM Live Recovery In The Same Public Cloud As The Source System

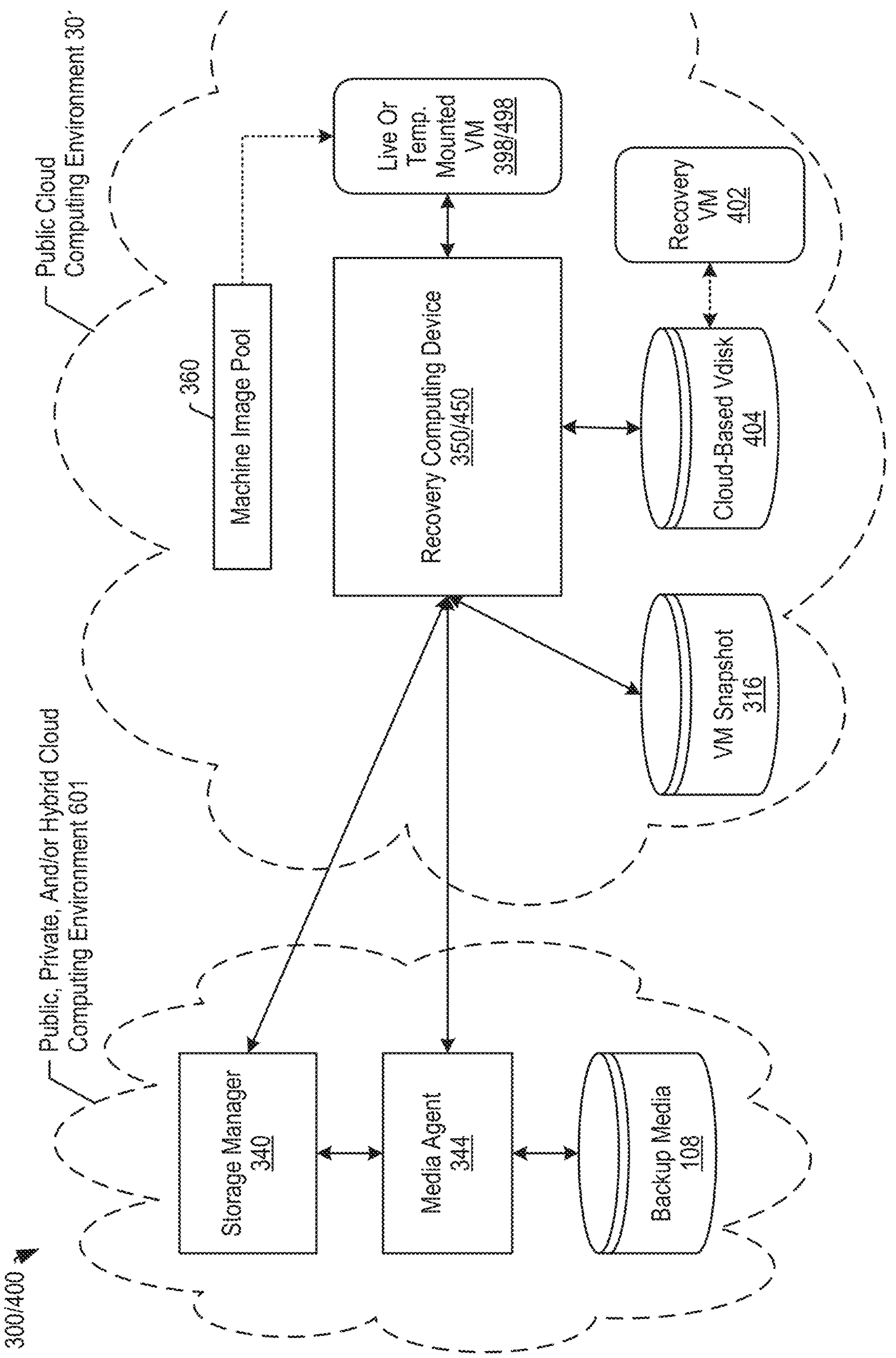
FIG. 6 VM Live Mount And/or VM Live Recovery In Multi-Cloud Computing Environments

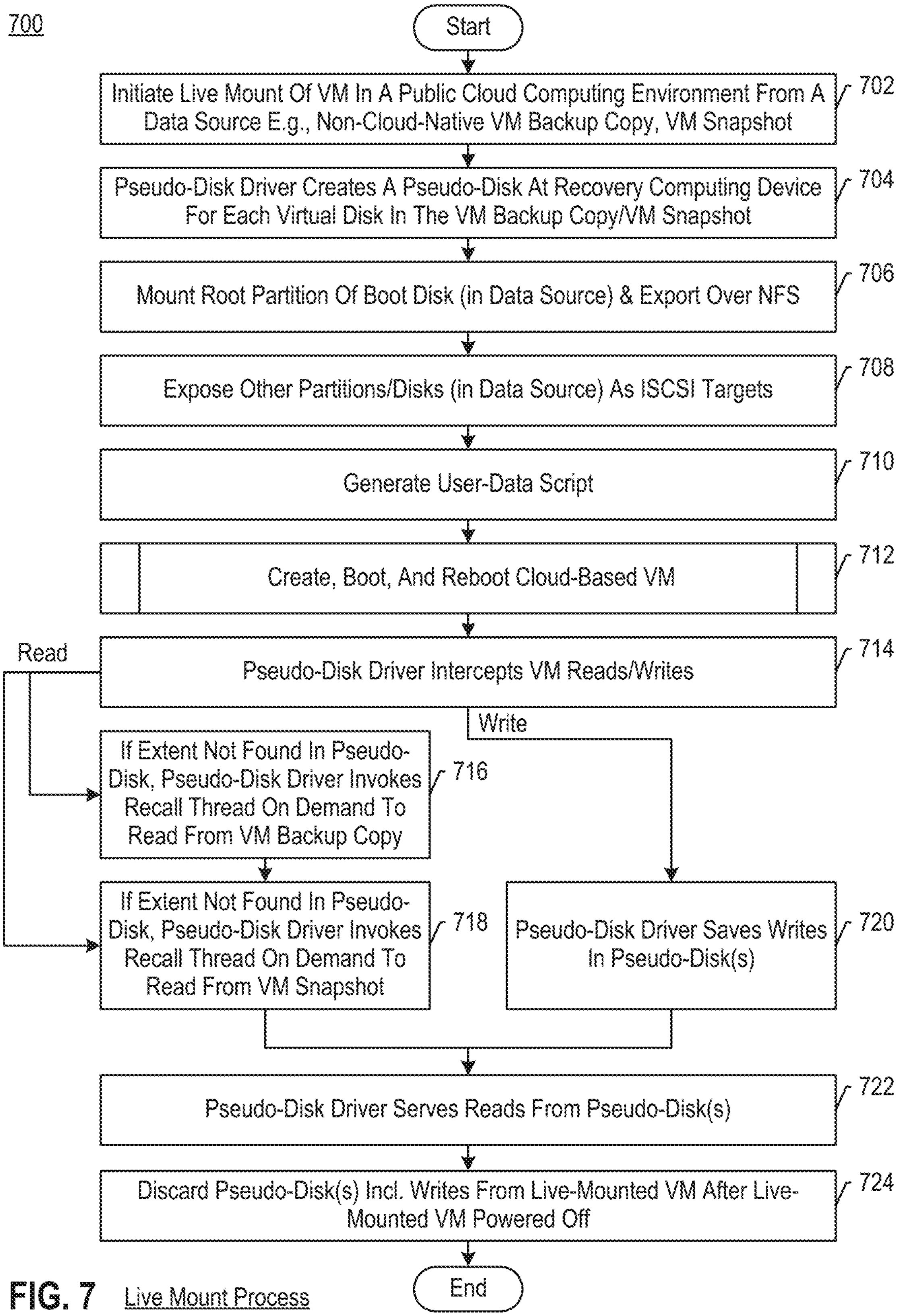
FIG. 7 Live Mount Process

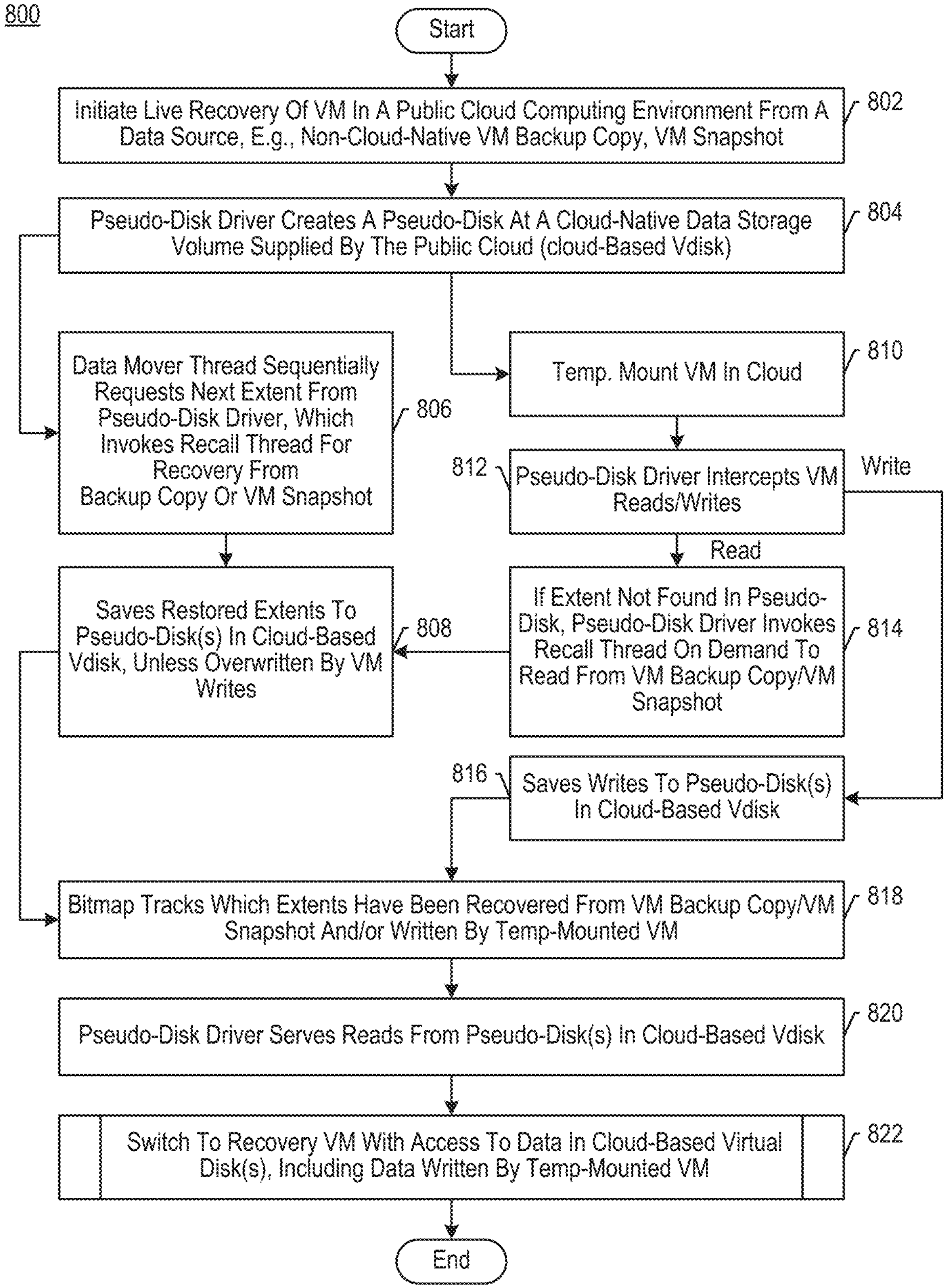
FIG. 8 Live Recovery Process

LIVE RECOVERY OF VIRTUAL MACHINES IN A PUBLIC CLOUD COMPUTING ENVIRONMENT BASED ON TEMPORARY LIVE MOUNT

INCORPORATION BY REFERENCE TO ANY PRIORITY APPLICATIONS

This application is a Continuation of U.S. patent application Ser. No. 18/351,058 filed on Jul. 12, 2023, which is a Continuation of U.S. patent application Ser. No. 17/130,540 filed on Dec. 22, 2020 (now U.S. Pat. No. 11,748,143), which claims the benefit of priority to U.S. Provisional Pat. App. 63/025,758 filed on May 15, 2020 with the title of "Live Mount And Live Recovery Of Virtual Machines In A Public Cloud Computing Environment." This application is also related to U.S. patent application Ser. No. 17/131,049 filed on Dec. 22, 2020 (now U.S. Pat. No. 11,500,669), which also claims the benefit of priority to U.S. Provisional Pat. App. No. 63/025,758 filed on May 15, 2020, which are incorporated by reference in their entireties herein. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a routine schedule. Given the rapidly expanding volume of data under management, companies also continue to seek innovative techniques for managing data growth, for example by migrating data to lower-cost storage over time, reducing redundant data, pruning lower priority data, adopting cloud storage, etc.

Dramatic increases in the use of public cloud computing environments (e.g., Microsoft Azure, Amazon Web Services, Google Cloud, etc.) present certain barriers to cloud service subscribers' ability to exercise command and control over cloud-based virtual machines (VM), particularly in regard to making and later accessing backup copies of the VMs. Thus, a need arises for technologies that streamline the use of cloud subscribers' cloud-based VMs.

SUMMARY

In the context of backups and data protection, "Live Mounting" a virtual machine (VM) causes the VM to run off a backup copy that might have been previously taken of a "live" production VM. The "live-mounted VM" is generally intended for temporary use. One typical use is to validate the integrity and contents of the backup copy, such as for disaster recovery validation. Another typical use is to access some contents of the backup copy from the live-mounted VM without restoring all backed up files. These uses contemplate that changes occurring during live mount are not preserved after the live-mounted VM expires or is taken down. Thus, live mounting a VM is not a restore operation and usually does not involve access to every block of data in the backup copy. However, the prior art does not support live mounting a VM in a public cloud computing environment from a non-cloud-native backup copy, i.e., from a backup copy created by a backup system other than (non-native to) the cloud computing environment that hosts the live-mounted VM. The backup copy is thus in a proprietary format of the backup system. The present disclosure presents a technological solution that overcomes the deficiencies of the prior art.

"Live Recovery" of a VM provides a longer-term platform than live mount. Live recovery generates a new "recovery VM" that operates as an ongoing "live" production platform. The previously created non-cloud-native backup copy is the data source for the recovery VM. Live recovery causes data blocks from the backup copy to be moved (restored, recovered, retrieved, recalled) from the backup copy on backup media to cloud-based virtual disk(s) assigned to the recovery VM. The movement operation methodically transfers all portions of the backup copy to the cloud-based virtual disk(s). As a result, the cloud-based recovery VM can become fully operational in the cloud computing environment on a going-forward basis. The advantage of live recovery over a traditional restore operation is that live recovery enables a cloud-based VM to begin operating well before the backup copy is fully restored. This is accomplished by temporarily mounting a VM (the "temp-mounted VM") in the cloud while the backup copy is being restored in the background. VM reads and writes begin issuing from the temp-mounted VM and writes are not lost on completion. However, the prior art does not support live recovery of a VM in a public cloud computing environment from a non-cloud-native backup copy. The present disclosure presents a technological solution that overcomes this deficiency.

A "cloud computing environment" as used herein comprises resources provided as a service by a cloud service provider to a cloud service account. A cloud computing environment is accessed via the cloud service account, which entitles the subscriber to use services supplied by the cloud service provider. Cloud computing environments vary among cloud services, among cloud availability zones, and even among cloud service accounts from the same cloud service provider. A cloud computing environment as used herein comprises data processing (computing) resources such as cloud-based VMs, and further comprises data storage resources that host virtual disks acting as datastores for the cloud-based VMs.

VM Live Mount In A Public Cloud Computing Environment. Public cloud computing environments are controlled by cloud service providers, and techniques in the prior art for live mounting VMs from a non-cloud-native backup copy do not work in public cloud computing environments. In part this is because public cloud computing environments do not allow VMs to boot from a non-cloud-native external source, such as a source that hosts the backup copy. The disclosed live mount feature overcomes this problem. An illustrative data storage management system generates VM backup copies and stores them to a proprietary data store, which may be located in a non-cloud data center or in a cloud storage environment of the same or different cloud service provider that hosts the live-mounted VM. The data storage management system comprises technologies for enabling cloud-based VMs to be live-mounted off the backup copies in the proprietary data store. This technological improvement enables a number of beneficial uses of live-mounted cloud-based VMs, e.g., checking backup integrity, checking backup content, making temporary use of backed up data, testing a disaster recovery scenario, etc., without limitation. Yet the illustrative system makes possible all these uses without requiring the backup copy to be restored to the VM's cloud host. Instead, portions of the VM backup copies are recalled only as needed by the live-mounted VM.

VM Live Recovery In A Public Cloud Computing Environment. Public cloud computing environments are controlled by cloud service providers and do not allow VMs to boot from a non-cloud-native external source, such as a source that hosts the backup copy, and also do not allow data from such backup copies to be moved from a non-native external source onto a cloud-based virtual disk without using a restore operation. As a consequence, to recover or move a VM to a public cloud computing environment, the prior art requires restoring the backup copy in its entirety to the cloud destination. Although the restore operation is effective to make all data from the backup copy available to a cloud-based VM, the cloud-based VM cannot become operational until the restore operation completes. This prior art approach causes substantial delays, particularly if the amount of data to be restored is very large or involves many virtual disks. In disaster recovery or VM migration scenarios, such delays are highly unsatisfactory, and a faster disaster recovery time is desired. The disclosed live recovery feature overcomes this deficiency. The illustrative data storage management system enables cloud-based VMs to be live recovered off backup copies in the proprietary data store. This technological improvement provides faster VM recovery time and less downtime because a cloud-based VM can begin operating off the backup copy without waiting for a restore operation to complete; instead, the cloud-based VM issues reads and writes even while the restore operation is still in progress. A novel data mover process thread causes all portions of the backup copy to move directly to cloud-based virtual disks assigned to the recovery VM. During the course of the move, a temporarily operating VM is mounted (the temp-mounted VM) and issues reads and writes. After the move of the backup copy to the virtual disk(s) is complete, i.e., after the restore operation ends, the temp-mounted VM is powered off and communicative connections are severed to the proprietary components of the illustrative system that implemented the move and sustained the temp-mounted VM during the move. At this point, the cloud-based virtual disk(s) have been populated with all of the backup copy and additionally also comprise all writes issued by the temp-mounted VM. Therefore, each virtual disk is current and ready to serve the recovery VM, which is configured as a more persistent cloud-based VM that will run going forward. The illustrative system boots up the recovery VM in the cloud computing environment, connects it to the fully populated virtual disk(s) that form its datastore, and thereafter the recovery VM resumes read and write operations. There is only minimal downtime during the switchover from temp-mounted VM to recovery VM.

Differences Between Live Mount and Live Recovery. The live recovery feature leverages some but not all of the techniques used for live mounting a cloud-based VM, and therefore live recovery operates as a separate feature in the illustrative system. One key difference is that live recovery moves data from the data source (e.g., backup copy) directly to the cloud-based virtual disks of the recovery VM, thus minimizing intermediate copy operations. Another key difference is that live recovery methodically moves all of the backup copy to the cloud computing environment, whereas live mount moves data responsive to on-demand read requests but does not perform a complete restore cycle. Another key difference is that data written during live recovery is preserved for use by the recovery VM at the cloud-based virtual disks, whereas the temporary nature of live mount discards writes after live-mounting ends. Furthermore, live recovery arbitrates among simultaneous read requests when an on-demand read request from the temp-mounted VM coincides with a recall from backup media for the same data. This arbitration feature is key to sustaining active reads while the restore is still in progress, which is one of the advantages of live recovery over traditional restores.

Enhanced Data Storage Management System. The illustrative data storage management system generates VM backup copies, whether from a non-cloud data center or from cloud-based VMs. The data storage management system stores and maintains the backup copies in a proprietary data store, which may or may not reside in the present cloud computing environment. The data storage management system keeps one or more indexes that track where each backup copy is stored and further tracks where each portion of a backup copy (e.g., extents, chunks, data blocks, etc.) are stored on backup media. The indexing capability enables intelligent pin-point retrieval and staging of data from backup media when live mounting and/or live recovering a VM. For simplicity and as a shorthand usage herein, portions of a backup copy (or of a VM snapshot) are referred to herein as "extents," though it will be understood that the term may be interchangeable with "portions," "chunks," or "data blocks," depending on how the system is implemented. Some of the illustrative components of the data storage management system operate in the same cloud computing environment as the VM that is to be live mounted and/or live recovered, whereas other components operate in another distinct cloud computing environment, in another cloud availability zone, or in a non-cloud data center, without limitation. Accordingly, the illustrative live mount and live recovery features can be implemented in a variety of configurations, such as non-cloud data center-to-cloud, cloud-to-cloud, multi-cloud, etc.

The illustrative data storage management system comprises a specially-configured computing device that operates in the cloud computing environment that hosts the live-mounted VM and/or recovery VM. The specially-configured computing device is communicatively interposed between a live-mounted/temp-mounted VM and a media agent component of the illustrative system. In some embodiments, the interposed computing device is known as a "Linux File Recovery Enabler" (FREL), for interoperating with cloud-based VMs that have a Linux operating system, but the invention is not so limited. As a shorthand, the interposed computing device is referred to herein as the "recovery computing device."

The media agent is communicatively coupled to storage resources where the backup copy is stored (the "backup media" or "backup storage") as well as to the recovery computing device. The media agent comprises indexing information (e.g., a backup index) that tracks where the backup copy's extents are stored on backup media. The recovery computing device comprises a pseudo-disk driver that executes thereon and intercepts reads and writes issued by the live-mounted/temp-mounted VM. For live recovery, the pseudo-disk driver also interoperates with cloud-based virtual disk(s) assigned to the recovery VM. The pseudo-disk driver presents a pseudo-disk as a block storage device for receiving and serving data. The pseudo-disk driver places data retrieved by the media agent from the backup copy to a logically-defined "recall store" in the pseudo-disk. The pseudo-disk driver places write data received from the live-mounted/temp-mounted VM to a logically-defined "private store" in the pseudo-disk.

For live mount, the pseudo-disk driver configures the private store and recall store at the recovery computing device. The pseudo-disk driver intercepts read requests issued by the live-mounted VM and preferentially serves them from the private store or the recall store at the recovery computing device. If a read request cannot be served therefrom, data is retrieved from the backup copy and stored to the recall store and then served to the VM. In this way, the recall store is populated over time from on-demand read requests issued by the live-mounted VM. Ultimately, data in the private store at the recovery computing device will be discarded when the live-mounted VM expires or is taken down.

For live recovery, the pseudo-disk driver configures the private store and recall store at the cloud-based virtual disk(s) that will ultimately serve as the recovery VM's datastore. This aspect is distinguishable from the expendable pseudo-disk created for the live mount feature at the recovery computing device. A novel data mover process thread that runs at the recovery computing device causes the backup copy to be sequentially traversed to move extents directly to the cloud-based virtual disk(s). The pseudo-disk driver preferentially serves on-demand reads from the private store or the recall store at the cloud-based virtual disk, but initially those stores lack the requested extents. The pseudo-disk driver maintains an input-output (I/O) bitmap that tracks whether each extent in the backup copy has been successfully recalled from the backup copy to ensure that all of the backup copy is recovered and its extents stored to the cloud-based virtual disk(s). Because the cloud-based virtual disk will persist as the recovery VM's datastore, all on-demand reads and writes that issue from the temp-mounted VM are directly applied to the cloud-based virtual disk(s). The data mover arbitrates when an on-demand read arrives for an extent that is currently being recalled from backup media. In such a case, the data mover allows the recall to complete before the on-demand read request is served from the cloud-based virtual disk(s). This logic ensures that there are no double-takes on recalls from backup media.

Other salient aspects of the illustrative system include a pre-packaged pool of machine images or operating system images (e.g., Amazon machine image (AMI), etc.). This "machine image pool" is configured in the VM host cloud as a persistent resource for future live mount and live recovery operations. Each image comprises utilities for loading a root file system into a target VM such as the live-mounted VM or the temp-mounted VM, and further comprises key drivers for setting up the VM's virtual disk, such as a Network File System (NFS) driver and a network interface card (NIC) driver, which is accompanied by a script for registering Internet Small Computer Systems Interface (iSCSI) disks. The machine image pool is tapped when a VM is to be live-mounted or temp-mounted. Accordingly, the system selects a proper machine image that is suitable to the configuration of the target VM, e.g., having a certain version of a certain operating system, etc.

Another salient aspect of the illustrative system is a recovery process that executes on the recovery computing device. The recovery process coordinates certain aspects of the disclosed features, such as invoking a pseudo-disk driver corresponding to each VM virtual disk, causing the pseudo-disk driver to set up the corresponding pseudo-disk, selecting a suitable machine image from the machine image pool, causing a VM to be instantiated for the live-mount/temp-mount operation. In the live recovery operation, the recovery process additionally coordinates the switchover from temp-mounted VM to recovery VM. More details are given in the accompanying figures and in the sections entitled Live Mount Of Virtual Machines in a Public Cloud Computing Environment and Live Recovery Of Virtual Machines in a Public Cloud Computing Environment below.

BRIEF DESCRIPTION OF THE DRAWINGS

FIG. 3B is a block diagram depicting certain configuration details and key operations of a VM live mount configuration in a public cloud computing environment, according to an illustrative embodiment.

FIG. 4A is a block diagram illustrating some salient portions of a system 400 for VM live recovery in a public cloud computing environment, according to an illustrative embodiment.

FIG. 4B is a block diagram depicting certain configuration details and key operations of a VM live recovery configuration in a public cloud computing environment, according to an illustrative embodiment.

FIG. 6 is a block diagram illustrating an example configuration of VM live mount and/or VM live recovery in multi-cloud computing environments.

FIG. 7 depicts some salient operations of a method 700 according to an illustrative embodiment.

FIG. 8 depicts some salient operations of a method 800 according to an illustrative embodiment.

DETAILED DESCRIPTION

Detailed descriptions and examples of systems and methods according to one or more illustrative embodiments of the present invention may be found in the sections entitled Live Mount Of Virtual Machines in a Public Cloud Computing Environment and Live Recovery Of Virtual Machines in a Public Cloud Computing Environment below, as well as in the section entitled Example Embodiments, and also in FIGS. 3A-6. Furthermore, components and functionality for live mount and live recovery of a VM in a public cloud computing environment may be configured and/or incorporated into information management systems such as those described herein in FIGS. 1A-1H and 2A-2C.

Various embodiments described herein are intimately tied to, enabled by, and would not exist except for, computer technology. For example, the transfer of extents from backup copy to the interposed computing device and from there to a cloud-based virtual disk as described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
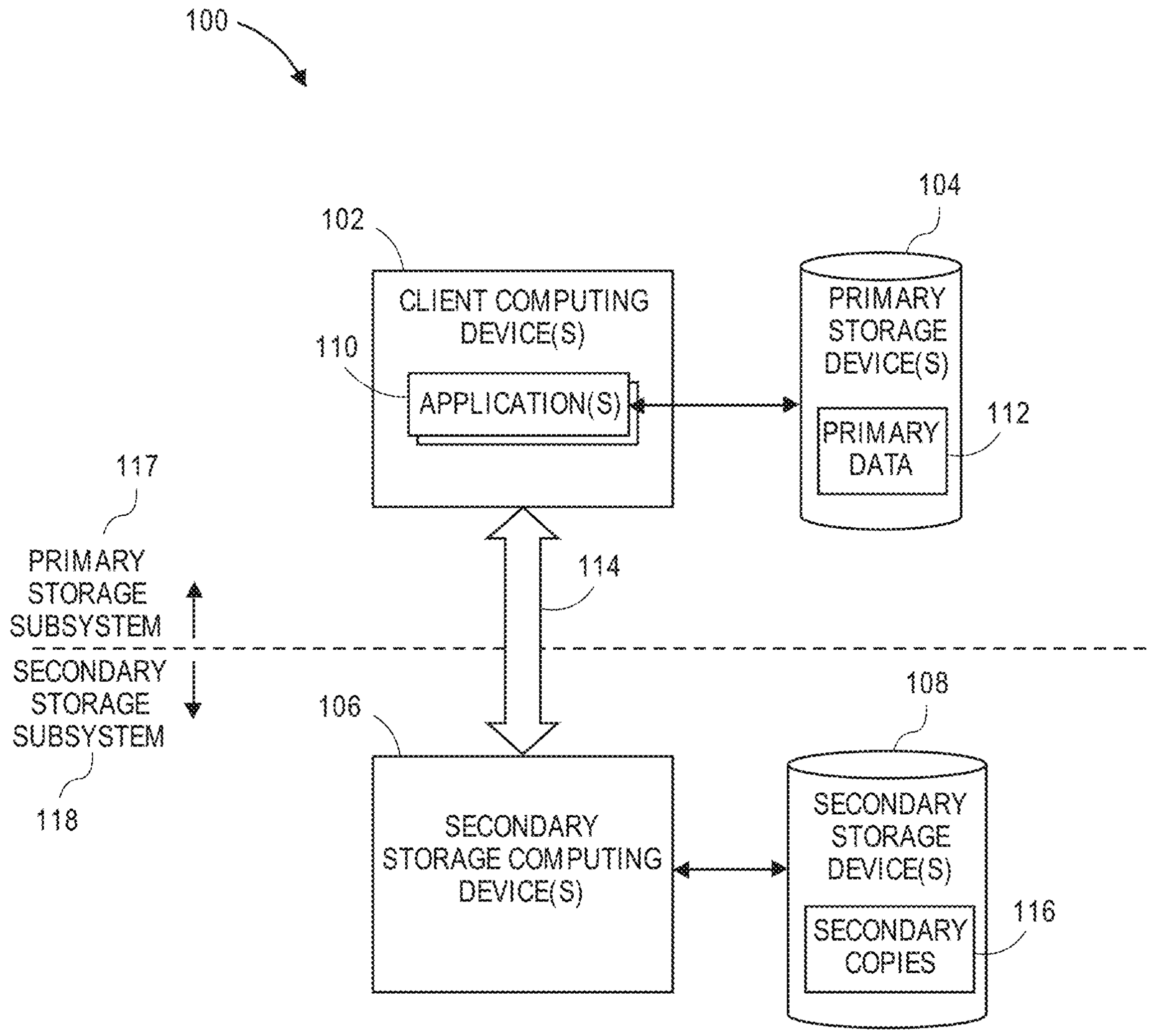
FIG. 1A is a block diagram illustrating an example information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";
U.S. Pat. No. 7,107,298, entitled "System And Method For Archiving Objects In An Information Store";
U.S. Pat. No. 7,246,207, entitled "System and Method for Dynamically Performing Storage Operations in a Computer Network";
U.S. Pat. No. 7,315,923, entitled "System And Method For Combining Data Streams In Pipelined Storage Operations In A Storage Network";
U.S. Pat. No. 7,343,453, entitled "Hierarchical Systems and Methods for Providing a Unified View of Storage Information";
U.S. Pat. No. 7,395,282, entitled "Hierarchical Backup and Retrieval System";
U.S. Pat. No. 7,529,782, entitled "System and Methods for Performing a Snapshot and for Restoring Data";
U.S. Pat. No. 7,617,262, entitled "System and Methods for Monitoring Application Data in a Data Replication System";
U.S. Pat. No. 7,734,669, entitled "Managing Copies Of Data";
U.S. Pat. No. 7,747,579, entitled "Metabase for Facilitating Data Classification";
U.S. Pat. No. 8,156,086, entitled "Systems And Methods For Stored Data Verification";
U.S. Pat. No. 8,170,995, entitled "Method and System for Offline Indexing of Content and Classifying Stored Data";
U.S. Pat. No. 8,230,195, entitled "System And Method For Performing Auxiliary Storage Operations";
U.S. Pat. No. 8,285,681, entitled "Data Object Store and Server for a Cloud Storage Environment, Including Data Deduplication and Data Management Across Multiple Cloud Storage Sites";
U.S. Pat. No. 8,307,177, entitled "Systems And Methods For Management Of Virtualization Data";
U.S. Pat. No. 8,364,652, entitled "Content-Aligned, Block-Based Deduplication";
U.S. Pat. No. 8,578,120, entitled "Block-Level Single Instancing";
U.S. Pat. No. 8,954,446, entitled "Client-Side Repository in a Networked Deduplicated Storage System";
U.S. Pat. No. 9,020,900, entitled "Distributed Deduplicated Storage System";
U.S. Pat. No. 9,098,495, entitled "Application-Aware and Remote Single Instance Data Management";
U.S. Pat. No. 9,239,687, entitled "Systems and Methods for Retaining and Using Data Block Signatures in Data Protection Operations";
U.S. Pat. No. 9,444,811, entitled "Using An Enhanced Data Agent To Restore Backed Up Data Across Autonomous Storage Management Systems";
U.S. Pat. No. 9,633,033 entitled "High Availability Distributed Deduplicated Storage System";
U.S. Pat. No. 10,228,962 entitled "Live Synchronization and Management of Virtual Machines across Computing and Virtualization Platforms and Using Live Synchronization to Support Disaster Recovery";
U.S. Pat. No. 10,255,143 entitled "Deduplication Replication In A Distributed Deduplication Data Storage System"
U.S. Pat. No. 10,592,145, entitled "Machine Learning-Based Data Object Storage";
U.S. Pat. No. 10,684,924 entitled "Data Restoration Operations Based on Network Path Information";

U.S. Patent Pub. No. 2006/0224846, entitled "System and Method to Support Single Instance Storage Operations" now abandoned;

U.S. Patent Pub. No. 2016/0350391 entitled "Replication Using Deduplicated Secondary Copy Data" now abandoned;

U.S. Patent Pub. No. 2017/0235647 entitled "Data Protection Operations Based on Network Path Information" now abandoned; and U.S. Patent Pub. No. 2019/0108341 entitled "Ransomware Detection And Data Pruning Management".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, California; Microsoft Virtual Server and Microsoft Windows Server Hyper-V, both by Microsoft Corporation of Redmond, Washington; Sun xVM by Oracle America Inc. of Santa Clara, California; and Xen by Citrix Systems, Santa Clara, California. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
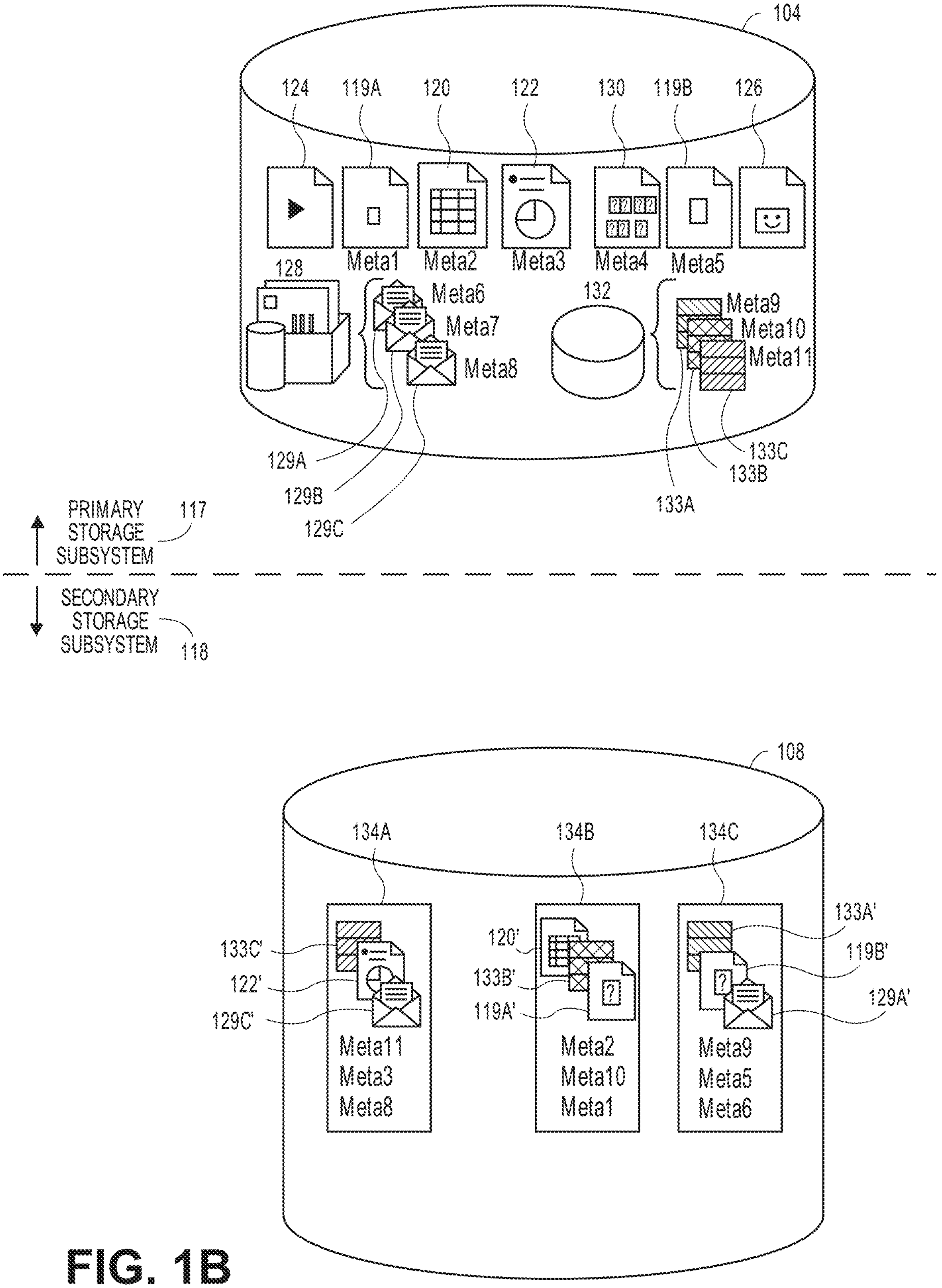
FIG. 1B is a detailed view of a primary storage device, a secondary storage device, and some examples of primary data and secondary copy data.
Figure 1C:
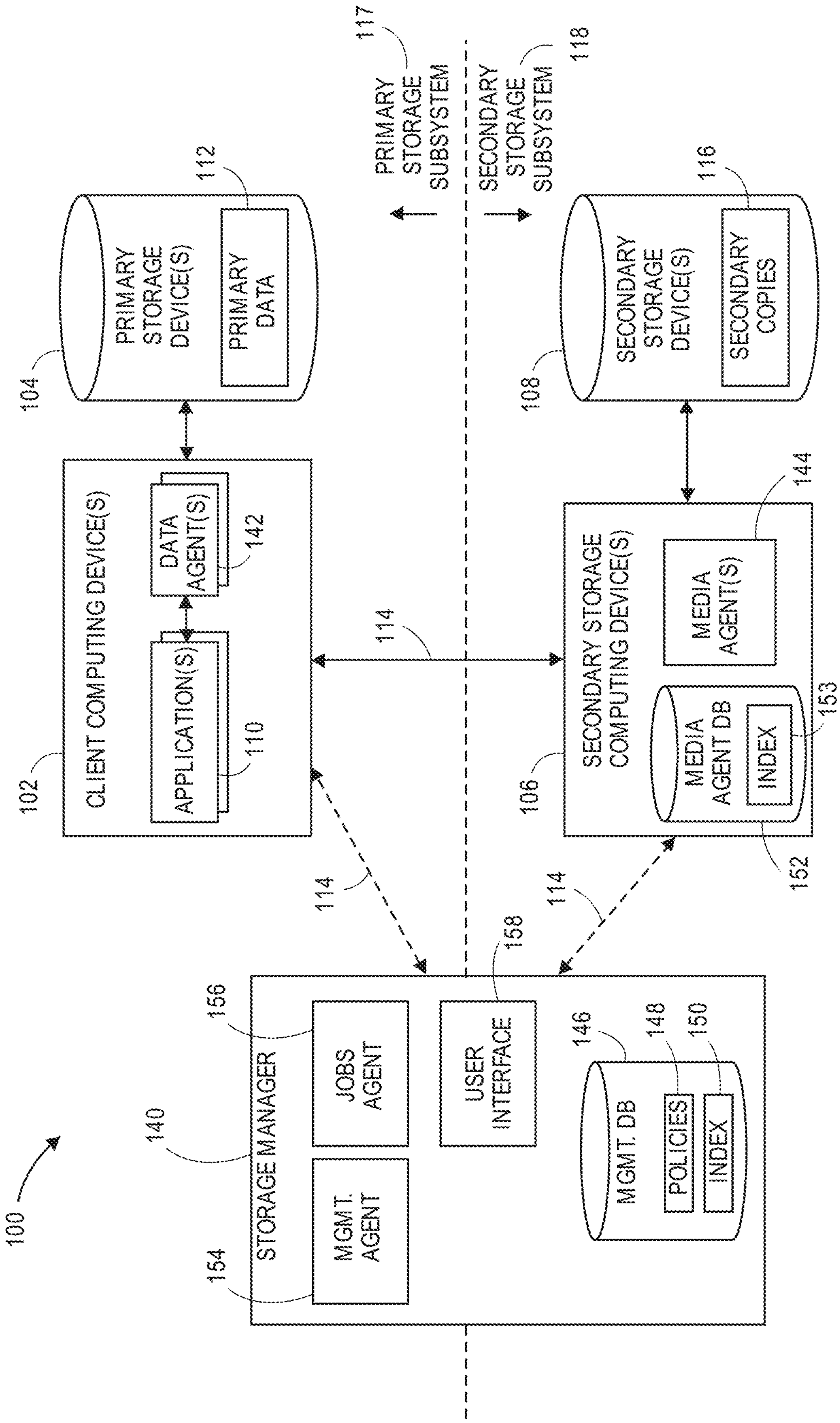
FIG. 1C is a block diagram of an example information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Example Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Example Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Example Primary Data and an Example Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Example Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;

protecting metadata associated with system 100, e.g., in management database 146;
implementing job management, schedule management, event management, alert management, reporting, job history maintenance, user security management, disaster recovery management, and/or user interfacing for system administrators and/or end users of system 100;
sending, searching, and/or viewing of log files; and
implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager

140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
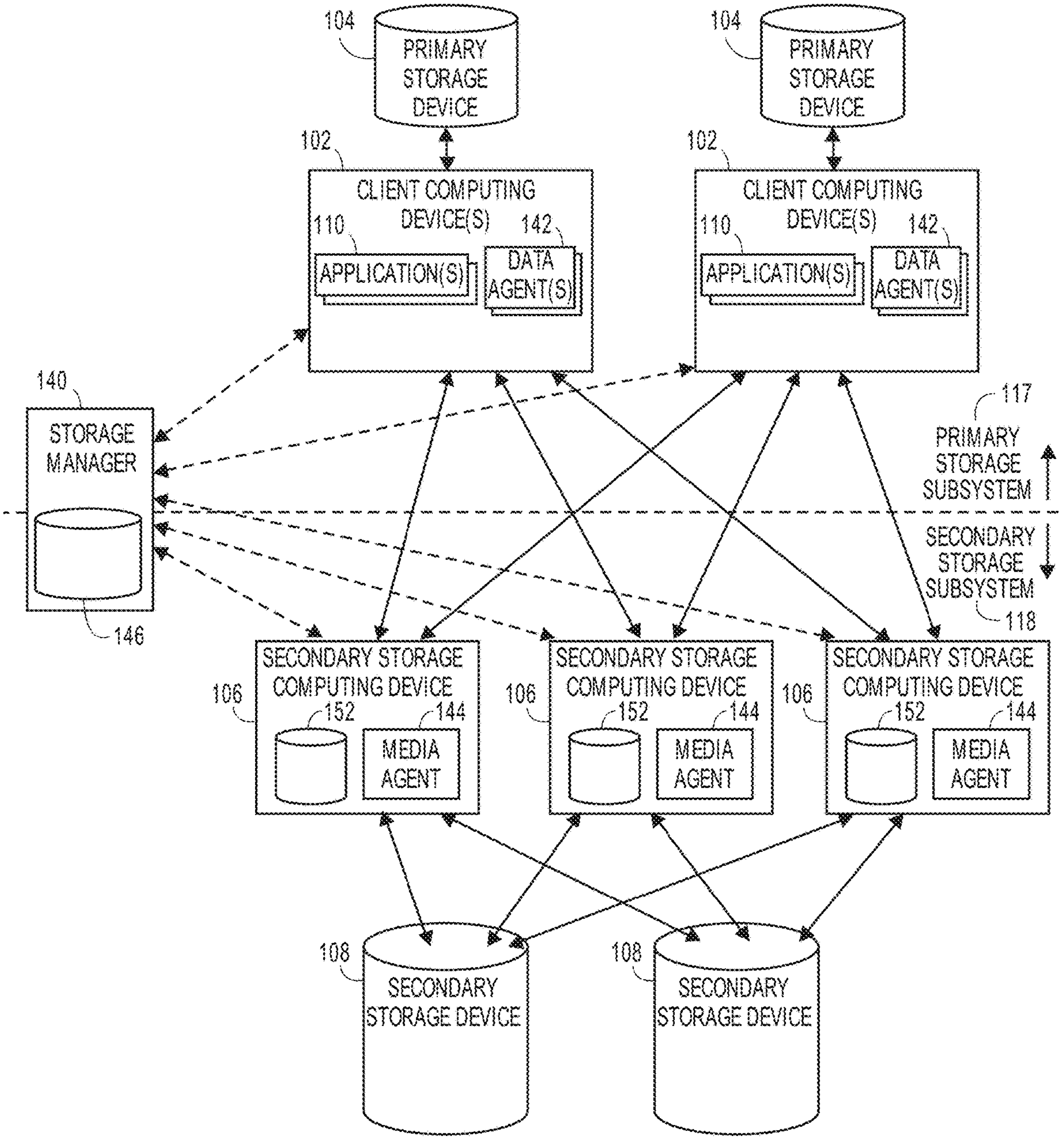
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140.

And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Example Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Patent Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Example auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to mitigate recognized risks dynamically and automatically, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Example information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one example scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Example Storage Policy and Secondary Copy Operations

Figure 1E:
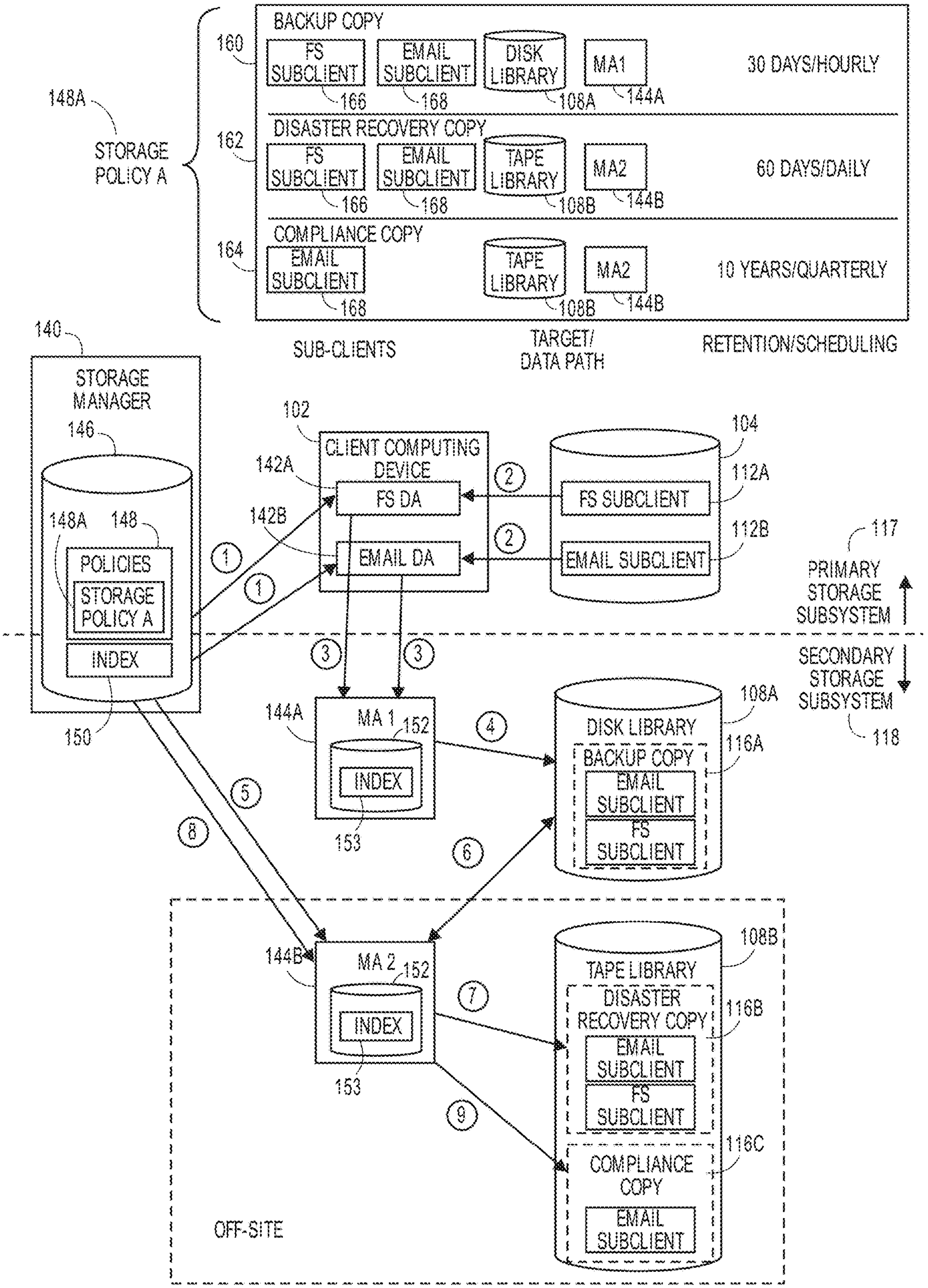
FIG. 1E illustrates certain secondary copy operations according to an example storage policy.

FIG. 1E includes a data flow diagram depicting performance of secondary copy operations by an embodiment of information management system 100, according to an example storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The example storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Example Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Example Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
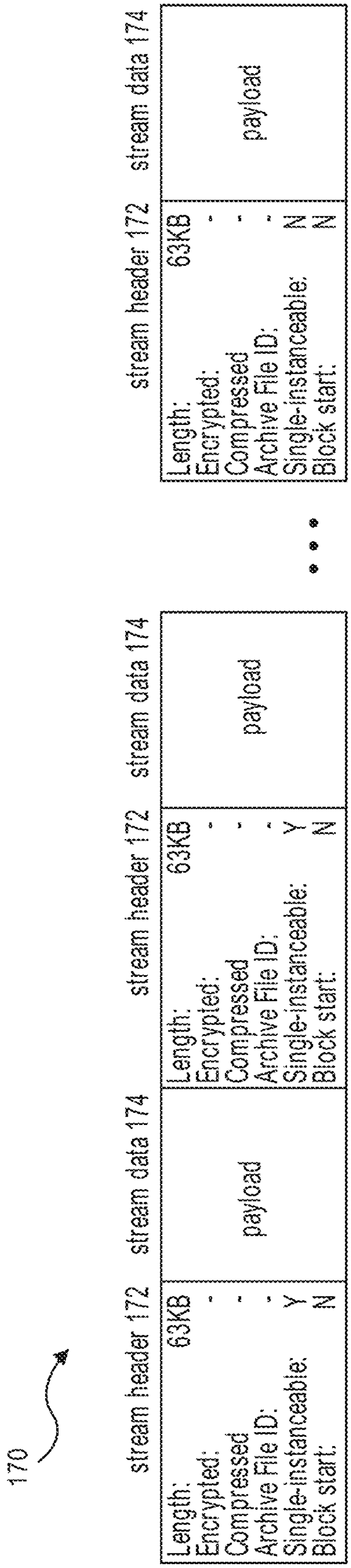
FIGS. 1F-1H are block diagrams illustrating suitable data structures that may be employed by the information management system.
Figure 1G:
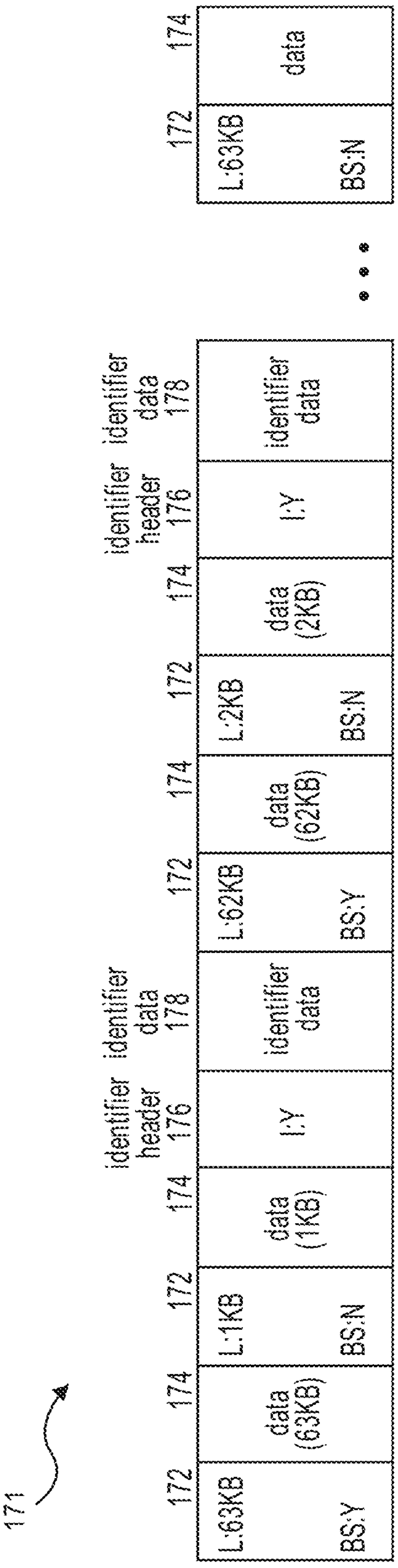

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
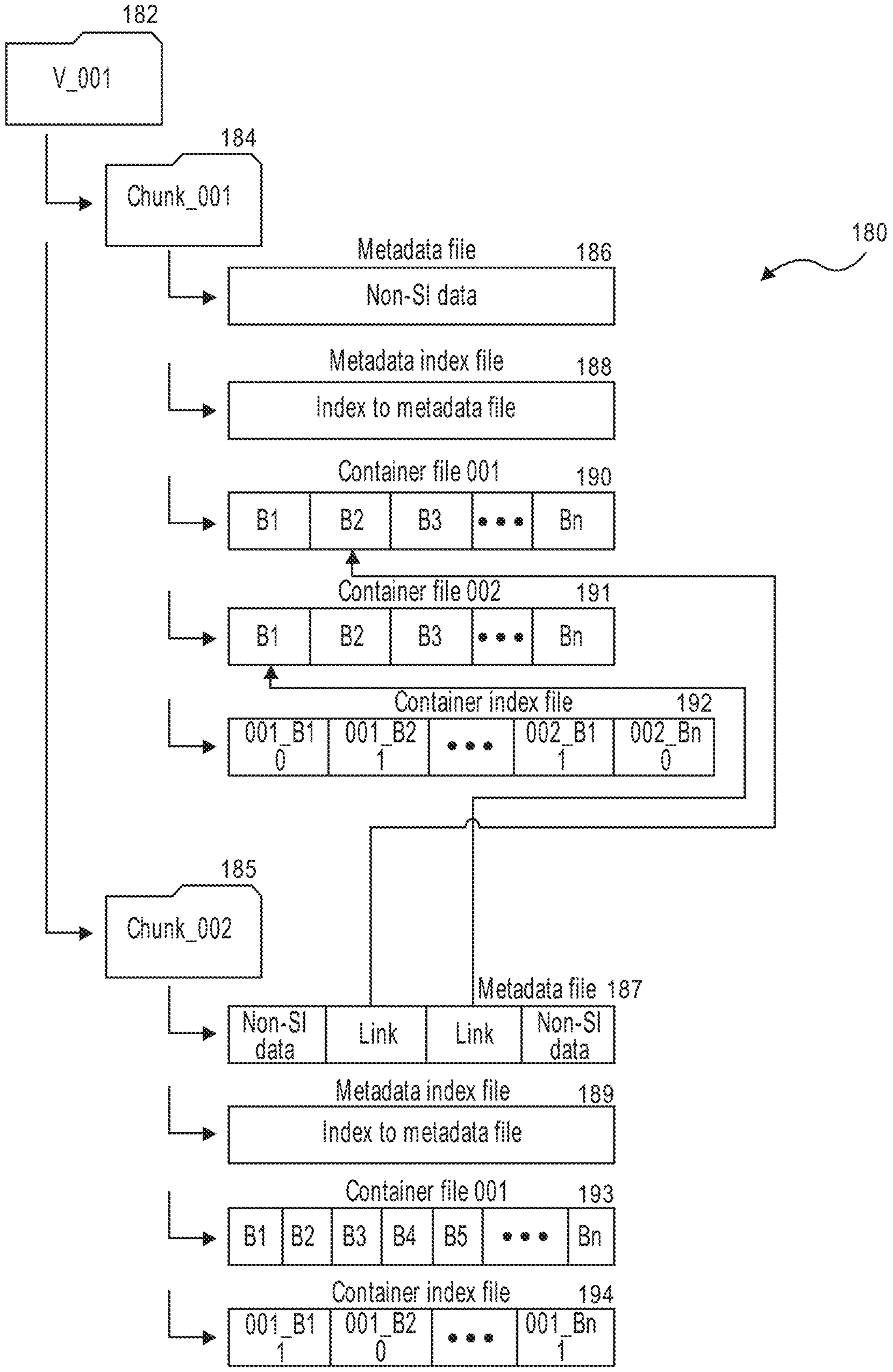

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
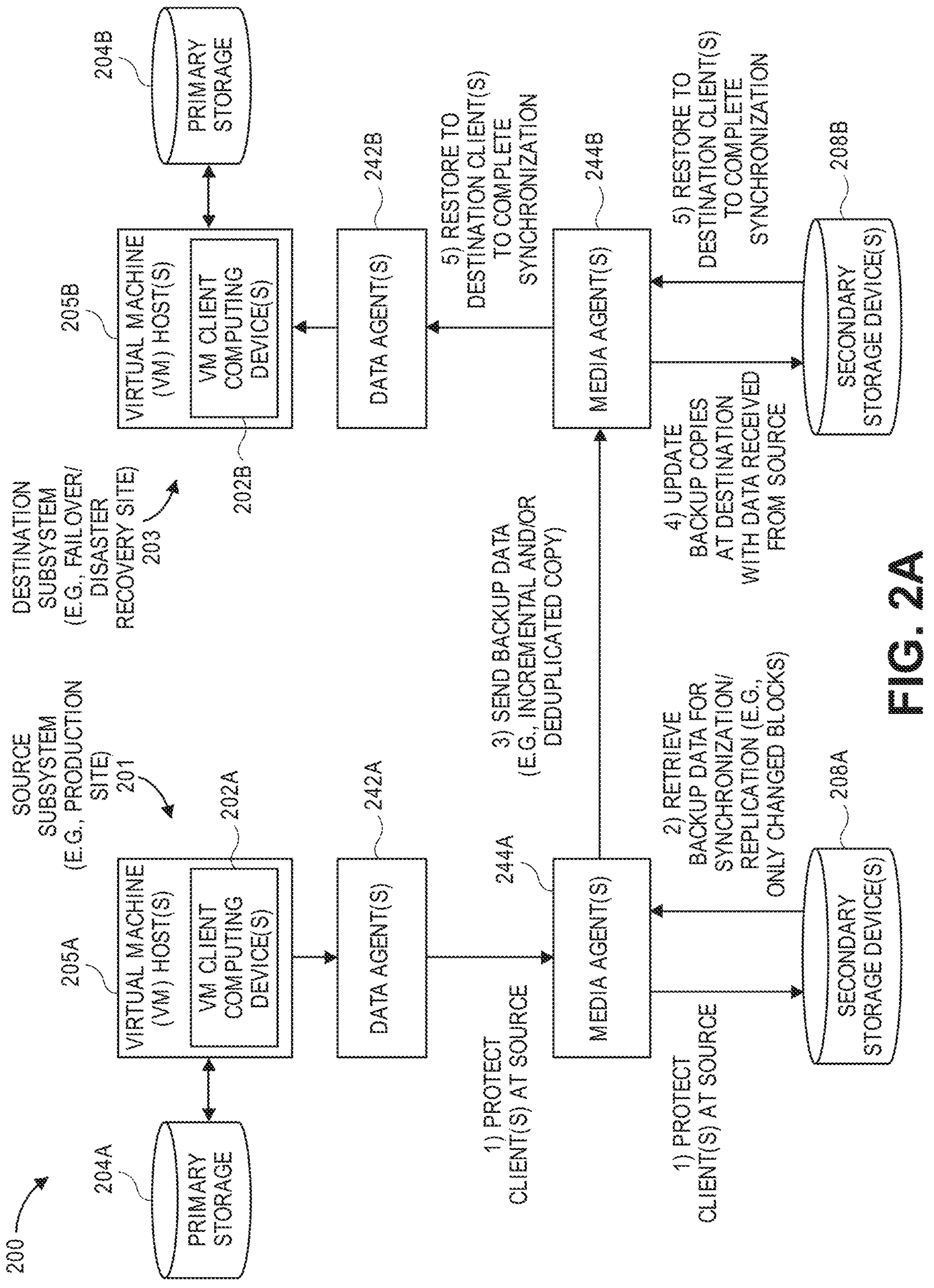
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202*a* include one or more virtual machines (or "VMs") executing on one or more corresponding VM host computers 205*a*, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242*a* and source media agent(s) 244*a* work together to write backup or other secondary copies of the primary data generated by the source client computing devices 202*a* into the source secondary storage device(s) 208*a*. At step 2, the backup/secondary copies are retrieved by the source media agent(s) 244*a* from secondary storage. At step 3, source media agent(s) 244*a* communicate the backup/secondary copies across a network to the destination media agent(s) **244*b* in destination subsystem 203**.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Pat. No. 10,228,962 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) **244*b* write the received backup/secondary copy data to the destination secondary storage device(s) 208*b*. At step 5, the synchronization is completed when the destination media agent(s) and destination data agent(s) 242*b* restore the backup/secondary copy data to the destination client computing device(s) 202*b*. The destination client computing device(s) 202*b*** may be kept "warm" awaiting activation in case failure is detected at the source. This synchronization/replication process can incorporate the techniques described in U.S. Patent Pub. No. 2016/0350391 entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating With the Cloud Using File System Protocols

Figure 2B:
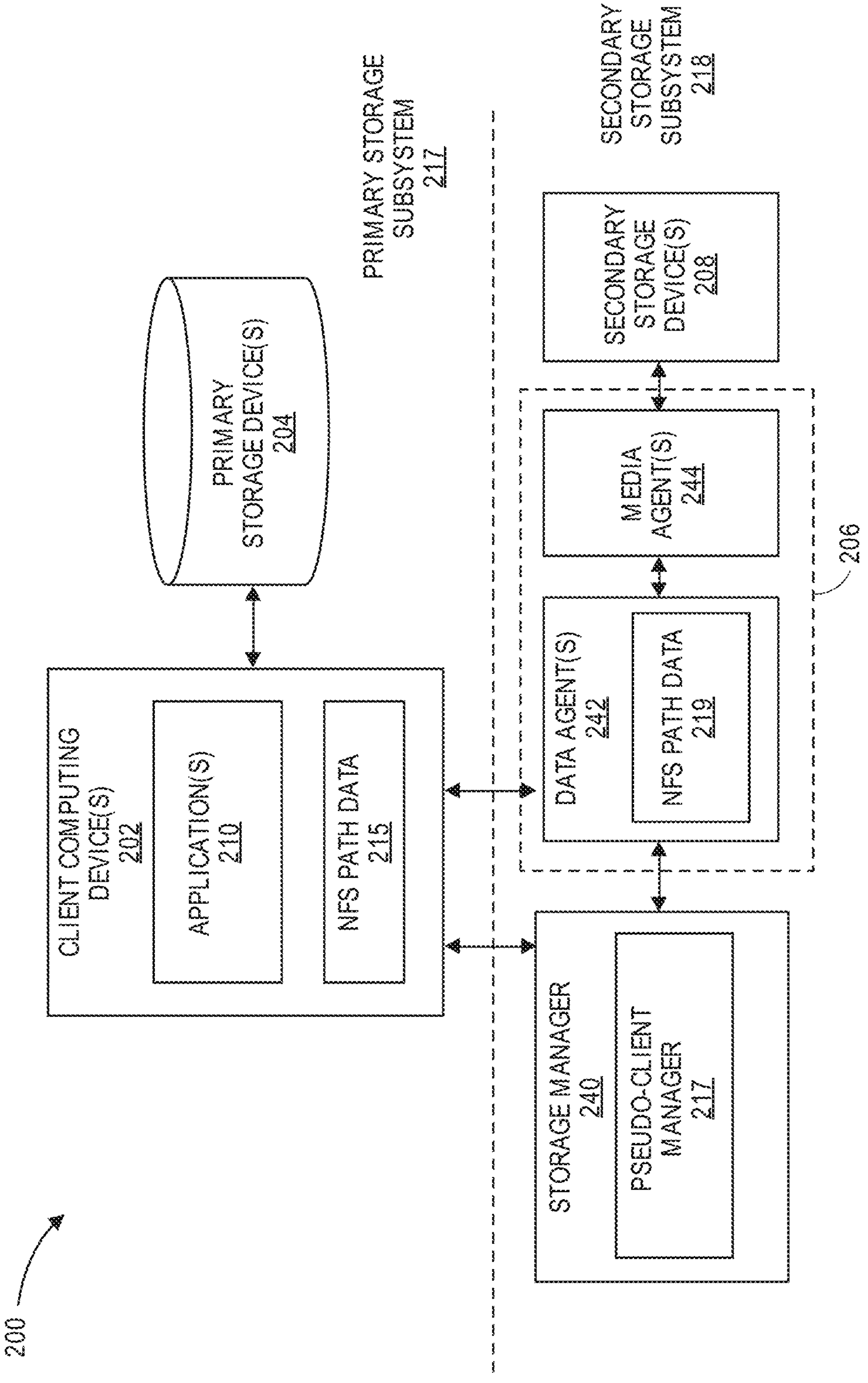
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Pub. No. 2017/0235647 entitled "Data Protection Operations Based on Network Path Information." Examples of improved data restoration scenarios based on network-path information, including using stored backups effectively as primary data sources, may be found in U.S. Pat. No. 10,684,924 entitled "Data Restoration Operations Based on Network Path Information."

Highly Scalable Managed Data Pool Architecture

Figure 2C:
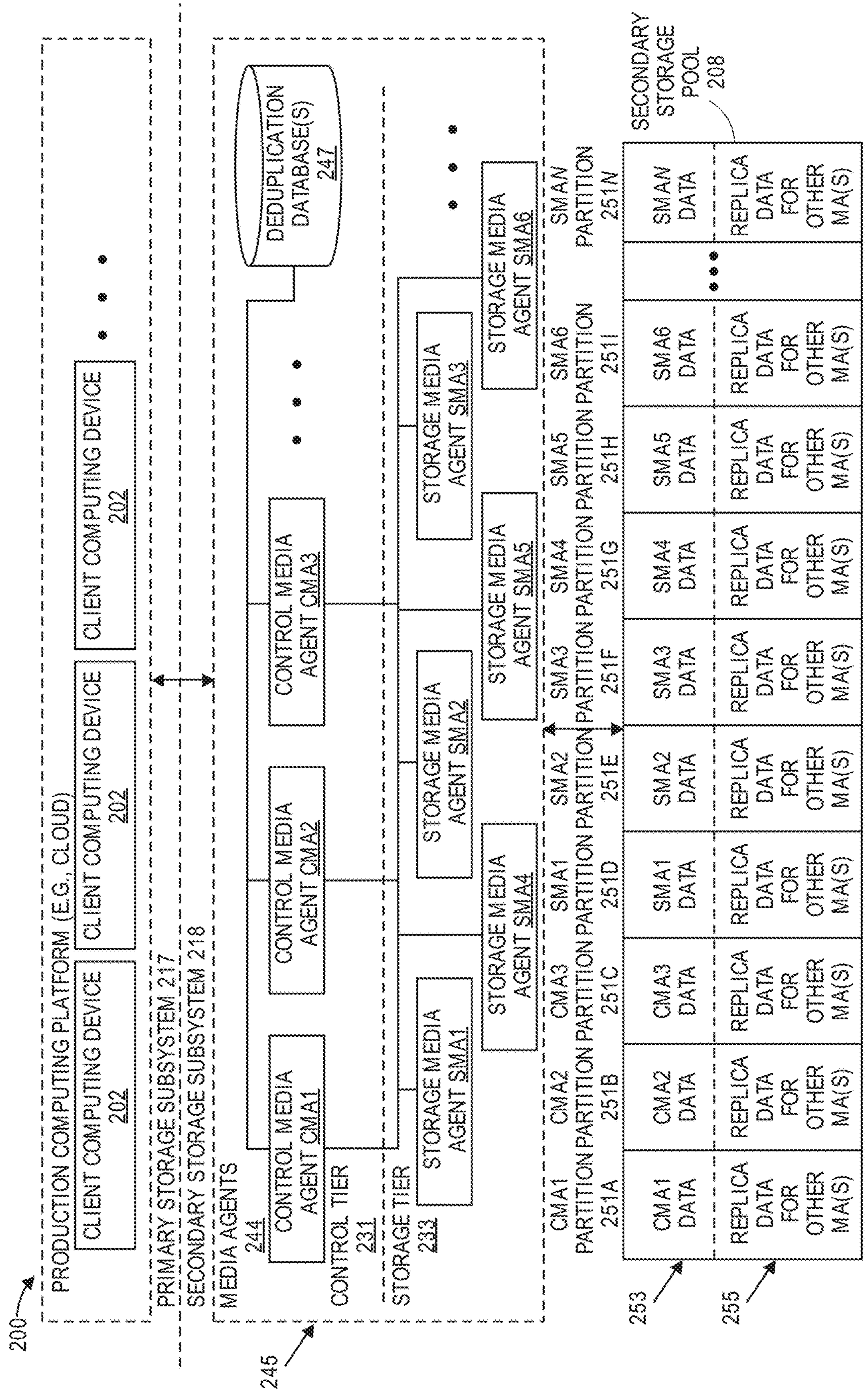
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. No. 9,633,033 entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Pat. No. 10,255,143 entitled "Deduplication Replication In A Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Cloud Computing. The National Institute of Standards and Technology (NIST) provides the following definition of Cloud Computing characteristics, service models, and deployment models:

Cloud Computing

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Essential Characteristics:

On-demand self-service. A consumer can unilaterally provision computing capabilities, such as server time and network storage, as needed automatically without requiring human interaction with each service provider.

Broad network access. Capabilities are available over the network and accessed through standard mechanisms that promote use by heterogeneous thin or thick client platforms (e.g., mobile phones, tablets, laptops, and workstations).

Resource pooling. The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, and network bandwidth.

Rapid elasticity. Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured service. Cloud systems automatically control and optimize resource use by leveraging a metering capability[1] at some level of abstraction appropriate to the type of service (e.g., storage, processing, bandwidth, and active user accounts). Resource usage can be monitored, controlled, and reported, providing transparency for both the provider and consumer of the utilized service.

[1] Typically this is done on a pay-per-use or charge-per-use basis.

Service Models:

Software as a Service (SaaS). The capability provided to the consumer is to use the provider's applications running on a cloud infrastructure[2]. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

[2] A cloud infrastructure is the collection of hardware and software that enables the five essential characteristics of cloud computing. The cloud infrastructure can be viewed as containing both a physical layer and an abstraction layer. The physical layer consists of the hardware resources that are necessary to support the cloud services being provided, and typically includes server, storage and network components. The abstraction layer consists of the software deployed across the physical layer, which manifests the essential cloud characteristics. Conceptually the abstraction layer sits above the physical layer.

Platform as a Service (PaaS). The capability provided to the consumer is to deploy onto the cloud infrastructure consumer-created or acquired applications created using programming languages, libraries, services, and tools supported by the provider.[3] The consumer does not manage or control the underlying cloud infrastructure including network, servers, operating systems, or storage, but has control over the deployed applications and possibly configuration settings for the application-hosting environment.

[3] This capability does not necessarily preclude the use of compatible programming languages, libraries, services, and tools from other sources.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls).

Deployment Models:

Private cloud. The cloud infrastructure is provisioned for exclusive use by a single organization comprising multiple consumers (e.g., business units). It may be owned, managed, and operated by the organization, a third party, or some combination of them, and it may exist on or off premises.

Community cloud. The cloud infrastructure is provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public cloud. The cloud infrastructure is provisioned for open use by the general public. It may be owned, managed, and operated by a business, academic, or government organization, or some combination of them. It exists on the premises of the cloud provider.

Hybrid cloud. The cloud infrastructure is a composition of two or more distinct cloud infrastructures (private, community, or public) that remain unique entities, but are bound together by standardized or proprietary technology that enables data and application portability (e.g., cloud bursting for load balancing between clouds).

Source: Peter Mell, Timothy Grance (September 2011). The NIST Definition of Cloud Computing, National Institute of Standards and Technology: U.S. Department of Commerce. Special publication 800-145. nvlpubs.nist.gov/nistpubs/Legacy/SP/nistspecialpublication800-145.pdf (accessed 26 Apr. 2019). Cloud computing aims to allow those who consume the services (whether individuals or organizations) to benefit from the available technologies without the need for deep knowledge about or expertise with each of them. Wikipedia, Cloud Computing, en.wikipedia.org/wiki/Cloud_computing (accessed 26 Apr. 2019). "Cloud computing metaphor: the group of networked elements providing services need not be individually addressed or managed by users; instead, the entire provider-managed suite of hardware and software can be thought of as an amorphous cloud." Id.

Cloud Service Accounts and Variability in Cloud Services. Cloud service providers such as Amazon, Microsoft, Alibaba, Google, Salesforce, Cisco, etc. provide access to their particular cloud services via cloud service accounts, such as corporate accounts, departmental accounts, individual user accounts, etc. Each cloud service account typically has authentication features, e.g., passwords, certificates, etc., to restrict and control access to the cloud service. Each account also might have service level guarantees and/or other terms and conditions between the cloud service provider and the service subscriber, e.g., a company, a government agency, an individual user. A subscribing entity might have multiple accounts with a cloud service provider, such as an account for the Engineering department, an account for the Finance department, an account for the Human Resources department, other accounts for individual company users, etc., without limitation. Each cloud service account carries different authentication, even though the services subscriber is the same entity.

Different cloud service accounts might differ not just in service level guarantees, but might include different services. For example, one account might include long-term storage resources, whereas another account might be limited to ordinary data storage. For example, some accounts might have access to data processing functions supplied by the cloud service provider, such as machine learning algorithms, statistical analysis packages, etc., whereas other accounts might lack such features. Accordingly, the resources available to the user(s) of cloud service accounts can vary as between accounts, even if the accounts have the same subscriber and the same cloud service provider. Thus, the user experience and the technologies available as between cloud service accounts can vary significantly. Thus, when considering cloud computing, the specifics of cloud service accounts can play a role in the availability and/or portability of resources. Crossing account boundaries can pose technological barriers when considering migration of applications and their cloud services assets.

Cloud Availability Zones. "Availability zones (AZs) are isolated locations within . . . regions from which public cloud services originate and operate. Regions are geographic locations in which public cloud service providers' data centers reside. Businesses choose one or multiple worldwide availability zones for their services depending on business needs. Businesses select availability zones for a variety of reasons, including compliance and proximity to end customers. Cloud administrators can also choose to replicate services across multiple availability zones to decrease latency or protect resources. Admins can move resources to another availability zone in the event of an outage. Certain cloud services may also be limited to particular regions or AZs." Source: Margaret Rouse, Definition of Availability Zones, TechTarget, searchaws.techtarget.com/definition/availability-zones (accessed 26 Apr. 2019).

Here is a vendor-specific example of how cloud service availability zones are organized in the Google Cloud: "Certain [Google] Compute Engine resources live in regions or zones. A region is a specific geographical location where you can run your resources. Each region has one or more zones; most regions have three or more zones. For example, the us-central1 region denotes a region in the Central United States that has zones us-central1-a, us-central1-b, us-central1-c, and us-central1-f. Resources that live in a zone, such as instances or persistent disks, are referred to as zonal resources. Other resources, like static external IP addresses, are regional. Regional resources can be used by any resources in that region, regardless of zone, while zonal resources can only be used by other resources in the same zone. For example, disks and instances are both zonal resources. To attach a disk to an instance, both resources must be in the same zone. Similarly, if you want to assign a static IP address to an instance, the instance must be in the same region as the static IP. Only certain resources are region- or zone-specific. Other resources, such as images, are global resources that can be used by any other resources across any location. For information on global, regional, and zonal Compute Engine resources, see Global, Regional, and Zonal Resources." Source: Google Cloud Regions and Zones, cloud.google.com/compute/docs/regions-zones/ (accessed 26 Apr. 2019) (emphasis added).

Accordingly, when considering cloud computing, availability zones can play a role in the availability and/or portability of resources. Crossing zone boundaries can pose technological barriers when considering migration of applications and their cloud service assets, even when the different availability zones are supplied by the same cloud service provider.

Traditional Non-Cloud ("On-Premises") Data Centers are Distinguishable from Cloud Computing. Traditional data centers generally do not have cloud computing characteristics. For example, the user experience is generally different, for example in regard to the name space(s) used for the storage, computing, and network resources. Moreover, substantial increases in resources needed by a user are not provisioned on demand. A traditional data center is physically located within the enterprise/organization that owns it. A traditional non-cloud data center might comprise computing resources such as servers, mainframes, virtual servers/clusters, etc.; and/or data storage resources, such as network-attached storage, storage area networks, tape libraries, etc. The owner of the traditional data center procures hardware, software, and network infrastructure (including making the associated capital investments); and manages going-forward planning for the data center. A traditional data center is staffed by professional Information Technology (IT) personnel, who are responsible for the data center's configuration, operation, upgrades, and maintenance. Thus, a traditional non-cloud data center can be thought of as self-managed by its owner/operator for the benefit of in-house users, as compared to cloud computing, which is managed by the cloud service provider and supplied as a service to outside subscribers. Clearly, a cloud computing service also has hardware, software, and networking infrastructure and professionals staffing it, as well as having an owner responsible for housing and paying for the infrastructure. However, the cloud computing service is consumed differently, served differently, and deployed differently compared to non-cloud data centers. Traditional non-cloud data centers are sometimes referred to as "on-premises" data centers, because their facilities are literally within the bounds of the organization that owns the data center. Cloud service providers' data centers generally are not within the bounds of the subscriber organization and are consumed "at a distance" "in the cloud."

Accordingly, when considering cloud computing versus non-cloud data center deployment, the choice can play a role in the availability and/or portability of resources. Crossing boundaries between non-cloud data centers and cloud computing can pose technological barriers. For example, storing a database at a non-cloud data center might require different resources and/or access features/controls than storing the database at a cloud computing service. Thus, moving the database from the non-cloud data center to a cloud service account may require data conversion, re-configuration, and/or adaptation that go above and beyond merely copying the database. Likewise for virtual machines (VMs). Conversely, moving data, applications, VMs, and/or web services from cloud computing to a non-cloud data center also can involve data conversion, re-configuration, and/or adaptation to ensure success.

Service Models. Differences in service models, comparing non-cloud "on-premises" data centers versus IaaS versus PaaS versus SaaS, can yield different performance and cost profiles. Different service models can affect resource availability and/or portability of distributed/serverless applications, at least because the management of different resources rests with different providers and governed by different terms and conditions. See, e.g., Stephen Watts, SaaS vs PaaS vs IaaS: What's The Difference and How To Choose, BMC Blogs, BMC Software, Inc., www.bmc.com/blogs/saas-vs-paas-vs-iaas-whats-the-difference-and-how-to-choose/(accessed 26 Apr. 2019).

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Live Mount of Virtual Machines in a Public Cloud Computing Environment

Live Mount is illustratively invoked by a storage manager that is generally responsible for managing data storage, storage operations, and information management in the illustrative data storage management system. Providing live mount capabilities in public cloud computing environments such as Amazon Web Services (AWS), Google Cloud Platform (GCP), Microsoft Azure, etc. is not possible in the prior art, because of very restrictive boot environments that do not allow Preboot eXecution Environment (e.g., PXE, iPXE) technologies for booting of non-native VM disks from external sources such as 3DFS[1] from Commvault Systems, Inc. Thus, even though a data agent (e.g., the so-called Virtual Server Agent (VSA) from Commvault Systems, Inc.) can back up virtual machines (VMs), including cloud-based VMs, the prior art cannot provide the ability to live mount these non-cloud-native backup copies in a public cloud computing environment.

[1] "Commvault 3DFS solution . . . restore[s] data from a backup to any compatible computer, even if the computer does not have the Commvault software installed on it . . . . Commvault 3DFS solution . . . export[s] backed-up data on the MediaAgent as an NFS share, and then mount[s] the share on the NFS clients [which] can access the data, even if they do not have the Commvault software." Source: Overview: 3DFS, Commvault Systems, Inc. V11 SP6 Documentation, available at http://documentation.commvault-.com/commvault/v11_sp6/article?p=products/3dnfs/c_3dnfs_overview.htm (accessed May 7, 2019).

To overcome this significant deficiency of the prior art, the present inventors devised an approach of gaining control over 1/O to/from VM virtual disks, including the operating system (OS) disk and one or more data disks. Coupled with the novel components and capabilities of the illustrative data storage management system disclosed herein, this approach enables VMs to be live mounted in a public cloud computing environment using non-cloud-native backup copies.

In some embodiments, snapshots of the original VM may be available in the destination cloud computing environment and may be used as an alternative data source instead of the backup copies. In some examples, cloud-based VM snapshots will be called out separately, while in others it is to be understood that the illustrative data storage management system comprises features for using cloud-based VM snapshots as an alternative to the proprietary VM backup copies as a data source for live mount and live recovery.

Figure 3A:
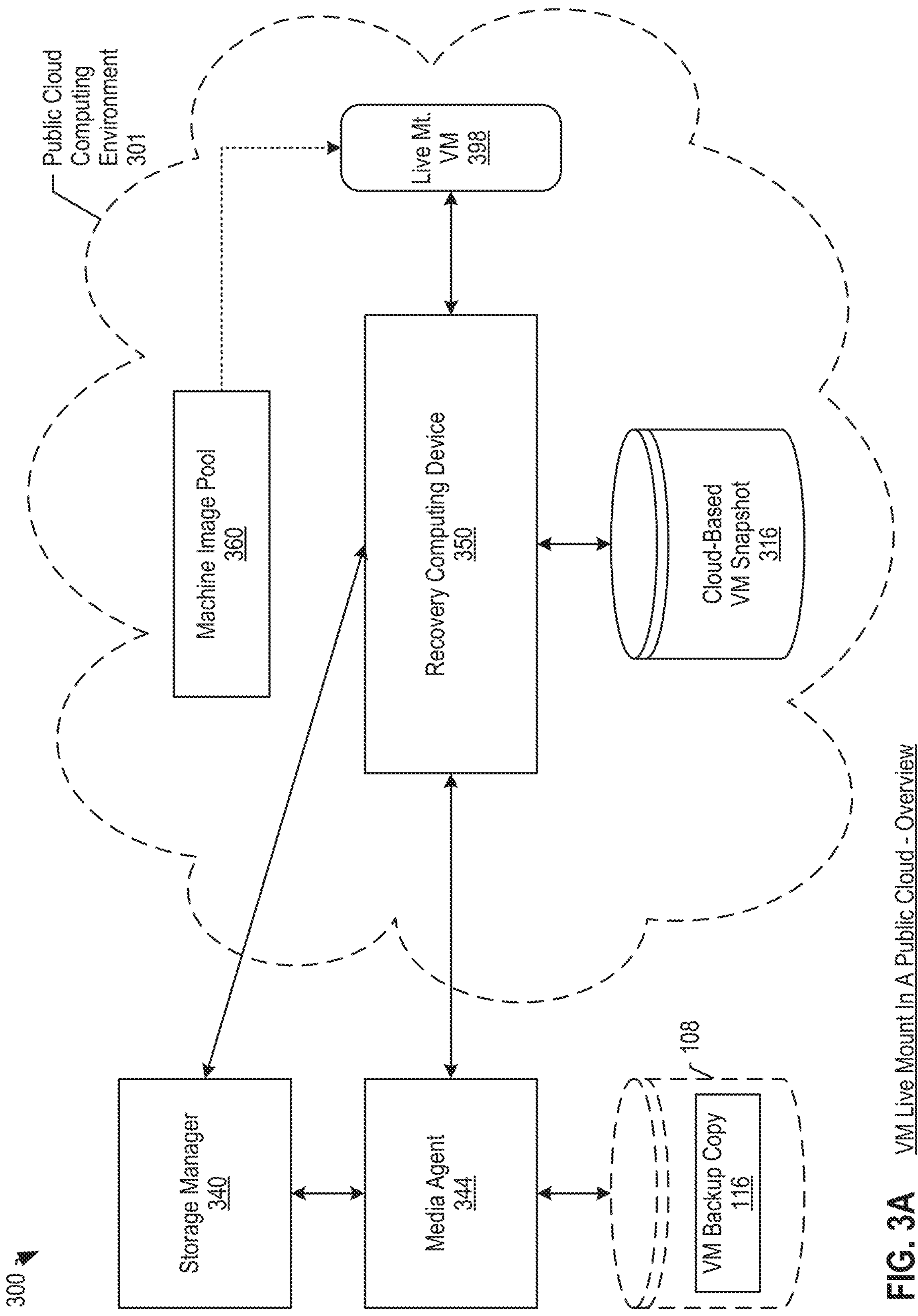
FIG. 3A is a block diagram illustrating some salient portions of a system 300 for live mounting a VM in a public cloud computing environment, according to an illustrative embodiment.

FIG. 3A is a block diagram illustrating some salient portions of a system 300 for live mounting a VM in a public cloud computing environment, according to an illustrative embodiment. The present figures depicts: public cloud computing environment 301 comprising cloud-based VM snapshot 316, recovery computing device 350, machine image pool 360, and live-mounted VM 398; storage manager 340; and media agent 344 communicatively coupled to secondary storage device 108, which comprises one or more VM backup copies 116.

Data storage management system 300 is analogous to system 100 and is further enhanced with features and/or components for live mounting VMs in a public cloud computing environment as described herein. Illustratively, system 300 comprises all depicted components in the present figure except for public cloud computing environment 301, but the invention is not so limited.

VM backup copy 116 is a secondary copy of a VM, the backup copy created by system 300. Illustratively, media agent 344 generated VM backup copy 166 and stored it to secondary storage device (backup storage, backup media) 108. VM backup copy 116 is a data source for live mounted VM 398.

Public cloud computing environment 301 is a cloud computing environment supplied by a cloud service provider such as Amazon (e.g., Amazon Web Services), Microsoft (e.g., Azure Cloud), Google (e.g., Google Cloud Platform), etc. Public cloud computing environment 301 is well known in the art.

Cloud-based VM snapshot 316 is a secondary copy of a VM. Snapshot 316 is initiated by system 300 and is stored as a cloud-native snapshot within public cloud computing environment 301. In some embodiments, snapshot 316 is used as an alternative to VM backup copy 116 as a data source for live-mounted VM 398. The disclosed solutions use proprietary components of systems 300/400 to live-mount from the snapshot in a manner consistent with how the non-cloud-native backup copies are live-mounted. This approach enables a streamlined approach, across technologies, that allows system 300 to live mount any number of backup copies 116 and/or snapshots 316 consistently, providing customers with a unified service that is agnostic, from the user's perspective of whether the data source is a cloud-native snapshot 316 or a non-cloud-native backup copy 116. Likewise in regard to live recovery by system 400.

Storage manager 340 is analogous to storage manager 140 and additionally comprises features for operating in system 300 and/or system 400 (see FIG. 4A), e.g., for initiating and managing VM live mount, initiating and managing VM live recovery, managing the creation of VM backup copy 116, initiating the creation of VM snapshot 316, etc. Storage manager 340 is generally responsible for managing storage operations in system 300 and/or system 400, and includes features for administration of VM live mount and VM live recovery features. Storage manager 340 is communicatively coupled with recovery computing device 350/450 and with media agent 344 as needed.

Media agent 344 is analogous to media agent 144 and additionally comprises features for operating in system 300 and/or system 400, such as communicating with recovery computing device 350/450. In some embodiments, the media agent executes on a distinct computing device separate from the recovery computing device 350/450, but the invention is not so limited, and in some embodiments these two components may be co-resident. In some embodiments, the media agent is topographically close to the backup media from a networking perspective, i.e., outside the VM host cloud 301.

Recovery computing device 350 is a computing device that comprises one or more hardware processors and computer memory for executing computer instructions. Recovery computing device is configured as a computing resource in cloud computing environment 301. Recovery computing device 350 executes specialized software for operating as a component of system 300. More details are given in FIG. 3B.

Machine image pool 360 is a pre-packaged (or pre-configured) pool of machine images or operating system images (e.g., Amazon machine image (AMI), etc.). This "machine image pool" is configured in the VM host cloud (e.g., 301) as a persistent resource for future live mount and live recovery operations. Each image comprises utilities for loading a root file system into a target VM such as the live-mounted VM, and further comprises key drivers for setting up the VM's virtual disk, such as an Network File System (NFS) driver and a network interface card (NIC) driver; the NIC driver is accompanied by a script for registering Internet Small Computer Systems Interface (iSCSI) disks. The pool comprises custom pre-created initramfs (or equivalent technologies) built with NFS, NIC drivers with a script to register iSCSI disks. The machine image pool is tapped when a VM is to be live-mounted or temp-mounted in the public cloud computing environment 301. Accordingly, a proper machine image is selected that is suitable to the configuration of the target VM, e.g., having a certain version of a certain operating system, etc. This pool is pre-created in the public cloud computing environment 301 before the live mount and/or live recovery operation is initiated.

Live-mounted VM 398 is a cloud-based virtual machine configured in public cloud computing environment 301. This VM is the target VM for live-mounting VM backup copy 116 or VM snapshot 316 as described herein.

FIG. 3B is a block diagram depicting certain configuration details and key operations of a VM live mount configuration in a public cloud computing environment, according to an illustrative embodiment. The present figure depicts certain details of system 300, including: VM backup copy 116; cloud-based VM snapshot 316; storage manager 340; media agent 344 comprising media agent index 153; recovery computing device 350 comprising recovery process 352, recall thread 354, pseudo-disk driver 356, pseudo-disk 358, operating system (OS) mount point 370, and data disk mount point(s) 372; machine image pool 360 comprising selected boot image 362; and live-mounted VM 398. Certain operations or steps of the VM live mount feature are designated by letters A through H.

Recovery process 352 is an illustrative process that executes on recovery computing device 350 and communicates with storage manager 340. Recovery process 352 illustratively comprises recall thread 354 and in some embodiments also comprises pseudo-disk driver 356, but the invention is not so limited. The recovery process coordinates some aspects of the live mount operation, such as invoking a pseudo-disk driver 356 corresponding to each VM virtual disk of the source VM, causing the pseudo-disk driver 356 to set up the corresponding pseudo-disk 358, selecting a suitable machine image 362 from the machine image pool 360, causing a VM 398/498 to be instantiated for the live-mount/temp-mount operation. In the live recovery operation (see FIGS. 4A and 4B), the recovery process 352 also acts to coordinate the switchover from temp-mounted VM to recovery VM. In some embodiments recovery process 352 acts as NFS server and iSCSI target to export OS and data disks which use mount points 370 and 372, respectively.

Recall thread 354 is an illustrative thread that runs within recovery process 352 and which received requests for extents from pseudo-disk driver 356, which intercepts read requests from VM 398. Recall thread 354 is responsible for obtaining extents from VM backup copy 116 and/or from cloud-based VM snapshot 316. To accomplish the former, recall thread 354 requests extents from media agent 344, which uses its backup index 153 to locate the requested extent on backup media 108, extract the extent from VM backup copy 116, process it if necessary (e.g., decrypt, decompress, etc.), and transmit the result to recall thread 354. To accomplish the latter, recall thread 354 is configured to use cloud-native application programming interface(s) (API) to extract extents from cloud-based VM snapshot 316. Recall thread 354 transmits the recalled (extracted, recovered, restored) extents to pseudo-disk driver 356.

Pseudo-disk driver 356 is a driver that executes on recovery computing device 350/450. The illustrative pseudo-disk driver 356 interoperates with the media agent 344 and with the live-mounted/temp-mounted VM 398/498. For live recovery, pseudo-disk driver 356 also interoperates with the cloud-based virtual disk(s) 404 assigned to the recovery VM (see FIG. 4A). Pseudo-disk driver 356 presents to the media agent 344 and to the live-mounted/temp-mounted VM 398/498 a pseudo-disk as a block storage device for receiving and serving data. Pseudo-disk driver 356 places data received from the media agent, which is retrieved from the backup copy on backup media and/or from VM snapshot 316, to a logically-defined "recall store" in the pseudo-disk. Pseudo-disk driver 356 places write data received from the live-mounted/temp-mounted VM 398/498 to a logically-defined "private store" in the pseudo-disk. Pseudo-disk driver 356 manages the private store and the recall store.

For live mount, pseudo-disk driver 356 configures the private store and recall store at recovery computing device 350 and pseudo-disk driver 356 intercepts read and write requests issued by live-mounted VM 398. Data in the write requests is stored to the private store. Ultimately, data in the recovery computing device-based private store will be discarded when live-mounted VM 398 expires or is taken down. Read requests issued by live-mounted VM 398 are intercepted by pseudo-disk driver 356 and are preferentially served from the private store or the recall store at recovery computing device 350; if a read request cannot be served therefrom, pseudo-disk driver 356 issues a read request to recall thread 354 to retrieve the data from a secondary copy, e.g., backup copy 116 or VM snapshot 316; stores the response to the recall store; and serves the read request from the recall store. In this way, the recall store is populated over time from on-demand read requests issued by the live-mounted VM 398. An example embodiment of pseudo-disk driver 356 is the "cvblk" driver developed by Commvault Systems, Inc. of Tinton Falls, New Jersey, USA. Another example use case of the pseudo-disk driver is described in U.S. Pat. No. 9,852,026 entitled "Efficient Application Recovery In An Information Management System Based On A Pseudo-Storage-Device Driver," which is owned by the applicant and which is incorporated by reference in its entirety herein.

Pseudo-disk 358 is generated and managed by pseudo-disk driver 356 and comprises two logically defined storage areas configured at recovery computing device 350—the recall store and the private store.

Operating system (OS) mount point 370 is a mount point specially configured for accessing an OS virtual disk or OS partition of a virtual disk for live-mounted VM 398. Illustratively, mount point 370 is configured for NFS. Mount points are well known in the art.

Data disk mount point(s) 372 are one or more mount points specially configured for accessing data (not OS) virtual disks or partitions for live-mounted VM 398. Illustratively, mount point(s) 372 are configured for iSCSI.

Selected boot image 362 is one of the machine images in machine image pool 360 and is well known in the art. Boot image 362 is selected (e.g., by recovery process 352) to match or closely mimic the source VM from which VM backup copy 116 and/or VM snapshot 316 was created, so that the target VM 398 will be compatible with it when live-mounted.

A high level workflow of the illustrative live mount feature includes the following operations. At step A, recovery computing device 350 receives a request to live-mount a VM from storage manager 340. Illustratively, an OS disk flag is included in the request. Recovery computing device 350 invokes recovery process 352. At step B, recovery computing device 350 (e.g., using recovery process 352) invokes pseudo-disk driver 356, which creates a pseudo-disk block storage device 358 at recovery computing device 350. One pseudo-disk 358 is created for each virtual disk in the backup copy 116/VM snapshot 316. For simplicity, the rest of the workflow will refer to a single pseudo-disk 358. Recovery process 352 creates recall thread 354, which will become active after target VM 398 is powered on. At step C, mount (using OS disk mount point 370) all partitions of OS disk from backup copy 116/VM snapshot 316 and export over NFS. At step D, mount all data (non-OS) disks/partitions from backup copy 116/VM snapshot 316 using data disk mount point(s) 372; create a unique iSCSI Qualified Name (IQN) for each iSCSI target and create a unique IQN for iSCSI initiator for each request followed by creating a LUN under the IQN target to export cvblk data disk as SCSI disk. Based on this information, a user-data script is generated (e.g., by recovery process 352), which will be used at step F. At step E, recovery logic 352 selects boot image 362 for target VM 398. At step F, VM 398 is created from selected boot image 362 and includes the user-data script. The VM is booted up (for the first time) and the cloud-init routine executes the user-data script to customize VM 398. Cloud-init is used for customizing cloud-based images and is well known in the art. During this first boot, the user-data script detects that this is the first boot of the VM and updates kernel parameters for NFS root (per step B) and causes VM 398 to reboot (second boot) from NFS, i.e., booting off the OS partition/disk of the backup copy.

After the reboot, the user-data script detects it is a reboot and takes a different path than on first boot. Accordingly, the user-data script attaches VM 398 to the other (non-OS) partitions/disks that were exposed as iSCSI targets at step C.

At this point, VM 398 sees all the mounted file systems (via mount points 370 and 371) and is now "live mounted." Live-mounted VM 398 issues reads and writes, which are intercepted by pseudo-disk driver 356. Pseudo-disk driver 356 writes all data from writes into pseudo-disk 358 (at the private store) and attempts to serve reads to VM 398. If a read cannot be served from the private store or the recall store at the pseudo-disk, pseudo-disk driver 356 initiates a request to recall thread 354 to obtain the requested data (e.g., extent) from the secondary copy, e.g., backup copy 116, VM snapshot 316. At step G, recall thread 354 requests the extent from media agent 344, which locates it on backup media with the help of backup index 153 and retrieves the extent at step H. The extent is then delivered to recall thread 354 and transmitted to pseudo-disk driver 356. At step G', recall thread 354 retrieves the extent from VM snapshot 316 using a cloud-native API for accessing cloud-based snapshots and delivers the extent to pseudo-disk driver 356. After step G/H or G', pseudo-disk driver 356 stores the recalled extent to the recall store in pseudo-disk 358 and serves it from there to live-mounted VM 398. When live-mounted VM 398 expires or is powered off, pseudo-disk driver 356 discards pseudo-disk 358, including the private store that hosted new data issued by live-mounted VM 398. More details are given in FIGS. 7 and 7A.

An illustrative logic for the user-data script used by VM 398 comprises: if nfsroot is not set, then claim iSCSI disks using initiator login and mount other partitions of OS disk; if nfsroot is not set, then replace set nfsroot as "NFS server recovery computing device IP:mount point of root filesystem" and on completion reboot the VM. The following entry makes the user-data script run again on each reboot:

```
#cloud-config
cloud_final_modules:
- [scripts-user, always]
```

Figure 7A:
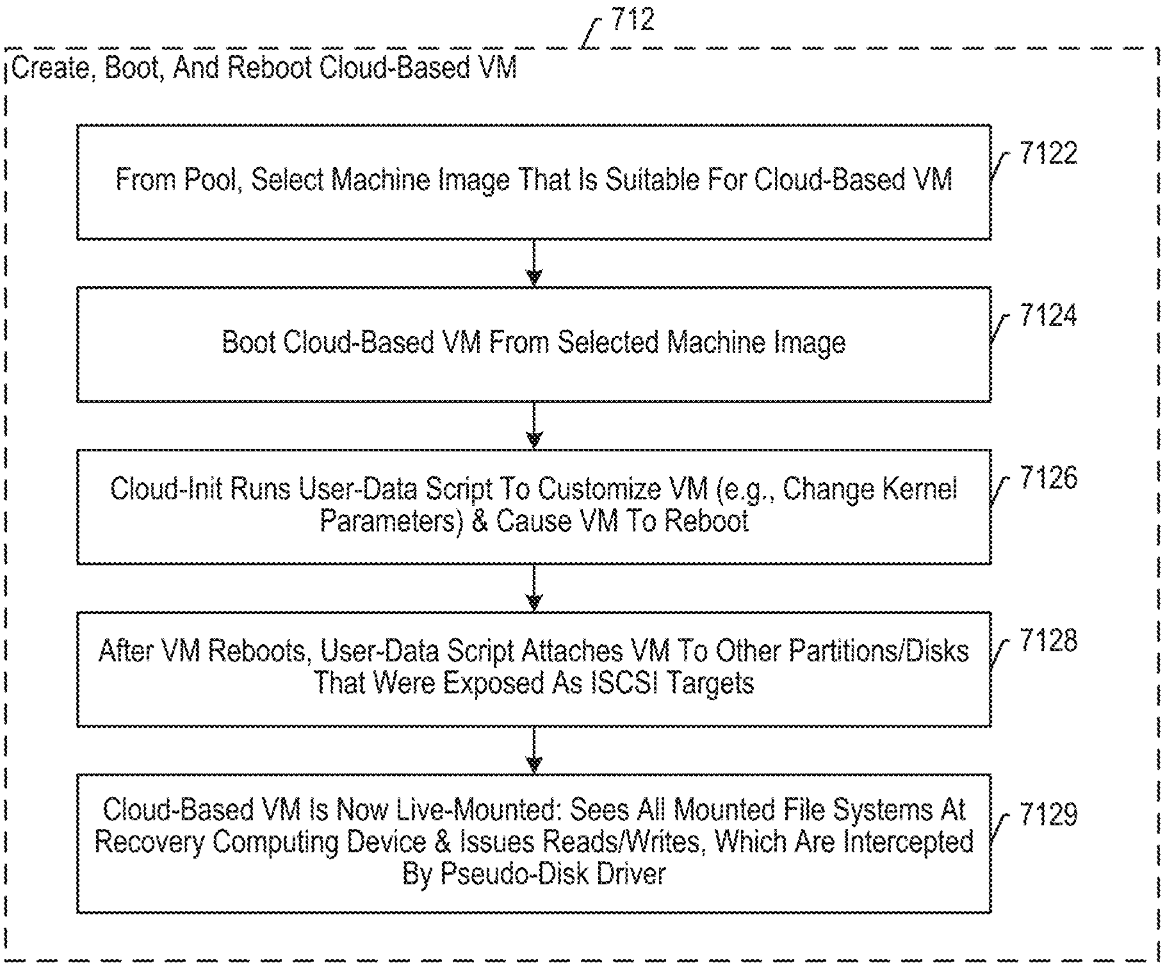
FIG. 7A depicts some salient operations of block 712 of method 700 according to an illustrative embodiment.

In sum, VM live mount provides streamlined access to backed up VM data using a VM in a public cloud computing environment without having to restore entire backup copies. Rather, only data expressly requested by the live-mounted VM is recalled on demand from backup media. The backup copies are non-cloud-native and can be in any format generated by the backup system that created them, e.g., the illustrative data storage management system or another compatible system. In some embodiments, the backup copy is a cloud-native snapshot of a VM, which is also made accessible without having to restore it in its entirety. The solution works for Linux family guest OSs on the live-mounted VM because Linux OS supports booting over NFS. When Windows OS supports booting over NFS or CIFS, live mount can be implemented for Windows OS live-mounted VMs as well. Additional details are depicted in FIGS. 7 and 7A. Embodiments are contemplated for non-cloud-to-cloud, cloud-to-cloud, and multi-cloud live mount configurations, with the live-mounted VM operating in a public cloud computing environment. See, e.g., FIGS. 3A, 5, and 6.

Live Recovery of Virtual Machines in a Public Cloud Computing Environment

"Live Recovery" of a VM provides a longer-term platform than live mount because it generates a new "recovery VM" that operates as an ongoing "live" production platform. The recovery VM advantageously inherits new data written by another, temporarily-mounted, VM that operates while a VM backup copy or VM snapshot is restored in the background. The new data generated by the temp-mounted VM is captured in cloud-based virtual disk(s) that attach to the recovery VM as its datastore after the restore operation completes. Live recovery causes data blocks from a backup copy or snapshot to be restored (recovered, retrieved, recalled, moved) from backup media to cloud-based virtual disk(s) assigned to the recovery VM. The restore operation methodically transfers all data portions of the backup copy/snapshot to the cloud-based virtual disk(s), enabling the cloud-based recovery VM to be fully operational in the cloud computing environment on a going-forward basis. The advantage of live recovery over a traditional restore operation is that live recovery enables a cloud-based VM to begin operating sooner than waiting for the restore to complete. With live recovery, VM reads and writes begin issuing sooner, even while the restore operation is still in progress, and the writes are not lost on completion. However, the prior art does not support live recovery of a VM in a public cloud computing environment from a non-cloud-native backup copy, as explained in regard to the live mount feature. The present disclosure presents a technological solution that overcomes the deficiencies of the prior art.

FIG. 4A is a block diagram illustrating some salient portions of a system 400 for VM live recovery in a public cloud computing environment, according to an illustrative embodiment. FIG. 4A depicts: public cloud computing environment 301 comprising cloud-based VM snapshot 316, machine image pool 360, recovery VM 402, cloud-based virtual disk (vdisk) 404, recovery computing device 450, and temp-mounted VM 498; storage manager 340; and media agent 344 communicatively coupled to secondary storage device 108, which comprises one or more VM backup copies 116.

Data storage management system 400 is analogous to system 100 and system 300 and is further enhanced with features and/or components for live recovering of VMs in a public cloud computing environment as described herein. Illustratively, system 400 comprises all depicted components in the present figure except for public cloud computing environment 301, but the invention is not so limited.

Recovery VM 402 is a virtual machine that executes in public cloud computing environment 301 and is the "final" endpoint of the illustrative live recovery feature described herein. Recovery VM 402 uses cloud-based virtual disk(s) 404 as its datastore.

Cloud-based virtual disk (vdisk) 404 is a virtual disk configured in public cloud computing environment 301. Vdisk 404 is initially used to host a pseudo-disk managed by a pseudo-disk driver and ultimately attaches to recovery VM 402 as its datastore, while retaining all the data previously added by another VM—temp-mounted VM 498.

Recovery computing device 450 is analogous to recovery computing device 350 and additionally comprises certain components shown in FIG. 4B. Recovery computing device 450 operates in public cloud computing environment 301 and is communicatively coupled to cloud-based virtual disk(s) 404.

Temp-mounted VM 498 is a cloud-based virtual machine configured in public cloud computing environment 301. This VM is mounted temporarily, typically while VM backup copy 116 or VM snapshot 316 is restored to vdisk 404, and provides "live" service to users based on the data source, i.e., VM backup copy 116 or VM snapshot 316. Like live-mounted VM 398, temp-mounted VM 498 is communicatively coupled to pseudo-disk driver 356, which intercepts its reads and writes. Unlike live-mounted VM 398, temp-mounted VM 498 has its reads and writes served by vdisk 404, which retains the writes issued by temp-mounted VM 498 and ultimately becomes the datastore for recovery VM 402. At an appropriate time after the restore to vdisk 404 is finished, temp-mounted VM 498 is powered down and control switches over to recovery VM 402. More details are given in FIGS. 4B, 8, and 8A.

FIG. 4B is a block diagram depicting certain configuration details and key operations of VM live recovery configuration in a public cloud computing environment, according to an illustrative embodiment. The present figure depicts certain details of system 400, including: VM backup copy 116; cloud-based VM snapshot 316; storage manager 340; media agent 344 comprising backup index 153; recovery VM 402; cloud-based vdisk(s) 404; recovery computing device 450 comprising recovery process 352, recall thread 354, pseudo-disk driver 356, operating system (OS) mount point 370, data disk mount point(s) 372, data mover thread 455, and I/O bitmap 456; selected boot image 362; and temp-mounted VM 498. Certain operations or steps of the VM live recovery feature are designated by letters A through J.

Recovery process 352 illustratively comprises recall thread 354 and data mover thread 455 and in some embodiments also comprises pseudo-disk driver 356, but the invention is not so limited. Recovery process 352 coordinates some aspects of the live recovery operation, such as invoking a pseudo-disk driver 356 corresponding to each VM virtual disk of the source VM, causing the pseudo-disk driver 356 to set up a corresponding pseudo-disk at vdisk 404, selecting a suitable machine image 362 from machine image pool 360, causing VM 498 to be instantiated for the temp-mount operation, and also acts to coordinate the switchover from temp-mounted VM 498 to recovery VM 403. In some embodiments recovery process 352 acts as NFS server and iSCSI target to export OS and data disks which use mount points 370 and 372, respectively.

Data mover thread 455 is an illustrative thread that runs within recovery process 352. Data mover thread 455 causes the VM backup copy 116 or VM snapshot 316 to be sequentially traversed to move data extents directly to vdisk 404. Data mover thread 455 sequentially requests the next extent from pseudo-disk-driver 356, which invokes recall thread 354 to recover the extent from VM backup copy 116 or VM snapshot 316. Data mover thread 455 ensures synchronization and arbitration in cases where an on-demand read arrives for an extent that is currently being recalled from backup copy/snapshot. In such a case, data mover thread 455 allows the recall to complete and then the on-demand read request is served from vdisk 404. This logic ensures that there are no double-takes on recalls from backup copy/snapshot.

I/O bitmap 456 is a data structure configured and maintained at recovery computing device 450. Illustratively, bitmap 456 is maintained by pseudo-disk driver 356 when running the live recovery feature. Bitmap 456 tracks whether each extent of the data source (e.g., VM backup copy 116, VM snapshot 316) has been recalled and/or written by temp-mounted VM 498. This process ensures that all of the data source is recovered and its extents stored to the cloud-based virtual disk(s) 404.

Pseudo-disk driver 356 executes on recovery computing device 450. The illustrative pseudo-disk driver 356 interoperates with the media agent 344 and with temp-mounted VM 498, as well as with cloud-based virtual disk(s) 404 assigned to recovery VM 402. pseudo-disk driver 356. In contrast to live mount, in the live recovery feature pseudo-disk driver 356 configures its pseudo-disk, including private store and recall store, at cloud-based vdisk 404 that will ultimately serve as the recovery VM's datastore. This aspect is distinguishable from the expendable pseudo-disk 358 created for the live mount feature at recovery computing device 350. This key aspect provides a streamlined transfer of data from the data source to the final destination, i.e., to the recovery VM's datastore in the cloud.

A high level workflow of the illustrative live recovery feature includes the following operations. At step A, recovery computing device 450 receives a request to live recover a VM from storage manager 340. Illustratively, an OS disk flag is included in the request. Recovery computing device 450 invokes recovery process 352. At step B', recovery computing device 450 (e.g., using recovery process 352) instantiates cloud-based vdisk(s) 404 and invokes pseudo-disk driver 356, which creates a pseudo-disk block storage device at vdisk(s) 404. One pseudo-disk is created for each virtual disk in the VM backup copy 116/VM snapshot 316. For simplicity, the rest of the workflow will refer to a single pseudo-disk and/or single vdisk 404. Recovery process 352 creates recall thread 354, which will become active after VM 498 is powered on. At step BB, recovery process 352 creates data mover thread 455 and instantiates I/O bitmap 456. Data mover thread 455 begins to sequentially request data extents from pseudo-disk driver 356, which in turn requests the data extents from recall thread 354 followed by steps G/H or G'. As the extents are recalled from the data source and placed in the recall store, pseudo-disk driver 356 updates bitmap 456 to reflect this.

At step C, mount (using OS disk mount point 370) all partitions of OS disk from backup copy 116/VM snapshot 316 and export over NFS. At step D, mount all data (non-OS) disks/partitions from backup copy 116/VM snapshot 316 using data disk mount point(s) 372; create a unique iSCSI Qualified Name (IQN) for each iSCSI target and create a unique IQN for iSCSI initiator for each request followed by creating a LUN under the IQN target to export cvblk data disk as SCSI disk. Based on this information, a user-data script is generated (e.g., by recovery process 352), which will be used at step F. An illustrative logic for the user-data script used by VM 498 is given in the text accompanying FIG. 3B. At step E, recovery logic 352 selects boot image 362 for VM 498. At step F, VM 498 is created from selected boot image 362 and includes the user-data script. VM 498 is booted up for the first time and the cloud-init routine executes the user-data script to customize VM 498. During this first boot, the user-data script detects that this is the first boot of the VM and updates kernel parameters for NFS root (per step B') and then causes VM 498 to reboot (second boot) from NFS.

After the reboot, the user-data script detects it is a reboot and takes a different path than on first boot. Accordingly, the user-data script attaches VM 498 to the other (non-OS) partitions/disks that were exposed as iSCSI targets at step C. At this point, VM 498 sees all the mounted file systems (via mount points 370 and 372) and is now "temp-mounted" to recovery computing device 450. Temp-mounted VM 498 issues reads and writes, which are intercepted by pseudo-disk driver 356. Pseudo-disk driver 356 writes all data from writes into the private store at vdisk 404 and attempts to serve reads to VM 498. If a read cannot be served from the private store or the recall store at vdisk 404, pseudo-disk driver 356 initiates a request to recall thread 354 to obtain the requested data (e.g., extent) from the data source, e.g., VM backup copy 116, VM snapshot 316. At step G, recall thread 354 requests the extent from media agent 344, which locates it on backup media with the help of backup index 153 and retrieves the extent at step H. The extent is then delivered to recall thread 354 and transmitted to pseudo-disk driver 356. At step G', recall thread 354 retrieves the extent from VM snapshot 316 using a cloud-native API for accessing cloud-based snapshots and delivers the extent to pseudo-disk driver 356. After step G/H or G', pseudo-disk driver 356 stores the recalled extent to the recall store in the pseudo-disk at vdisk 404 and serves it from there to temp-mounted VM 498 in response to a read request from temp-mounted VM 498.

At step I, data mover thread 455 detects that the data source traversal is complete and indicates "end of move" to recovery process 352. At this point, system 400 is ready to switch over from temp-mounted VM 498 to recovery VM 402. Accordingly, all connections between recovery computing device 450 and vdisk 404 are severed. At step J, recovery VM 402 is created at public cloud computing environment 301, vdisk 404 is attached thereto as its datastore, and recovery VM 402 is powered on and able to provide live VM service. All data written by temp-mounted VM 498 is still on vdisk 404 and available to recovery VM 402, thus assuring continuity of service. More details are given in FIGS. 8 and 8A.

In sum, VM live recovery provides a new working VM (the recovery VM) in the public cloud with minimal downtime and without waiting to fully restore backup copies. The feature also enables migration of VMs across public clouds or from non-cloud (on-prem) data centers to public cloud. As noted, embodiments are contemplated for non-cloud-to-cloud, cloud-to-cloud, and multi-cloud live recovery, with the recovery VM operating in a public cloud computing environment. See, e.g., FIGS. 4A, 5, and 6.

Figure 5:
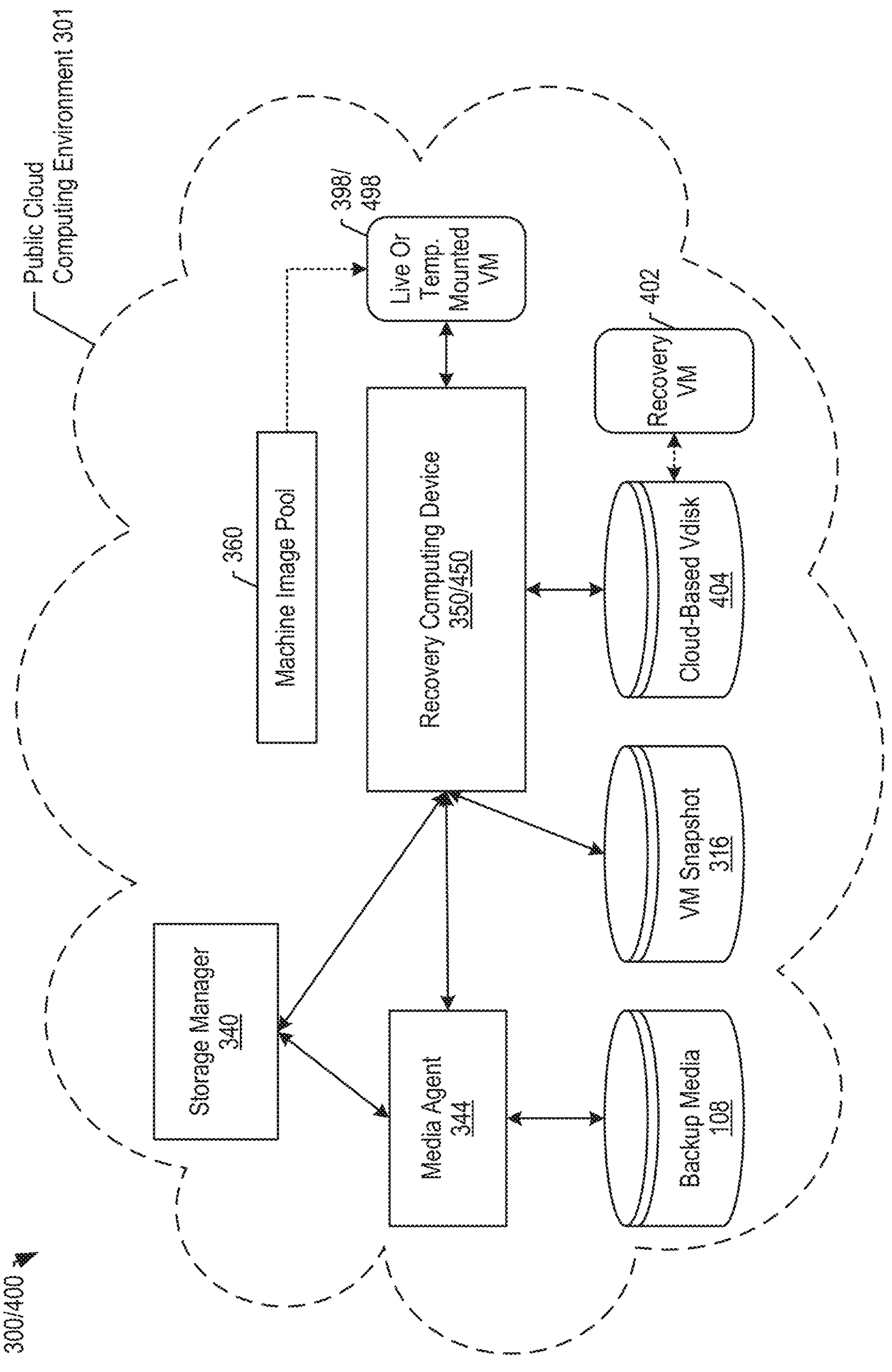
FIG. 5 is a block diagram illustrating an example configuration for VM live mount and/or VM live recovery in a single cloud computing environment.

FIG. 5 is a block diagram illustrating an example configuration for VM live mount and/or VM live recovery in a single cloud computing environment. The present figure depicts all components configured in and operating within public cloud computing environment 301, including: backup media 108 (comprising VM backup copy 116 not shown here), VM snapshot 316, storage manager 340, media agent 344, recovery computing device 350/450, machine image pool 360, recovery VM 402, cloud-based vdisk(s) 404, and VM 398/498. Although the original VM from which VM backup copy 116 and/or VM snapshot 316 originates is not shown here, it may be located within public cloud computing environment 301 or outside public cloud computing environment 301, without limitation.

FIG. 6 is a block diagram illustrating an example configuration of VM live mount and/or VM live recovery in multi-cloud computing environments. The present figure depicts components configured in and operating in a multi-cloud environment: public cloud computing environment 301 comprising VM snapshot 316, recovery computing device 350/450, machine image pool 360, recovery VM 402, cloud-based vdisk(s) 404, and VM 398/498; and public, private, and/or hybrid cloud computing environment 601 comprising backup media 108 (comprising VM backup copy 116 not shown here), storage manager 340, and media agent 344. Although the original VM from which VM backup copy 116 and/or VM snapshot 316 originates is not shown here, it may be located within environment 601 or outside environment 601, without limitation.

FIG. 7 depicts some salient operations of a method 700 according to an illustrative embodiment. Method 700 is illustratively performed by components of system 300 unless otherwise noted. See also FIGS. 3A and 3B.

At block 702, initiate live mount of VM in a public cloud computing environment from a data source, e.g., non-cloud-native VM backup copy 116, VM snapshot 316. Typically, a user might initiate a request to live mount a certain VM backup copy or VM snapshot, thus causing storage manager 340 to initiate the live mount feature within system 300, which roughly corresponds to step A in FIG. 3B.

At block 704, pseudo-disk driver creates a pseudo-disk at recovery computing device 350 for each virtual disk in the VM backup copy and/or VM snapshot. This roughly corresponds to step B in FIG. 3B.

At block 706, mount root partition of boot disk of the data source (VM backup copy or VM snapshot) & export over NFS. This roughly corresponds to step C in FIG. 3B.

At block 708, expose other (non-OS) partitions/disks as iSCSI targets. This roughly corresponds to step D in FIG. 3B.

At block 710, generate the user-data script for VM 398. Illustratively, recovery process 352 generates the user-data script based on information gathered at blocks 706-708 (steps C, D in FIG. 3B). The user-data script will be executed by the cloud-init routine to customize VM 398 at block 712 (see also step F in FIG. 3B).

At block 712, cloud-based VM 398 is created, booted, and re-booted. Upon completion of the re-boot, VM 398 is able to issue reads and writes. This block rough corresponds to steps E and F in FIG. 3B. More details are given in FIG. 7A.

At block 714, pseudo-disk driver 356 intercepts reads and writes issued by VM 398. For writes, control passes to block 720 and for reads control passes to block 716/718.

At block 716/718, which is reached when pseudo-disk driver 356 receives a read request from VM 398, if the requested extent is not found in the pseudo-disk (i.e., in private store or in recall store)—meaning this extent has not been written or read by VM 398 during the present live mount operation—pseudo-disk driver 356 invokes recall thread 354 on demand to read the extent from the VM backup copy 116 (block 716) or from VM snapshot 316 (block 718).

At block 720, which is reached when VM 398 issues a write, pseudo-disk driver 356 saves the data in the write into the pseudo-disk, e.g., to the private store.

At block 722, pseudo-disk driver 356 serves reads from the pseudo-disk, first checking the private store and then the recall store for extents that have been previously written or read, respectively, by VM 398.

At block 724, which occurs after live-mounted VM 398 expires or is powered off on demand, the pseudo-disk is discarded, e.g., by recovery process 352. This means that writes saved to the pseudo-disk private store from live-mounted VM 398 also are discarded. The present live-mount operation ends here.

It should be noted that system 300 may run multiple live mount operations at any given time using a corresponding plurality of live-mounted VMs 398. In some embodiments, multiple live-mounted VMs may run off the same data source (e.g., VM backup copy 116, VM snapshot 316), each live-mounted VM interoperating with a distinct pseudo-disk driver 356 and corresponding pseudo-disk(s) 358. Each live-mounted VM has its own duration and lifecycle distinct from the duration/lifecycle of other live-mounted VMs in system 300, whether they use the same or different data source (e.g., VM backup copy 116, VM snapshot 316).

FIG. 7A depicts some salient operations of block 712 of method 700 according to an illustrative embodiment. Block 712 is generally directed to creating, booting, and rebooting cloud-based VM 398.

At block 7122, recovery process 352 select machine image 362 from machine image pool 360. The selected machine image is suitable for cloud-based VM 398, e.g., based on operating system type and version, and/or other VM attributes. This roughly corresponds to step E in FIG. 3B. At block 7124, recovery process 352 causes cloud-based VM 398 to boot from selected machine image 362. This and the subsequent blocks in the present figure roughly correspond to step F in FIG. 3B. At block 7126, cloud-init runs the user-data script to customize VM 398 (e.g., change kernel parameters in accordance with information in step C of FIG. 3B). The user-data script will then cause VM 398 to reboot. At block 7128, after VM 398 reboots, the user-data script attaches VM 398 to other (non-OS) partitions/disks that were exposed as iSCSI targets at step D of FIG. 3B. At block 7129, cloud-based VM 398 is now live-mounted. Accordingly, VM 398 sees all mounted file systems at recovery computing device 350, and issues reads and writes, which are intercepted by pseudo-disk driver 356. Thus, after the reboot, the VM 398 provides virtual machine service in the cloud computing environment sooner than restoring all of the backup copy/snapshot of the first virtual machine to the cloud computing environment. This is one of the key advantages of the live mount feature. Block 712 concludes here.

FIG. 8 depicts some salient operations of a method 800 according to an illustrative embodiment. Method 800 is illustratively performed by components of system 400 unless otherwise noted. See also FIGS. 4A and 4B.

At block 802, initiate live recovery of a VM in a public cloud computing environment from a data source, e.g., non-cloud-native VM backup copy 116, VM snapshot 316. Typically, a user might initiate a request to live recover or migrate a certain VM backup copy or VM snapshot at a cloud destination, thus causing storage manager 340 to initiate the live recovery feature within system 400, which roughly corresponds to step A in FIG. 4B.

At block 804, pseudo-disk driver 356 creates a pseudo-disk at a cloud-native data storage volume supplied by public cloud computing environment 301, the cloud-based vdisk 404 (cloud-based vdisk). This roughly corresponds to step B' in FIG. 4B.

At block 806, data mover thread 455 sequentially requests the next extent from pseudo-disk driver 356, which invokes recall thread 354 for recovery from the data source, e.g., VM backup copy 116, VM snapshot 316. Pseudo-disk driver sets up I/O bitmap 456. This roughly corresponds to step BB in FIG. 4B.

At block 808, pseudo-disk driver 356 saves restored extents to the recall store of pseudo-disk(s) in cloud-based vdisk 404, unless overwritten by writes issued by VM 498. Pseudo-disk driver 356 updates bitmap 456 to reflect the successful recall.

At block 810, VM 498 is temporarily mounted in public cloud computing environment 301. This operation corresponds to blocks 710-712 in method 700 and will not be reiterated here. See also steps E and F in FIG. 4B. Notably, blocks 810-816 are performed concurrently with blocks 806-808, which sequentially restore data from backup copy 116 and/or from snapshot 316. This concurrency aspect is one of the key advantages of the live recovery feature, because it enables the temp-mounted VM to provide live VM service in the cloud computing environment while the backup copy/snapshot are being methodically restored in the background, thus providing live VM service much sooner than waiting for the backup copy/snapshot to be fully restored without using the temp-mounted VM.

At block 812, pseudo-disk driver 356 intercepts reads and writes issued by VM 498, as described in block 714 of method 700.

At block 814, if extent not found in pseudo-disk recall store or private store, pseudo-disk driver 356 invokes recall thread 354 on demand to read from the data source as described in more detail at blocks 716/718 of method 700.

At block 816, pseudo-disk driver 356 saves writes issued by VM 498 to the private store of pseudo-disk(s) in cloud-based vdisk 404, as described in more detail at block 720 of method 700.

At block 818, bitmap 456 tracks which extents have been recovered from the data source and/or written by VM 498. Some extents might have been recovered from the data source based on a read request issued by VM 498 while others were recovered through the sequential requests issued by the data mover thread 455.

At block 820, pseudo-disk driver 356 serves reads to VM 498 from pseudo-disk(s) in cloud-based vdisk 404, preferentially searching the private store, then the recall store.

At block 822, the live recovery feature switches over from temp-mounted VM 498 to recovery VM 402. Recovery VM 402 acquires access to data in cloud-based virtual disk(s) 404, including data written by temp-mounted VM 498 prior to the switchover. More details are given in FIG. 8A. Method 800 ends here.

It should be noted that system 400 may run multiple live recovery operations at any given time using a plurality of VMs 498 and corresponding recovery VMs 402. In some embodiments, multiple live-mounted VMs 398 may run off the same data source (e.g., VM backup copy 116, VM snapshot 316) as a temp-mounted VM 498, each VM 398/498 interoperating with a distinct pseudo-disk driver 356 and corresponding pseudo-disk(s) suitably configured.

Figure 8A:
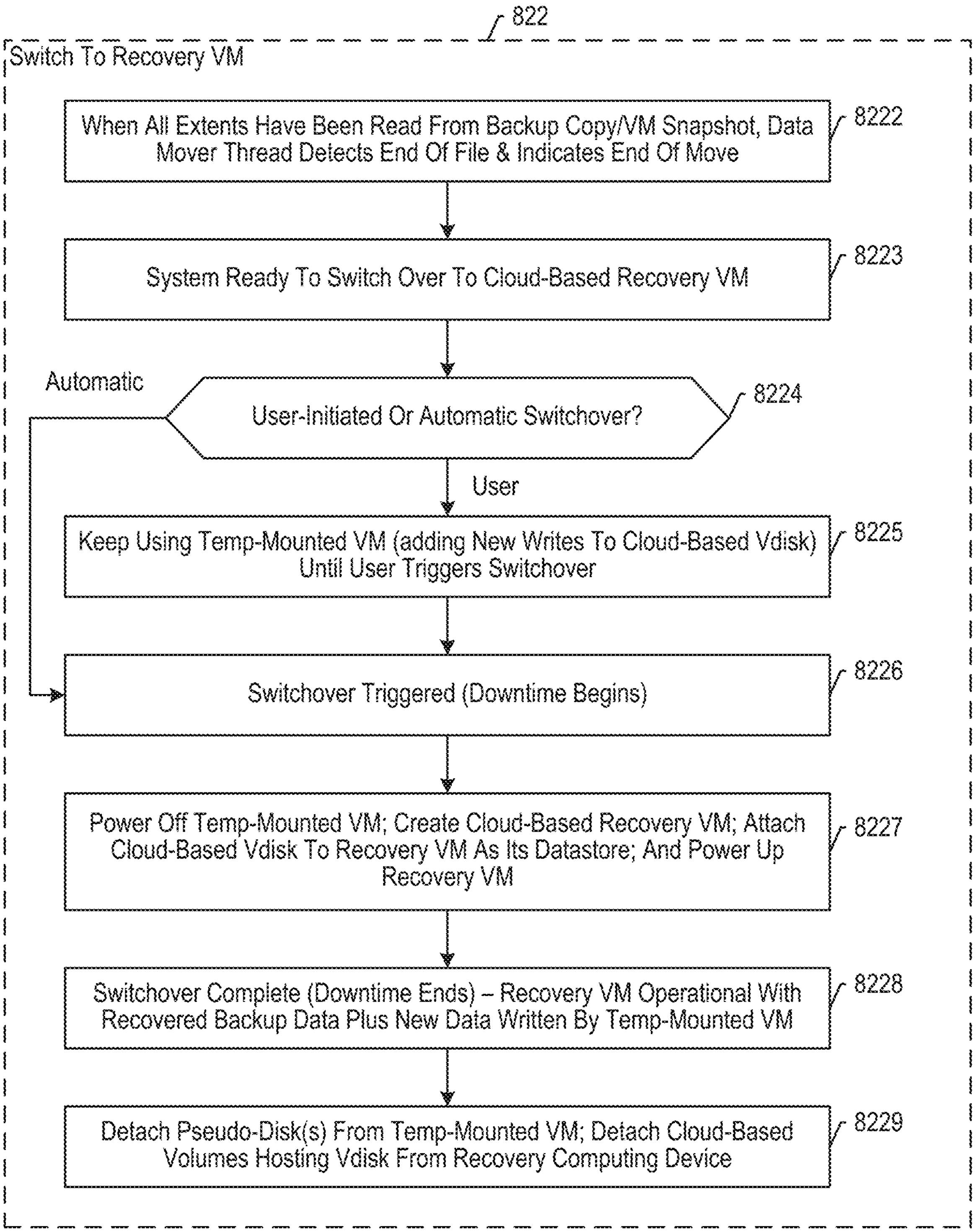
FIG. 8A depicts some salient operations of block 822 of method 800 according to an illustrative embodiment.

FIG. 8A depicts some salient operations of block 822 of method 800 according to an illustrative embodiment. Block 822 is generally directed to the switchover from temp-mounted VM to recovery VM.

At block 8222, When all extents have been read from the data source (e.g., VM backup copy 116, VM snapshot 316), data mover thread 455 detects end of file at the data source's storage media. Accordingly, data mover thread 455 indicates "End of Move" to recovery process 352 and/or to pseudo-disk driver 356.

At block 8223, based on the "end of move" indication, system 400 is now ready to switch over to cloud-based recovery VM 402. The readiness status may be communicated by recovery process 352 to storage manager 340 in some embodiments.

At block 8224, which is a decision point, system 400 determines whether the switchover should be user-Initiated or automatic. If automatic, control passes to block 8226; for user-initiated switchover control passes to block 8225.

At block 8225, which is reached when users control switchover initiation, system 400 keeps using temp-mounted VM 498 (adding new writes to cloud-based vdisk 404) until a user triggers switchover. The user may be the same one as the initiator of the live recovery operation at block 802, or may be a system administrator, without limitation.

At block 8226, the switchover from temp-mounted VM 498 to recovery VM 402 is triggered and a short period of downtime begins with block 8227.

At block 8227, system 400 (e.g., recovery process 352) powers off temp-mounted VM 498; creates cloud-based recovery VM 402; attaches cloud-based vdisk 404 to recovery VM 402 as its datastore; and powers up recovery VM 402. Before powering off VM 498, any applications that run thereon may be quiesced in order to stop writing new data into vdisk 404.

At block 8228, after recovery VM 42 is powered up, the switchover is complete and the temporary downtime ends. Recovery VM 402 is operational with recovered backup data from the data source (e.g., VM backup copy 116, VM snapshot 316) plus new data written by temp-mounted VM 498.

At block 8229, preferably after recovery VM 492 is operational, system 400 (e.g., recovery process 352) detaches the pseudo-disk(s) from temp-mounted VM 498; and detaches cloud-based volumes hosting vdisk 404 from recovery computing device 450. Block 822 ends here.

In regard to the present disclosure, other embodiments are possible, such that the above-recited components, workflows, steps, blocks, operations, messages, requests, queries, and/or instructions are differently arranged, sequenced, subdivided, organized, and/or combined. In some embodiments, a different component of system 300/400 may initiate or execute a given operation.

EXAMPLE EMBODIMENTS

Some example enumerated embodiments of the present invention are recited in this section in the form of methods, systems, and non-transitory computer-readable media, without limitation.

According to an illustrative embodiment, a data storage management system for live-mounting a non-cloud-native backup copy of a virtual machine in a cloud computing environment comprises: a first computing device operating in the cloud computing environment, wherein the first computing device is configured to: create a plurality of pseudo-disks at the first computing device, wherein each of the plurality of pseudo-disks corresponds to a virtual disk backed up in a backup copy of a first virtual machine, wherein the backup copy is not cloud-native to the cloud computing environment, and wherein each of the plurality of pseudo-disks presents as a block storage device at the first computing device; select, from a pool of pre-defined machine images configured in the cloud computing environment, a first machine image suitable for live-mounting the first virtual machine; cause a second virtual machine to boot in the cloud computing environment off the first machine image selected from the pool. The above-recited embodiment wherein a cloud-init routine, which executes at the second virtual machine when the second virtual machine boots, executes a user-data script that (i) customizes the second virtual machine to use a first mount point at the first computing device exported over Network File System (NFS) protocol for booting off a root partition of a boot disk of the backup copy, and (ii) causes the second virtual machine to reboot. The above-recited embodiment wherein the second virtual machine reboots over the NFS protocol via the first mount point and attaches to other disks of the backup copy exposed as Internet Small Computer Systems Interface (iSCSI) targets via a second mount point at the first computing device. The above-recited embodiment wherein the first computing device is further configured to: intercept read requests and write commands issued by the second virtual machine after the reboot. The above-recited embodiment wherein the first computing device is further configured to: write data received in the write commands to the plurality of pseudo-disks. The above-recited embodiment wherein the first computing device is further configured to: on receiving a first read request, serve the first read request from the plurality of pseudo-disks, and if first data requested in the first read request is not found the plurality of pseudo-disks, cause a media agent to restore the first data from the backup copy to one of the plurality of pseudo-disks at the first computing device before serving the first read request therefrom. The above-recited embodiment wherein after the reboot, the second virtual machine provides live-mounted virtual machine service in the cloud computing environment, with on-demand access to backed up data of the first virtual machine from the backup copy and without restoring all of the backup copy to the cloud computing environment. The above-recited embodiment wherein the first computing device is further configured to: after powering down the second virtual machine, discard the plurality of pseudo-disks including the data received in the write commands. The above-recited embodiment wherein after the reboot, the second virtual machine provides live-mounted virtual machine service in the cloud computing environment, using the plurality of pseudo-disks at the first computing device, with on-demand access to backed up data of the first virtual machine from the backup copy and without restoring all of the backup copy to the cloud computing environment.

The above-recited embodiment wherein after the reboot, the second virtual machine provides virtual machine service in the cloud computing environment sooner than restoring all of the backup copy of the first virtual machine to the cloud computing environment. The above-recited embodiment wherein the second virtual machine accesses data of the root partition of the boot disk of the first virtual machine, backed up in the backup copy, via the first mount point over NFS protocol. The above-recited embodiment wherein the second virtual machine accesses non-root data of the backup copy via one or more iSCSI targets. The above-recited embodiment further comprising the media agent, wherein the media agent executes on one of: the first computing device, a second computing device distinct from the first computing device and operating in the cloud computing environment, and a second computing device distinct from the first computing device and operating outside the cloud computing environment; and wherein the media agent is communicatively coupled to one or more data storage devices where the backup copy is stored. The above-recited embodiment further comprising: a storage manager that manages storage operations in the data storage management system and executes on a second computing device distinct from the first computing device; and wherein the storage manager is configured to instruct the first computing device to live-mount a virtual machine from the backup copy of the first virtual machine to the second virtual machine in the cloud computing environment. The above-recited embodiment wherein instructing the first computing device to live-mount includes an identifier for the root partition of the boot disk of the first virtual machine as backed up in the backup copy. The above-recited embodiment wherein the first computing device executes a pseudo-disk driver that maintains the plurality of pseudo-disks created for the backup copy, and wherein the pseudo-disk driver intercepts the read requests and write commands issued by the second virtual machine. The above-recited embodiment wherein each pre-defined machine image in the pool comprises an operating system image and one or more drivers needed by the second virtual machine to interoperate with the first computing device, and wherein the machine image pool is configured in the cloud computing environment. The above-recited embodiment wherein the backup copy is stored on one or more data storage devices at one of: within the cloud computing environment, outside the cloud computing environment, within another availability zone of the cloud computing environment, and within another service account of the cloud computing environment.

According to another example embodiment, a computer-implemented method for live-mounting a cloud-native snapshot of a virtual machine in a cloud computing environment comprises: by a first computing device operating in a cloud computing environment: by a pseudo-disk driver that executes on the first computing device, creating a plurality of pseudo-disks at the first computing device, wherein each of the plurality of pseudo-disks presents as a block storage device at the first computing device, wherein each of the plurality of pseudo-disks corresponds to a virtual disk backed up in a snapshot of a first virtual machine, and wherein the snapshot is cloud-native to and is stored in the cloud computing environment; selecting, from a pool of pre-defined machine images configured in the cloud computing environment, a first machine image corresponding to the first virtual machine; causing a second virtual machine to boot in the cloud computing environment off the first machine image selected from the pool, wherein a user-data script customizes the second virtual machine and causes the second virtual machine to reboot, and wherein after the reboot the second virtual machine issues read requests and write commands. The above-recited embodiment further comprising: by the pseudo-disk driver, intercepting the read requests and the write commands issued by the second virtual machine after the reboot. The above-recited embodiment further comprising: by the pseudo-disk driver, writing data received in the write commands to the plurality of pseudo-disks. The above-recited embodiment further comprising: by the pseudo-disk driver, on receiving a first read request, serving the first read request from the plurality of pseudo-disks, and if first data requested in the first read request is not found in any of the plurality of pseudo-disks, recalling the first data from the snapshot to one of the plurality of pseudo-disks at the first computing device before serving the first read request to the second virtual machine therefrom. The above-recited embodiment wherein after the reboot, the second virtual machine, in conjunction with the first computing device, provides live-mounted virtual machine service in the cloud computing environment, with on-demand access to data of the first virtual machine from the snapshot and without restoring all of the snapshot to the second virtual machine. The above-recited embodiment further comprising: after powering down the second virtual machine, discarding the plurality of pseudo-disks including the data received in the write commands. The above-recited embodiment further comprising: wherein after the reboot, the second virtual machine provides live-mounted virtual machine service in the cloud computing environment, using the plurality of pseudo-disks at the first computing device, with on-demand access to backed up data of the first virtual machine from the snapshot and without restoring all of the snapshot to the second virtual machine.

The above-recited embodiment wherein the user-data script customizes the second virtual machine (i) to use a first mount point at the first computing device exported over Network File System (NFS) protocol for booting off a root partition of a boot disk of the backup copy, and (ii) to use one or more Internet Small Computer Systems Interface (iSCSI) targets exposed by the first computing device for accessing non-root data of the backup copy; and wherein after the reboot, the second virtual machine issues read requests and write commands to one or more of: the first mount point over NFS protocol and one of one or more iSCSI targets over iSCSI protocol. The above-recited embodiment wherein the rebooted second virtual machine accesses data of the root partition of the boot disk of the first virtual machine via the first mount point over NFS protocol. The above-recited embodiment wherein the rebooted second virtual machine accesses non-root data of the backup copy and writes non-root data via one or more iSCSI targets. The above-recited embodiment wherein the first computing device recalls data from the snapshot of the first virtual machine using an application programming interface (API). The above-recited embodiment further comprising: by a storage manager that manages storage operations in the data storage management system and executes on a second computing device distinct from the first computing device, instructing the first computing device to initiate a live-mount of a virtual machine from the snapshot of the first virtual machine to the second virtual machine in the cloud computing environment. The above-recited embodiment wherein instructing the first computing device includes an identifier for the root partition of the boot disk of the first virtual machine as captured in the snapshot of the first virtual machine. The above-recited embodiment wherein second computing device operates in one of: within the cloud computing environment, outside the cloud computing environment, another availability zone of the cloud computing environment, and another service account of the cloud computing environment. The above-recited embodiment further comprising: configuring the pool of machine images in the cloud computing environment, wherein each pre-defined machine image in the pool comprises an operating system image and one or more drivers needed by the second virtual machine to interoperate with the first computing device. The above-recited embodiment wherein a cloud-init routine, which executes at the second virtual machine when the second virtual machine boots off the selected machine image, executes the user-data script to customize the second virtual machine. The above-recited embodiment wherein the rebooted second virtual machine provides virtual machine service to a user sooner than restoring all of the snapshot of the first virtual machine to the second virtual machine.

In other embodiments, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:

by a first computing device operating in a cloud computing environment, wherein the first computing device comprises one or more hardware processors:

causing a virtual disk to be configured in the cloud computing environment, wherein the virtual disk corresponds to a backup copy of a first virtual machine, wherein the backup copy was previously generated by a data storage management system that is distinct from the cloud computing environment, and wherein the backup copy is stored outside the cloud computing environment;

exposing the virtual disk as an Internet Small Computer Systems Interface (iSCSI) target configured at the first computing device;

sequentially requesting a next portion of data of the backup copy, wherein the sequentially requesting causes each next portion of data of the backup copy to be restored as primary data to the virtual disk in the cloud computing environment;

attaching a second virtual machine to the virtual disk, wherein the second virtual machine operates in the cloud computing environment;

concurrently with the sequentially requesting, intercepting write commands issued by the second virtual machine, and writing data intercepted in the write commands to the virtual disk;

after all portions of data of the backup copy have been restored as primary data from the backup copy to the virtual disk, causing the second virtual machine to be powered off; and causing a third virtual machine to be powered on in the cloud computing environment, and to attach to the virtual disk, and wherein after being powered on, the third virtual machine has access to primary data in the virtual disk, including data restored from the backup copy and data written to the virtual disk while attached to the second virtual machine.

2. The computer-implemented method of claim 1 further comprising: providing, to a user, via the second virtual machine and before powering on the third virtual machine, access to one or more of: primary data restored from the backup copy to the virtual disk in the cloud computing environment, and data written by the second virtual machine while attached to the virtual disk in the cloud computing environment, wherein the access provided to the user occurs before all portions of data of the backup copy have been restored, as primary data, to the virtual disk in the cloud computing environment.

3. The computer-implemented method of claim 1 further comprising: by the first computing device operating in the cloud computing environment: causing the virtual disk to detach from the first computing device after the third virtual machine is powered on.

4. The computer-implemented method of claim 1 wherein powering on of the third virtual machine, with access to the primary data in the virtual disk in the cloud computing environment, completes a migration of the first virtual machine to the cloud computing environment from one of: outside the cloud computing environment, another availability zone of the cloud computing environment, and another service account of the cloud computing environment.

5. The computer-implemented method of claim 1 further comprising: by the first computing device operating in the cloud computing environment: concurrently with the sequentially requesting, serving read requests issued by the second virtual machine from the virtual disk, wherein based on determining that a first portion of data of the backup copy requested in a first read request among the read requests is not in the virtual disk, causing the first portion of data to be restored, as primary data, from the backup copy to the virtual disk before serving the first read request from the virtual disk.

6. The computer-implemented method of claim 1 further comprising: by a pseudo-disk driver that executes at the first computing device: tracking which portions of data of the backup copy have been restored from the backup copy; intercepting write commands issued by the second virtual machine; and intercepting read requests issued by the second virtual machine.

7. The computer-implemented method of claim 1 further comprising: by the first computing device operating in the cloud computing environment: mounting the virtual disk to a mount point, which is configured for iSCSI at the first computing device, before exposing the virtual disk as the iSCSI target.

8. The computer-implemented method of claim 1 wherein a mount point at the first computing device is configured for Network File System (NFS) protocol, and further comprising: by the first computing device operating in the cloud computing environment: exporting via the NFS protocol and mounting to the mount point, one of: an operating system (OS) partition of a virtual disk comprising the backup copy, and an OS-virtual disk of the backup copy.

9. The computer-implemented method of claim 1, wherein the second virtual machine is mounted to the first computing device via a first mount point configured for iSCSI and via a second mount point configured for Network File System (NFS) protocol, and further comprising:

by the first computing device operating in the cloud computing environment:

exporting via the NFS protocol and mounting to the second mount point, one of: an operating system (OS) partition of a virtual disk of the backup copy, and an OS-virtual disk of the backup copy; and before rebooting the second virtual machine, updating kernel parameters for the second virtual machine for NFS root and causing the rebooting of the second virtual machine via the NFS protocol over the second mount point.

10. The computer-implemented method of claim 1 further comprising: by the first computing device operating in the cloud computing environment:

selecting a machine image from a pool of boot images to one of: match the first virtual machine, and closely mimic the first virtual machine;

causing the second virtual machine in the cloud computing environment to use the machine image to boot off a root partition of a virtual disk of the backup copy via a mount point at the first computing device, wherein the root partition was exported over Network File System (NFS) protocol; and causing the second virtual machine to reboot from the root partition over the NFS protocol via the mount point before attaching to the virtual disk in the cloud computing environment.

11. A system comprising:

a first computing device operating in a cloud computing environment, wherein the first computing device comprises one or more hardware processors, and wherein the first computing device is configured to:

cause a virtual disk to be configured in the cloud computing environment, wherein the virtual disk corresponds to a backup copy of a first virtual machine, wherein the backup copy was previously generated by a data storage management system that is distinct from the cloud computing environment, and wherein the backup copy is stored outside the cloud computing environment;

expose the virtual disk as an Internet Small Computer Systems Interface (iSCSI) target configured at the first computing device;

issue a plurality of sequential requests for a next portion of data of the backup copy, wherein each sequential request causes each next portion of data of the backup copy to be restored as primary data to the virtual disk in the cloud computing environment;

attach a second virtual machine to the virtual disk, wherein the second virtual machine operates in the cloud computing environment;

concurrently with the plurality of sequential requests, intercept write commands issued by the second virtual machine, and write data intercepted in the write commands to the virtual disk;

after all portions of data of the backup copy have been restored as primary data from the backup copy to the virtual disk, cause the second virtual machine to be powered off; and cause a third virtual machine to be powered on in the cloud computing environment, wherein the third virtual machine is attached to the virtual disk in the cloud computing environment, and wherein after being powered on, the third virtual machine has access to primary data in the virtual disk, including data restored from the backup copy and data written to the virtual disk while attached to the second virtual machine.

12. The system of claim 11 further comprising: providing, to a user, via the second virtual machine and before powering on the third virtual machine, access to one or more of: primary data restored from the backup copy to the virtual disk in the cloud computing environment, and data written by the second virtual machine while attached to the virtual disk in the cloud computing environment, wherein the access provided to the user occurs before all portions of data of the backup copy have been restored, as primary data, to the virtual disk in the cloud computing environment.

13. The system of claim 11 further comprising: by the first computing device operating in the cloud computing environment: causing the virtual disk in the cloud computing environment to detach from the first computing device after the third virtual machine is powered on.

14. The system of claim 11, wherein powering on of the third virtual machine, with access to the primary data in the virtual disk in the cloud computing environment, completes a migration of the first virtual machine to the cloud computing environment from one of: outside the cloud computing environment, another availability zone of the cloud computing environment, and another service account of the cloud computing environment.

15. The system of claim 11 further comprising: by the first computing device operating in the cloud computing environment: concurrently with the plurality of sequential requests, serving read requests issued by the second virtual machine from the virtual disk, wherein based on determining that a first portion of data of the backup copy requested in a first read request among the read requests is not in the virtual disk, causing the first portion of data to be restored, as primary data, from the backup copy to the virtual disk before serving the first read request from the virtual disk.

16. The system of claim 11 further comprising: by a pseudo-disk driver that executes at the first computing device: tracking which portions of data of the backup copy have been restored from the backup copy; intercepting write commands issued by the second virtual machine; and intercepting read requests issued by the second virtual machine.

17. The system of claim 11 further comprising: by the first computing device operating in the cloud computing environment: mounting the virtual disk to a mount point, which is configured for iSCSI at the first computing device, before exposing the virtual disk as the iSCSI target.

18. The system of claim 11, wherein a mount point at the first computing device is configured for Network File System (NFS) protocol, and further comprising: by the first computing device operating in the cloud computing environment: exporting via the NFS protocol and mounting to the mount point, one of: an operating system (OS) partition of a virtual disk comprising the backup copy, and an OS-virtual disk of the backup copy.

19. The system of claim 11, wherein the second virtual machine is mounted to the first computing device via a first mount point configured for iSCSI and via a second mount point configured for Network File System (NFS) protocol, and further comprising:

by the first computing device operating in the cloud computing environment:

exporting via the NFS protocol and mounting to the second mount point, one of: an operating system (OS) partition of a virtual disk of the backup copy, and an OS-virtual disk of the backup copy; and before rebooting the second virtual machine, updating kernel parameters for the second virtual machine for NFS root and causing the rebooting of the second virtual machine via the NFS protocol over the second mount point.

20. The system of claim 11 further comprising: a second computing device that comprises one or more hardware processors and operates outside the cloud computing environment, wherein the second computing device is configured to: responsive to each sequential request for a next portion of data of the backup copy, restore each next portion of data of the backup copy, from a backup format of the backup copy to a primary data format of the primary data, to the virtual disk in the cloud computing environment.

* * * * *